United States Patent
Kumar et al.

(10) Patent No.: US 12,548,645 B2
(45) Date of Patent: Feb. 10, 2026

(54) COMPUTER ARCHITECTURE FOR IDENTIFYING LINES OF THERAPY

(71) Applicant: GUARDANT HEALTH, INC., Redwood City, CA (US)

(72) Inventors: Naveen Kumar, Redwood City, CA (US); Jingwen Zhang, Killeen, TX (US); Nisha Subramanian, Redwood City, CA (US); Gautam Nayak, Fremont, CA (US); Shunxin Lu, Dublin, CA (US); Jiemin Liao, Redwood City, CA (US); Junhua Yu, Redwood City, CA (US)

(73) Assignee: Guardant Health, Inc., Palo Alto, CA (US)

( * ) Notice: Subject to any disclaimer, the term of this patent is extended or adjusted under 35 U.S.C. 154(b) by 441 days.

(21) Appl. No.: 17/877,767

(22) Filed: Jul. 29, 2022

(65) Prior Publication Data

US 2023/0133829 A1    May 4, 2023

Related U.S. Application Data

(63) Continuation-in-part of application No. PCT/US2022/032250, filed on Jun. 3, 2022.
(Continued)

(51) Int. Cl.
*G16H 10/60* (2018.01)
*G16H 50/70* (2018.01)

(52) U.S. Cl.
CPC ............ *G16H 10/60* (2018.01); *G16H 50/70* (2018.01)

(58) Field of Classification Search
CPC ........ G16H 10/60; G16H 50/70; G16H 20/10; G16H 40/20; G16H 50/20; G16H 50/30; G16H 15/00; G16H 70/20; G16H 70/60
See application file for complete search history.

(56) References Cited

U.S. PATENT DOCUMENTS 8,666,926 B1 * 3/2014 Nease .................... G06N 5/022
    706/50
9,824,236 B2 11/2017 Lynch et al.
(Continued)

FOREIGN PATENT DOCUMENTS

WO    2005008558 A2    1/2005
WO    2021097309 A1    5/2021

OTHER PUBLICATIONS

Christian Castaneda, Kip Nalley, Ciaran Mannion, Pritish Bhattachary, Patrick Blake, Andrew Pecora, Andre Goy, and K Stephen Suh; "Clinical decision support systems for improving diagnostic accuracy and achieving precision medicine," Journal of Clinical Bioinformatics 5:4; DOI 10.1186/s13336-015 (Year: 2015).*
(Continued)

*Primary Examiner* — Devin C Hein
*Assistant Examiner* — Vincent C Ilagan
(74) *Attorney, Agent, or Firm* — Brian T. Hahn

(57) ABSTRACT

A computing machine accesses a pharmacy transaction data set and a medical procedure transaction data set. The computing machine filters, from the pharmacy data set and the medical procedure transaction data set, transactions relevant to a biological condition. The computing machine identifies one or more lines of therapy from the filtered pharmacy data set and the filtered medical procedure transaction data set.

20 Claims, 22 Drawing Sheets

Related U.S. Application Data

(60) Provisional application No. 63/250,912, filed on Sep. 30, 2021, provisional application No. 63/238,851, filed on Aug. 31, 2021, provisional application No. 63/227,860, filed on Jul. 30, 2021.

(56) References Cited

U.S. PATENT DOCUMENTS

| | | |
|---|---|---|
| 2006/0190295 A1 | 8/2006 | Merkin |
| 2010/0131299 A1* | 5/2010 | Hasan ............... G06Q 10/00 705/3 |
| 2013/0030842 A1* | 1/2013 | Lutgen ............... G16H 70/60 705/3 |
| 2014/0324472 A1* | 10/2014 | Delaney ............. G16H 10/60 705/3 |
| 2015/0095055 A1 | 4/2015 | Bagull |
| 2016/0357910 A1 | 12/2016 | Ghouri et al. |
| 2017/0116373 A1 | 4/2017 | Ginsburg et al. |
| 2017/0235894 A1 | 8/2017 | Cox et al. |
| 2017/0260590 A1* | 9/2017 | Eltoukhy ............ C12Q 1/6886 |
| 2018/0046764 A1 | 2/2018 | Katwala et al. |
| 2019/0108915 A1 | 4/2019 | Spurlock, III |
| 2019/0256924 A1* | 8/2019 | Vogelstein .......... C12Q 1/6827 |
| 2019/0279753 A1 | 9/2019 | Rourke et al. |
| 2020/0251213 A1 | 8/2020 | Tran et al. |
| 2020/0294640 A1* | 9/2020 | Ginsburg ............ G16H 40/20 |
| 2020/0303060 A1* | 9/2020 | Haemel .............. G06N 3/082 |
| 2021/0057071 A1* | 2/2021 | Barber ............... G16H 50/20 |
| 2021/0343420 A1* | 11/2021 | Ritter ................. G16H 10/60 |
| 2021/0350937 A1* | 11/2021 | Lefkofsky ........... G16H 10/20 |
| 2022/0059221 A1* | 2/2022 | Zhu .................... G16H 50/80 |
| 2022/0101113 A1* | 3/2022 | Tam ................... G06N 3/045 |
| 2022/0189100 A1* | 6/2022 | Kosomaa ............ G06N 3/084 |
| 2022/0328198 A1* | 10/2022 | Wasan ................ G16H 50/20 |
| 2024/0289586 A1* | 8/2024 | Balakrishnan ....... G06N 3/098 |

OTHER PUBLICATIONS

Bouri N, Ravi S; "Going Mobile: How Mobile Personal Health Records Can Improve Health Care During Emergencies"; JMIR Mhealth Uhealth;2(1):e8; doi: 10.2196/mhealth.3017 (Year: 2014).*
International search report and written opinion for International Patent Application No. PCT/US2022/032250, dated Sep. 8, 2022.
Pardoll, D.M. "The blockade of immune checkpoints in cancer immunotherapy" Nature Rev Cancer (2012) 12:252-264.
International Search Report & Written Opinion for International Application No. PCT/US2022/038941, dated Jan. 23, 2023.
International Search Report & Written Opinion for International Application No. PCT/US2022/045341, dated Jan. 31, 2023.
International Search Report and Written Opinion for International Patent Application No. PCT/US2022/042262, dated Jan. 19, 2023.
Final Office Action for U.S. Appl. No. 17/823,915 dated Sep. 25, 2025.

* cited by examiner

| Patient ID | Insurance Transaction Identifier | ICD Code | Transaction Start Date | Transaction End Date | Lung Cancer Cohort | Confidence Level |
|---|---|---|---|---|---|---|
| ABC123 | 118UUW | C34 | 09-06-97 | 09-06-97 | Yes | High |
| | 762BBG | C34 | 12-11-97 | 12-11-97 | | |
| | 379NHJ | C162 | 06-15-98 | 06-17-98 | | |
| LMN001 | 992QAX | C34 | 04-22-95 | 04-23-95 | Yes | Low |
| | 659NHE | C64 | 10-19-95 | 10-19-95 | | |
| | 748VKI | C162 | 05-28-97 | 05-29-97 | | |
| P4O7Q3 | 014OSZ | C37 | 02-09-98 | 02-09-98 | No | Medium |
| | LLY821 | C162 | 02-09-98 | 02-09-98 | | |

| Cancer Type | Guardant360 (Plasma) | | Tissue Experience[1] |
|---|---|---|---|
| | Patients Assayed to Date | Mdt+ Gated | MSI+ Incidence Rate reported across all studies |
| Colorectal | 15466 | 426 (3%) | 5-7.2% |
| Gastric/Esophageal | 2908 | 105 (4%) | 1.6 - 4.3% |
| Pancreatic | 9760 | 58 (1%) | NA - 1.2%[2] |
| Hepatocellular Carcinoma | 1399 | 10 (2%) | 0.8 - 2.7% |
| Cholangiocarcinoma | 120 | 2 (1%) | NA - 1.4% |
| Total: | 29651 | 601 (2%) | |

NA = Not available / reported across all studies

Figure 10

COMPUTER ARCHITECTURE FOR IDENTIFYING LINES OF THERAPY

CROSS-REFERENCE TO RELATED APPLICATION

This patent application claims the benefit of priority to U.S. Provisional Application Ser. No. 63/227,860, filed on Jul. 30, 2021, U.S. Provisional Application Ser. No. 63/238,851 filed on Aug. 31, 2021, U.S. Provisional Application Ser. No. 63/250,912 filed on Sep. 30, 2021, and is a Continuation-in-Parts of PCT Application No. PCT/US2022/032250 filed Jun. 3, 2022, which are each incorporated by reference herein in their entirety.

TECHNICAL FIELD

Implementations of the present disclosure relate generally to the field of computer architecture, and more particularly to a computer architecture for identifying lines of therapy from pharmacy transactions data and medical procedure transaction data.

BACKGROUND

As individuals visit healthcare providers to treat one or more biological conditions, various types of documentation may be generated. For example, pharmacy transaction data may be generated when an individual makes a purchase at a pharmacy and files a claim with his/her health insurer. Medical procedure transaction data may be generated when the individual visits a medical provider and/or undergoes a medical procedure and files a claim with his/her health insurer. The pharmacy transaction data and medical procedure data may be useful in understanding therapies undergone by the patient. Techniques for identifying the therapies from the pharmacy transaction data and the medical procedure transaction data may be desirable.

BRIEF DESCRIPTION OF THE DRAWINGS

FIG. 10 illustrates a table showing the prevalence of MSI-H in nearly 30,000 advanced gastrointestinal cancer patients.

DETAILED DESCRIPTION

Figure 1:
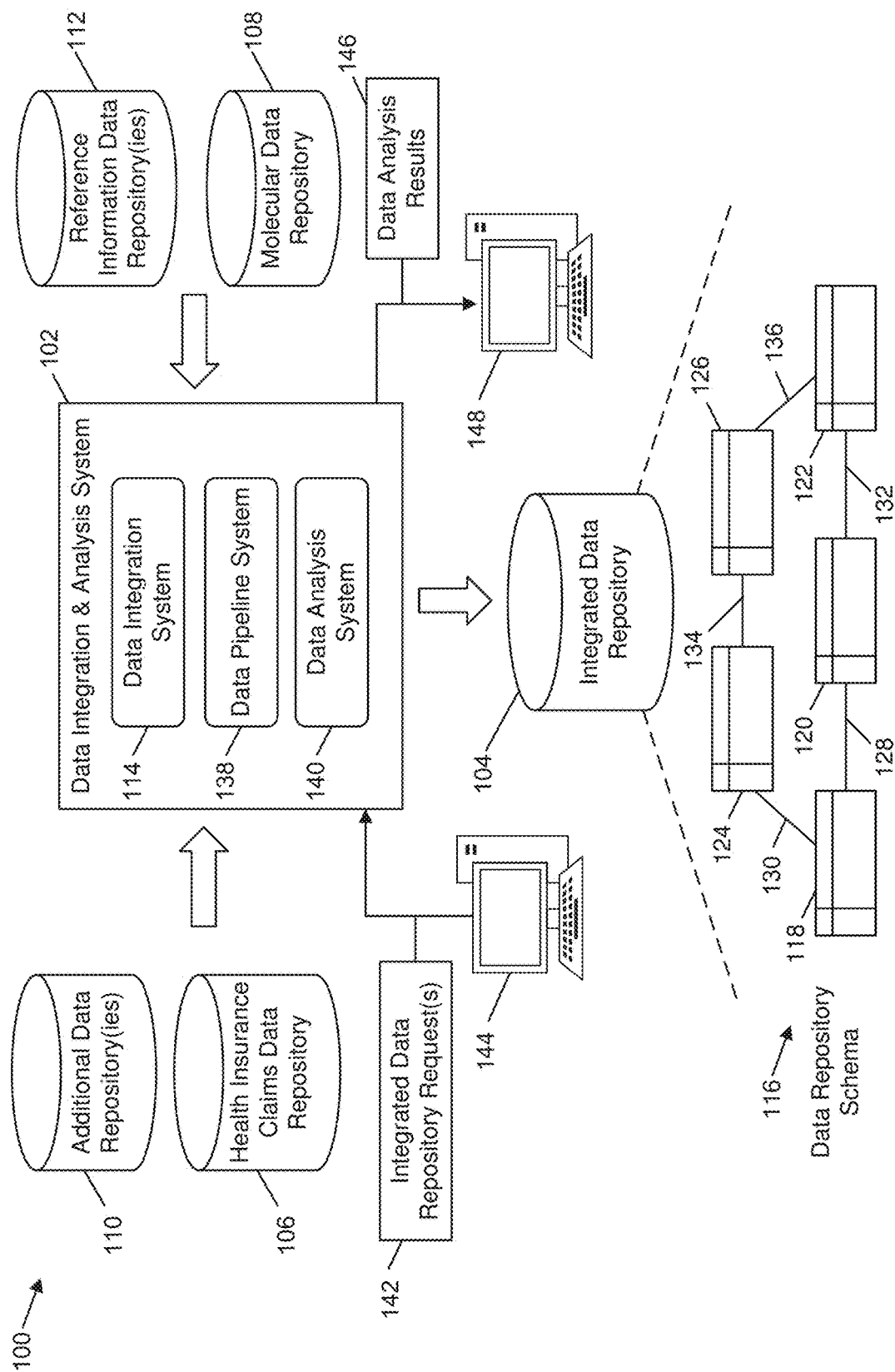
FIG. 1 illustrates an example architecture to generate an integrated data repository that includes multiple types of healthcare data, according to one or more implementations.

The following description and the drawings sufficiently illustrate specific implementations to enable those skilled in the art to practice them. Other implementations may incorporate structural, logical, electrical, process, and other changes. Portions and features of some implementations may be included in, or substituted for, those of other implementations. Implementations set forth in the claims encompass all available equivalents of those claims.

The analysis of healthcare data using existing systems and techniques is typically performed with respect to medical records generated by healthcare providers. As used herein, a healthcare provider may refer to an entity, individual, or group of individuals involved in provided care to individuals in relation to at least one of the treatment or prevention of one or more biological conditions. In addition, as used herein, a biological condition can refer to an abnormality of function and/or structure in an individual to such a degree as to produce or threaten to produce a detectable feature of the abnormality. A biological condition can be characterized by external and/or internal characteristics, signs, and/or symptoms that indicate a deviation from a biological norm in one or more populations. A biological condition can be characterized by external and/or internal characteristics, signs, and/or symptoms that indicate a deviation from a biological norm in one or more populations. In various examples, a biological condition can include one or more molecular phenotypes. For example, a biological condition may correspond to genetic or epigenetic lesions. In one or more additional examples, a biological condition can include at least one of one or more diseases, one or more disorders, one or more injuries, one or more syndromes, one or more disabilities, one or more infections, one or more isolated symptoms, or other atypical variations of biological structure and/or function of individuals. Additionally, a treatment, as used herein, can refer to a substance, procedure, routine, device, and/or other intervention that can administered or performed with the intent of treating one or more effects of a biological condition in an individual. In one or more examples, a treatment may include a substance that is metabolized by the individual. The substance may include a composition of matter, such as a pharmaceutical composition. The substance may be delivered to the individual via a number of methods, such as ingestion, injection, absorption, or inhalation. A treatment may also include physical interventions, such as one or more surgeries. In at least some examples, the treatment can include a therapeutically meaningful intervention.

The healthcare data typically analyzed by existing systems includes unstructured data. Unstructured data can include data that is not organized according to a pre-defined or standardized format. For example, unstructured data may include notes made by a healthcare provider that is comprised of free text. That is, the manner in which the notes are captured does not include pre-defined inputs that are selectable by the healthcare provider, such as via a drop-down menu or via a list. Rather, the notes include text entered by a healthcare provider that may include sentences, sentence fragments, words, letters, symbols, abbreviations, one or more combinations thereof, and so forth. In some cases, unstructured data may be partially structured. For example, a provider could select an insurance billing code from a predefined list of insurance billing codes, and add unstructured notes to data associated with that billing code.

Existing systems typically devote a large amount of computing resources to analyzing unstructured data in order to extract information that may be relevant to analyses being performed by the existing systems. In some cases, existing systems may analyze unstructured data and transform the unstructured data to a structured format in order to facilitate the analysis of the previously unstructured data. The analysis of unstructured data by existing systems can be inefficient as well as inaccurate. In scenarios where the unstructured data is obtained from healthcare data, the importance of accurately analyzing the information is high because the analysis may be related to at least one of the treatment or diagnosis of a number of individuals with respect to one or more biological conditions. Thus, inaccurate analyses of healthcare data may have a detrimental impact on the health of individuals.

The implementations of techniques, architectures, frameworks, systems, processes, and computer-readable instructions described herein are directed to analyzing health insurance claims data to derive information about at least one of the health or treatment of individuals. In contrast to existing systems, health insurance claims data is structured according to one or more formats and stored by a number of data tables. The data tables may include codes or other alphanumeric information indicating treatments received by individuals, dates of treatments, dosage information, diagnoses of individuals with respect to one or more biological conditions, information related to visits to healthcare providers, dates of visits to healthcare providers, billing information, and the like. The implementations described herein may be used to accurately analyze health insurance claims data for hundreds, up to thousands of individuals in which one or more biological conditions are present, one or more biological conditions are suspected to be present, and/or one or more biological conditions for which the individuals are considered at-risk. In various examples, tens of thousands, hundreds of thousands, up to millions of rows and/or columns of health insurance claims data may be analyzed to determine health-related information for individuals in which one or more biological conditions are present.

In some implementations, to treat a biological condition, an individual may transact with pharmacies and medical providers. Records of the transactions may be provided to the individual's health insurer (or another party, for example, a government agency, which is responsible for handling or processing all or a portion of the payment for the transaction). Pharmacy transaction data may be generated when an individual makes a purchase at a pharmacy and files a claim with his/her health insurer. Medical procedure transaction data may be generated when the individual visits a medical provider and/or undergoes a medical procedure and files a claim with his/her health insurer. The pharmacy transaction data and medical procedure data may be useful in understanding therapies undergone by the patient.

In some cases, lines of therapy may be identified from the pharmacy transaction data and/or the medical procedure transaction data of the individual. As used herein, the phrase "line of therapy" encompasses its plain and ordinary meaning. A line of therapy may include therapies (e.g., drugs, medical provider visits, medical therapies) that are administered within a common time window and for a same stage of the biological condition. When a gap in treatment occurs, a line of therapy may be stopped before the gap and a new line of therapy may be started after the gap. If the biological condition progresses or regresses (e.g., change in stage of cancer), a new line of therapy may be started upon the progression or regression of the biological condition. As used herein, a gap in treatment may include, among other things, a time period of at least predefined length when there is no therapy being administered.

In some implementations, a computing machine may access, at the processing circuitry and from the memory, for a given patient, a pharmacy transaction data set. Each pharmacy transaction in the pharmacy transaction data set may comprise at least a transaction date, a therapeutic type, and a therapeutic supply duration. The computing machine may identify, from the pharmacy transaction data set and based on the therapeutic type, a pharmacy transaction subset relevant to a biological condition. The computing machine may compute, for at least one pharmacy transaction in the pharmacy transaction subset, an end date. The transaction date may correspond to a date when payment is initiated with respect to the transaction. The end date may be determined based on the transaction date and the therapeutic supply duration associated with the at least one pharmacy transaction. The computing machine may access, at the processing circuitry and from the memory, for the patient, a medical procedure transaction data set. Each medical procedure in the medical procedure data set may comprise at least a medical procedure date range and a medical procedure type. The computing machine may identify, from the medical procedure transaction data set and based on the medical procedure type, a medical procedure transaction subset relevant to the biological condition. The computing machine may adjust, for at least one medical procedure in the medical procedure transaction subset, a medical procedure date range based on a time period during which the medical procedure type is effective or repeated. The computing machine may map onto a timeline data structure stored in the memory, the pharmacy transaction subset and the medical procedure transaction subset. The timeline data structure may store pharmacy transactions and medical procedure transactions arranged by date. The computing machine may determine in the timeline data structure, one or more therapy gaps during which there are no pharmacy transactions and no medical procedure transactions. Each therapy gap may comprise a contiguous number of days. In one or more examples, the contiguous number of days may be longer than a threshold number of days. The computing machine may determine, based on the one or more therapy gaps, one or more lines of therapy. Each line of therapy may comprise pharmacy transactions and medical procedure transactions occurring either between two therapy gaps, before an earliest temporal therapy gap, or after a latest temporal therapy gap. Each line of therapy being associated with a line date range. The computing machine may transmit, to a data repository for storage thereat, a data structure identifying the patient, the one or more lines of therapy, and the line date range for each of the one or more lines of therapy.

The memory may include (or be connected to) a pharmacy data repository storing the pharmacy transaction data set and a medical procedure transaction data repository storing the medical procedure transaction data set. Each data repository may include database(s) or other data storage unit(s). The timeline data structure may include, among other things, a plurality of data items, with each data item being associated with a single date or with a date range.

FIG. 1 illustrates an example architecture 100 to generate an integrated data repository that includes multiple types of healthcare data, according to one or more implementations. The architecture 100 may include a data integration and analysis system 102. The data integration and analysis system 102 may obtain data from a number of data sources and integrate the data from the data sources into an integrated data repository 104. For example, the data integration and analysis system 102 may obtain data from a health insurance claims data repository 106. In various examples, the data integration and analysis system 102 and the health insurance claims data repository 106 may be created and maintained by different entities. In one or more additional examples, the data integration and analysis system 102 and the health insurance claims data repository 106 may be created and maintained by a same entity.

The data integration and analysis system 102 may be implemented by one or more computing devices. The one or more computing devices may include one or more server computing devices, one or more desktop computing devices, one or more laptop computing devices, one or more tablet computing devices, one or more mobile computing devices, or combinations thereof. In certain implementations, at least a portion of the one or more computing devices may be implemented in a distributed computing environment. For example, at least a portion of the one or more computing devices may be implemented in a cloud computing architecture. In scenarios where the computing systems used to implement the data integration and analysis system 102 are configured in a distributed computing architecture, processing operations may be performed concurrently by multiple virtual machines. In various examples, the data integration and analysis system 102 may implement multithreading techniques. The implementation of a distributed computing architecture and multithreading techniques cause the data integration and analysis system 102 to utilize fewer computing resources in relation to computing architectures that do not implement these techniques.

The health insurance claims data repository 106 may store information obtained from one or more health insurance companies that corresponds to insurance claims made by subscribers of the one or more health insurance companies. The health insurance claims data repository 106 may be arranged (e.g., sorted) by patient identifier. The patient identifier may be based on the patient's first name, last name, date of birth, social security number, address, employer, and the like. The data stored by the health insurance claims data repository 106 may include structured data that is arranged in one or more data tables. The one or more data tables storing the structured data may include a number of rows and a number of columns that indicate information about health insurance claims made by subscribers of one or more health insurance companies in relation to procedures and/or treatments received by the subscribers from healthcare providers. At least a portion of the rows and columns of the data tables stored by the health insurance claims data repository 106 may include health insurance codes that may indicate diagnoses of biological conditions, and treatments and/or procedures obtained by subscribers of the one or more health insurance companies. In various examples, the health insurance codes may also indicate diagnostic procedures obtained by individuals that are related to one or more biological conditions that may be present in the individuals. In one or more examples, a diagnostic procedure may provide information used in the detection of the presence of a biological condition. A diagnostic procedure may also provide information used to determine a progression of a biological condition. In one or more illustrative examples, a diagnostic procedure may include one or more imaging procedures, one or more assays, one or more laboratory procedures, one or more combinations thereof, and the like.

The data integration and analysis system 102 may also obtain information from a molecular data repository 108. The molecular data repository 108 may store data of a number of individuals related to genomic information, genetic information, metabolomic information, transcriptomic information, fragmentiomic information, immune receptor information, methylation information, epigenomic information, and/or proteomic information. In one or more examples, the data integration and analysis system 102 and the molecular data repository 108 may be created and maintained by different entities. In one or more additional examples, the data integration and analysis system 102 and the molecular data repository 108 may be created and maintained by a same entity.

The genomic information may indicate one or more mutations corresponding to genes of the individuals. A mutation to a gene of individuals may correspond to differences between a sequence of nucleic acids of the individuals and one or more reference genomes. The reference genome may include a known reference genome, such as hg19. In various examples, a mutation of a gene of an individual may correspond to a difference in a germline gene of an individual in relation to the reference genome. In one or more additional examples, the reference genome may include a germline genome of an individual. In one or more further examples, a mutation to a gene of an individual may include a somatic mutation. Mutations to genes of individuals may be related to insertions, deletions, single nucleotide variants, loss of heterozygosity, duplication, amplification, translocation, fusion genes, or one or more combinations thereof.

In one or more illustrative examples, genomic information stored by the molecular data repository 108 may include genomic profiles of tumor cells present within individuals. In these situations, the genomic information may be derived from an analysis of genetic material, such as deoxyribonucleic acid (DNA) and/or ribonucleic acid (RNA) from a sample, including, but not limited to, a tissue sample or tumor biopsy, circulating tumor cells (CTCs), exosomes or efferosomes, or from circulating nucleic acids (e.g., cell-free DNA) found in blood samples of individuals that is present due to the degradation of tumor cells present in the individuals. In one or more examples, the genomic information of tumor cells of individuals may correspond to one or more target regions. One or more mutations present with respect to the one or more target regions may indicate the presence of tumor cells in individuals. The genomic information stored by the molecular data repository 108 may be generated in relation to an assay or other diagnostic test that may determine one or more mutations with respect to one or more target regions of the reference genome.

"Cell-free DNA," "cfDNA molecules," or simply "cfDNA" include DNA molecules that occur in a subject in extracellular form (e.g., in blood, serum, plasma, or other bodily fluids such as lymph, cerebrospinal fluid, urine, or sputum) and includes DNA not contained within or otherwise bound to a cell at the point of isolation from the subject. While the DNA originally existed in a cell or cells of a large complex biological organism (e.g., a mammal) or other cells, such as bacteria, colonizing the organism, the DNA has undergone release from the cell(s) into a fluid found in the organism. cfDNA includes, but is not limited to, cell-free genomic DNA of the subject (e.g., a human subject's genomic DNA) and cell-free DNA of microbes, such as bacteria, inhabiting the subject (whether pathogenic bacteria or bacteria normally found in commonly colonized locations such as the gut or skin of healthy controls), but does not include the cell-free DNA of microbes that have merely contaminated a sample of bodily fluid. Typically, cfDNA may be obtained by obtaining a sample of the fluid without the need to perform an in vitro cell lysis step and also includes removal of cells present in the fluid (e.g., centrifugation of blood to remove cells).

In one or more additional examples, the data integration and analysis system 102 may obtain information from one or more additional data repositories 110. The one or more additional data repositories 110 may store data related to electronic medical records of individuals for which data is present in at least one of the health insurance claims data repository 106 or the molecular data repository 108. Further, the one or more additional data repositories 110 may store data related to pathology reports of individuals for which data is present in at least one of the health insurance claims data repository 106 or the molecular data repository 108. In various examples, the one or more additional data repositories 110 may store data related to biological conditions and/or treatments for biological conditions. In one or more examples, the data integration and analysis system 102 and at least a portion of the one or more additional data repositories 110 may be created and maintained by different entities. In one or more further examples, the data integration and analysis system 102 and at least a portion of the one or more additional data repositories 110 may be created and maintained by a same entity.

In one or more further implementations, the data integration and analysis system 102 may obtain information from one or more reference information data repositories 112. The one or more reference information data repositories 112 may store information that includes definitions, standards, protocols, vocabularies, one or more combinations thereof, and the like. In various examples, the information stored by the one or more reference information data repositories may correspond to biological conditions and/or treatments for biological conditions. In one or more illustrative examples, the one or more reference information data repositories 112 may include RxNorm. (RxNorm provides normalized names for clinical drugs and links its names to many of the drug vocabularies used in pharmacy management and drug interaction software.) In one or more examples, the data integration and analysis system 102 and at least a portion of the one or more reference information data repositories 112 may be created and maintained by different entities. In one or more further examples, the data integration and analysis system 102 and at least a portion of the one or more reference information data repositories 112 may be created and maintained by a same entity.

The data integration and analysis system 102 may obtain data from at least one of the health insurance claims data repository 106, the molecular data repository 108, the one or more additional data repositories 110, or the reference information data repositories 112 via one or more communication networks accessible to the data integration and analysis system 102 and accessible to at least one of the health insurance claims data repository 106, the molecular data repository 108, the one or more additional data repositories 110, or the reference information data repositories 112. The data integration and analysis system 102 may also obtain data from at least one of the health insurance claims data repository 106, the molecular data repository 108, the one or more additional data repositories 110, or the reference information data repositories 112 via one or more secure communication channels. In addition, the data integration and analysis system 102 may obtain data from at least one of the health insurance claims data repository 106, the molecular data repository 108, the one or more additional data repositories 110, or the reference information data repositories 112 via one or more calls of an application programming interface (API).

The data integration and analysis system 102 may include a data integration system 114. The data integration system 114 may obtain data from the health insurance claims data repository 106 and the molecular data repository 108 to generate the integrated data repository 104. The data integration system 114 may also obtain data from the one or more additional data repositories 110 to generate the integrated data repository 104. In various examples, the data integration system 114 may implement one or more natural language processing techniques to integrate data from the one or more additional data repositories 110 into the integrated data repository 104.

In one or more examples, the data integration system 114 may generate one or more tokens to identify individuals that have data stored in the health insurance claims data repository 106 and that have data stored in the molecular data repository 108. In various examples, the data integration system 114 may generate one or more tokens by implementing one or more hash functions. The data integration system 114 may implement the one or more hash functions to generate the one or more tokens based on information stored by at least one of the health insurance claims data repository 106 or the molecular data repository 108. For example, the information used by the data integration system 114 to generate individual tokens by implementing a hash function may include at least one of an identifier of respective individuals, date of birth of the respective individuals, a postal code of the respective individuals, date of birth of the respective individuals, or a gender of the respective individuals. In one or more illustrative examples, the identifiers of the respective individuals may include a combination of at least a portion of a first name of the respective individuals and at least a portion of the last name of the respective individuals. Tokens generated using data from different data repositories may correspond to the same or similar information or the same or similar type stored by the different data repositories. To illustrate, tokens may be generated using a portion of names of individuals, date of birth, at least a portion of a postal code, and gender obtained from the health insurance claims data repository 106 and the molecular data repository 108.

The data integration system 114 may integrate data from a number of different data sources by analyzing tokens generated by implementing one or more hash functions using data obtained from the number of different data sources. For example, the data integration system 114 may obtain one or more first tokens generated from data stored by the health insurance claims data repository 106 and one or more second tokens generated from data stored by the molecular data repository 108. The data integration system 114 may analyze the one or more first tokens with respect to the one or more second tokens to determine individual first tokens that correspond to individual second tokens. In one or more illustrative examples, the data integration system 114 may identify individual first tokens that match individual second tokens. A first token may match a second token when the data of the first token has at least a threshold amount of similarity with respect to the data of the second token. In one or more examples, a first token may match a second token when the data of the first token is the same as the data of the second token. To illustrate, a first token may match a second token when an alphanumeric string of the first token is the same as an alphanumeric string of the second token.

By determining a first token generated using data stored by the health insurance claims data repository 106 that corresponds to a second token generated using data stored by the molecular data repository 108, the data integration system 114 may identify an individual having data that is stored in both the health insurance claims data repository 106 and in the molecular data repository 108. In this way, the data integration system 114 may obtain data from the health insurance claims data repository 106 from a number of individuals and data from the molecular data repository 108 from the same number of individuals and store the health insurance claims data and the molecular data for the number of individuals in the integrated data repository 104.

The data integration system 114 may also integrate data stored by the one or more additional data repositories 110 with data from the health insurance claims data repository 106 and the molecular data repository 108 to generate the integrated data repository 104. To illustrate, the data integration system 114 may obtain one or more third tokens generated from data stored by an additional data repository 110, such as a data repository storing data corresponding to pathology reports. The data integration system 114 may analyze the one or more third tokens with respect to the first tokens generated using information stored by the health insurance claims data repository 106 and the second tokens generated using information stored by the molecular data repository 108 to determine respective third tokens that correspond to individuals first tokens and individual second tokens. In one or more illustrative examples, the data integration system 114 may identify third tokens generated using one or more hash functions and a common set of information obtained from the health insurance claims data repository 106, the molecular data repository 108, and the additional data repository 110.

By determining a third token generated using data stored by an additional data repository 110 that corresponds to a first token generated using data stored by the health insurance claims data repository 106 and a second token generated using data stored by the molecular data repository 108, the data integration system 114 may identify an individual having data that is stored in the health insurance claims data repository 106, the molecular data repository 108, and in an additional data repository 110. In this way, the data integration system 114 may obtain data from the health insurance claims data repository 106 from a number of individuals and data from the molecular data repository 108 and an additional data repository 110 from the same number of individuals and store the health insurance claims data, the molecular data, and the additional data for the number of individuals in the integrated data repository 104.

The data stored by the integrated data repository 104 for the number of individuals may be accessible using respective identifiers of individuals. The data integration system 114 may implement a number of techniques as part of a de-identification process with respect to storing and retrieving information of individuals in the integrated data repository 104. The identifiers of individuals may correspond to keys that are generated using at least one hash function. The identifiers of the individuals may also be generated by implementing one or more salting processes with respect to the keys generated using the at least one hash function. the tokens generated using one or more hash functions and a common set of information obtained from the health insurance claims data repository 106, the molecular data repository 108, and/or the additional data repository 110. In one or more illustrative examples, the identifiers generated by the data integration system 114 to access information for respective individuals that is stored by the integrated data repository 104 may be unique for each individual. In one or more examples, the identifiers of the individuals may be generated using at least a portion of the information used to generate the tokens related to the individuals. In one or more additional examples, the identifiers of the individuals may be generated using different information from the information used to generate the tokens related to the individuals.

The data integration system 114 may also generate the integrated data repository 104 from a number of different combinations of data repositories in a similar manner. For example, the data integration system 114 may obtain tokens generated from information stored by the health insurance claims data repository 106 and additional tokens generated from information stored by one or more additional data stores 110. The data integration system 114 may determine individual tokens generated from information stored by the health insurance claims data repository 106 that correspond to individual additional tokens generated from information stored by the one or more additional data repositories 110. By determining tokens generated using data stored by the health insurance claims data repository 106 that correspond to additional tokens generated using data stored by an additional data repository 110, the data integration system 114 may identify individuals having data that is stored in both the health insurance claims data repository 106 and in the additional data repository 110. In this way, the data integration system 114 may obtain data from the health insurance claims data repository 106 from a number of individuals and data from the additional data repository 110 from the same number of individuals and store the health insurance claims data and the additional data for the number of individuals in the integrated data repository 104. The health insurance claims data and the additional data stored by the integrated data repository 104 for the number of individuals may be accessible using respective identifiers of individuals.

In one or more further examples, the data integration system 114 may obtain tokens generated from information stored by the molecular data repository 108 and tokens generated from information stored by one or more additional data stores 110. The data integration system 114 may determine individual tokens generated from information stored by the molecular data repository 108 that correspond to individual additional tokens generated from information stored by the one or more additional data repositories 110. By determining tokens generated using data stored by the molecular data repository 108 that correspond to additional tokens generated using data stored by an additional data repository 110, the data integration system 114 may identify individuals having data that is stored in both the molecular data repository 108 and in the additional data repository 110. In this way, the data integration system 114 may obtain data from the molecular data repository 108 from a number of individuals and data from the additional data repository 110 from the same number of individuals and store the molecular data and the additional data for the number of individuals in the integrated data repository 104. The molecular data and the additional data stored by the integrated data repository 104 for the number of individuals may be accessible using respective identifiers of individuals.

The data stored by the integrated data repository 104 may be stored according to one or more regulatory frameworks that protect the privacy and ensure the security of medical records, health information, and insurance information of individuals. For example, data may be stored by the integrated data repository 104 in accordance with one or more governmental regulatory frameworks directed to protecting personal information, such as the Health Insurance Portability and Accountability Act (HIPAA) and/or the General Data Protection Regulation (GDPR). The integrated data repository 104 also stores data in an anonymized and de-identified manner to ensure protection of the privacy of individuals that have data stored by the integrated data repository 104. To further ensure the privacy of individuals that have data stored by the integrated data repository 104, the data integration system 114 may re-generate the integrated data repository 104 periodically. For example, the data integration system 114 may create the integrated data repository 104 once per quarter. In one or more additional examples, the data integration system 114 may generated the integrated data repository 104 on a monthly basis, on a weekly basis, or once every two weeks. By re-generating the integrated data repository 104 on a periodic basis and not simply refreshing the integrated data repository 104 when new data is available, the integrated data repository 104 enhances privacy protection with respect to data stored by the integrated data repository 104. That is, in situations where data repositories are refreshed simply with new data, it may be possible to more easily track individuals associated with data that has been newly added to a data repository because the number of new individuals added at a given time is typically smaller than an existing number of individuals that already have data stored by the data repository.

In various examples, data stored by the integrated data repository 104 may be accessed via a database management system. In addition, the integrated data repository 104 may store data according to one or more database models. In one or more examples, the integrated data repository 104 may store data according to one or more relational database technologies. For example, the integrated data repository 104 may store data according to a relational database model. In one or more additional examples, the integrated data repository 104 may store data according to an object-oriented database model. In one or more further examples, the integrated data repository 104 may store data according to an extensible markup language (XML) database model. In still additional examples, the integrated data repository 104 may store data according to a structured query language (SQL) database model. In still further examples, the integrated data repository may store data according to an image database model.

The data integration system 114 may generate the integrated data repository 104 by generating a number of data tables and creating links between the data tables. The links may indicate logical couplings between the data tables. The data integration system 114 may generate the data tables by extracting specified sets of data from the information obtained from the data repositories 106, 108, 110, 112 and storing the data in rows and columns of respective data tables. In various examples, the logical couplings between data tables may include at least one of a one-to-one link where a row of information in one data table corresponds to a row of information in another data table, a one-to-many link where a row of information in one data table corresponds to multiple rows of information in another data table, or a many-to-many link where multiple rows of information of one data table correspond to multiple rows of information in another data table.

The number of data tables may be arranged according to a data repository schema 116. In the illustrative example of FIG. 1, the data repository schema 114 includes a first data table 118, a second data table 120, a third data table 122, a fourth data table 124, and a fifth data table 124. Although the illustrative example of FIG. 1 includes five data tables, in additional implementations, the data repository schema 116 may include more data tables or fewer data tables. The data repository schema 116 may also include links between the data tables 118, 120, 122, 124, 128. The links between the data tables 118, 120, 122, 124, 126 may indicate that information retrieved from one of the data tables 118, 120, 122, 124, 126 results in additional information stored by one or more additional data tables 118, 120, 122, 124, 126 to be retrieved. Additionally, not all the data tables 118, 120, 122, 124, 126 may be linked to each of the other data tables 118, 120, 120, 122, 124, 126. In the illustrative example of FIG. 1, the first data table 118 is logically coupled to the second data table 118 by a first link 128 and the first data table 118 is logically coupled to the fourth data table 124 by a second link 130. In addition, the second data table 120 is logically coupled to the third data table 122 via a third link 132 and the fourth data table 124 is logically coupled to the fifth data table 126 via a fourth link 134. Further, the third data table 122 is logically coupled to the fifth data table 126 via a fifth link 136.

In various examples, as data tables are added to and/or removed from the data repository schema 116, additional links between data tables may be added to or removed from the data repository schema 116. In one or more illustrative examples, the integrated data repository 104 may store data tables according to the data repository schema 116 for at least a portion of the individuals for which the data integration system 114 obtained information from a combination of at least two of the health insurance claims data repository 106, the molecular data repository 108, the one or more additional data repositories 110, and the one or more reference information data repositories 112. As a result, the integrated data repository 104 may store respective instances of the data tables 118, 120, 122, 124, 126 according to the data repository schema 116 for thousands, tens of thousands, up to hundreds of thousands or more individuals.

The data integration and analysis system 102 may also include a data pipeline system 138. The data pipeline system 138 may include a number of algorithms, software code, scripts, macros, or other bundles of computer-executable instructions that process information stored by the integrated data repository 104 to generate additional datasets. The additional datasets may include information obtained from one or more of the data tables 118, 120, 122, 124, 126. The additional datasets may also include information that is derived from data obtained from one or more of the data tables 118, 120, 122, 124, 126. The components of the data pipeline system 138 implemented to generate a first additional dataset may be different from the components of the data pipeline system 138 used to generate a second additional dataset.

In one or more examples, the data pipeline system 138 may generate a dataset that indicates pharmacy treatments received by a number of individuals. In one or more illustrative examples, the data pipeline system 138 may analyze information stored in at least one of the data tables 118, 120, 122, 124, 126 to determine health insurance codes corresponding to pharmaceutical treatments received by a number of individuals. The data pipeline system 138 may analyze the health insurance codes corresponding to pharmaceutical treatments with respect to a library of data that indicates specified pharmaceutical treatments that correspond to one or more health insurance codes to determine names of pharmaceutical treatments that have been received by the individuals. In one or more additional examples, the data pipeline system 138 may analyze information stored by the integrated data repository 104 to determine medical procedures received by a number of individuals. To illustrate, the data pipeline system 138 may analyze information stored by one of the data tables 118, 120, 122, 124, 126 to determine treatments received by individuals via at least one of injection or intravenously. In one or more further examples, the data pipeline system 138 may analyze information stored by the integrated data repository 104 to determine episodes of care for individuals, lines of therapy received by individuals, progression of a biological condition, or time-to-next-treatment. In various examples, the datasets generated by the data pipeline system 138 may be different for different biological conditions. For example, the data pipeline system 138 may generate a first number of datasets with respect to a first type of cancer, such as lung cancer, and a second number of datasets with respect to a second type of cancer, such as colorectal cancer.

The data pipeline system 138 may also determine one or more confidence levels to assign to information associated with individuals having data stored by the integrated data repository 104. The respective confidence levels may correspond to different measures of accuracy for information associated with individuals having data stored by the integrated data repository 104. The information associated with the respective confidence levels may correspond to one or more characteristics of individuals derived from data stored by the integrated data repository 104. Values of confidence levels for the one or more characteristics may be generated by the data pipeline system 138 in conjunction with generating one or more datasets from the integrated data repository 104. In one or more examples, a first confidence level may correspond to a first range of measures of accuracy, a second confidence level may correspond to a second range of measures of accuracy, and a third confidence level may correspond to a third range of measures of accuracy. In one or more additional examples, the second range of measures of accuracy may include values that are less values of the first range of measures of accuracy and the third range of measures of accuracy may include values that are less than values of the second range of measures of accuracy. In one or more illustrative examples, information corresponding to the first confidence level may be referred to as Gold standard information, information corresponding to the second confidence level may be referred to as Silver standard information, and information corresponding to the third confidence level may be referred to as Bronze standard information.

The data pipeline system 138 may determine values for the confidence levels of characteristics of individuals based on a number of factors. For example, a respective set of information may be used to determine characteristics of individuals. The data pipeline system 138 may determine the confidence levels of characteristics of individuals based on an amount of completeness of the respective set of information used to determine a characteristic for an individual. In situations where one or more pieces of information are missing from the set of information associated with a first number of individuals, the confidence levels for a characteristic may be lower than for a second number of individuals where information is not missing from the set of information. In one or more examples, an amount of missing information may be used by the data pipeline system 138 to determine confidence levels of characteristics of individuals. To illustrate, a greater amount of missing information used to determine a characteristic of an individual may cause confidence levels for the characteristic to be lower than in situations where the amount of missing information used to determine the characteristic is lower. Further, different types of information may correspond to various confidence levels for a characteristic. In one or more examples, the presence of a first piece of information used to determine a characteristic of an individual may result in confidence levels for the characteristic being higher than the presence of a second piece of information used to determine the characteristic.

In one or more illustrative examples, the data pipeline system 138 may determine a number of individuals included in a cohort with a primary diagnosis of lung cancer (or other biological condition). The data pipeline system 138 may determine confidence levels for respective individuals with respect to being classified as having a primary diagnosis of lung cancer. The data pipeline system 138 may use information from a number of columns included in the data tables 118, 120, 122 124, 126 to determine a confidence level for the inclusion of individuals within a lung cancer cohort. The number of columns may include health insurance codes related to diagnosis of biological conditions and/or treatments of biological conditions. Additionally, the number of columns may correspond to dates of diagnosis and/or treatment for biological conditions. The data pipeline system 138 may determine that a confidence level of an individual being characterized as being part of the lung cancer cohort is higher in scenarios where information is available for each of the number of columns or at least a threshold number of columns than in instances where information is available for less than a threshold number of columns. Further, the data pipeline system 138 may determine confidence levels for individuals included in a lung cancer cohort based on the type of information and availability of information associated with one or more columns. To illustrate, in situations where one or more diagnosis codes are present in relation to one or more periods of time for a group of individuals and one or more treatment codes are absent, the data pipeline system 138 may determine that the confidence level of including the group of individuals in the lung cancer cohort is greater than in situations where at least one of the diagnosis codes is absent and the treatment codes used to determine whether individuals are included in the lung cancer cohort are present.

The data integration and analysis system 102 may include a data analysis system 140. The data analysis system 148 may receive integrated data repository requests 142 from one or more computing devices, such as an example computing device 144. The one or more integrated data repository requests 142 may cause data to be retrieved from the integrated data repository 104. In various examples, the one or more integrated data repository requests 142 may cause data to be retrieved from one or more datasets generated by the data pipeline system 138. The integrated data repository requests 142 may specify the data to be retrieved from the integrated data repository 104 and/or the one or more datasets generated by the data pipeline system 138. In one or more additional examples, the integrated data repository requests 142 may include one or more prebuilt queries that correspond to computer-executable instructions that retrieve a specified set of data from the integrated data repository 104 and/or one or more datasets generated by the data pipeline system 138.

In response to one or more integrated data repository requests 142, the data analysis system 140 may analyze data retrieved from at least one of the integrated data repository 104 or one or more datasets generated by the data pipeline system 138 to generate data analysis results 146. The data analysis results 146 may be sent to one or more computing devices, such as example computing device 148. Although the illustrative example of FIG. 1 shows that the one or more integrated data repository requests 142 from one computing device 144 and the data analysis results 146 being sent to another computing device 148, in one or more additional implementations, the data analysis results 146 may be received by a same computing device that sent the one or more integrated data repository requests 142. The data analysis results 146 may be displayed by one or more user interfaces rendered by the computing device 144 or the computing device 148.

In one or more examples, the data analysis system 140 may implement at least one of one or more machine learning techniques or one or more statistical techniques to analyze data retrieved in response to one or more integrated data repository requests 142. In one or more examples, the data analysis system 140 may implement one or more artificial neural networks to analyze data retrieved in response to one or more integrated data repository requests 142. To illustrate, the data analysis system 140 may implement at least one of one or more convolutional neural networks or one or more residual neural networks to analyze data retrieved from the integrated data repository 104 in response to one or more integrated data repository requests 142. In at least some examples, the data analysis system 140 may implement one or more random forests techniques, one or more support vector machines, or one or more Hidden Markov models to analyze data retrieved in response to one or more integrated data repository requests 142.

In one or more illustrative examples, the data analysis system 140 may determine a rate of survival of individuals in which lung cancer is present in response to one or more treatments. In one or more additional illustrative examples, the data analysis system 140 may determine a rate of survival of individuals having one or more genomic region mutations in which lung cancer is present in response to one or more treatments. In various examples, the data analysis system 140 may generate the data analysis results 146 in situations where the data retrieved from at least one of the integrated data repository 104 or the one or more datasets generated by the data pipeline system 138 satisfies one or more criteria. For example, the data analysis system 140 may determine whether at least a portion of the data retrieved in response to one or more integrated data repository requests 142 satisfies a threshold confidence level. In situations where the confidence level for at least a portion of the date retrieved in response to one or more integrated data repository requests 142 is less than a threshold confidence level, the data analysis system 140 may refrain from generating at least a portion of data analysis results 146. In scenarios where the confidence level for at least a portion of the data retrieved in response to one or more integrated data repository requests 142 is at least a threshold confidence level, the data analysis system 140 may generate at least a portion of the data analysis results 146. In various examples, the threshold confidence level may be related to the type of data analysis results 146 being generated by the data analysis system 140.

In one or more illustrative examples, the data analysis system 140 may receive an integrated data repository request 142 to generate data analysis results 146 that indicate a rate of survival of one or more individuals. In these instances, the data analysis system 140 may determine whether the data stored by the integrated data repository 104 and/or by one or more datasets generated by the data pipeline system 138 satisfies a threshold confidence level, such as a Gold standard confidence level. In one or more additional examples, the data analysis system 140 may receive an integrated data repository request 142 to generate data analysis results 146 that indicate a treatment received by one or more individuals. In these implementations, the data analysis system 140 may determine whether the data stored by the integrated data repository 104 and/or by one or more datasets generated by the data pipeline system 138 satisfies a lower threshold confidence level, such as a Bronze standard confidence level.

In one or more additional illustrative examples, the data analysis system 140 may receive an integrated data repository request 142 to determine individuals having one or more genomic mutations and that have received one or more treatments for a biological condition. Continuing with this example, the data analysis system 140 can determine a survival rate of individuals with the one or more genomic mutations in relation to the one or more treatments received by the individuals. The data analysis system 140 can then identify based on the survival rate of individuals an effectiveness of treatments for the individuals in relation to genomic mutations that may be present in the individuals. In this way, health outcomes of individuals may be improved by identifying prospective treatments that may be more effective for populations of individuals having one or more genomic mutations than current treatments being provided to the individuals.

Figure 2:
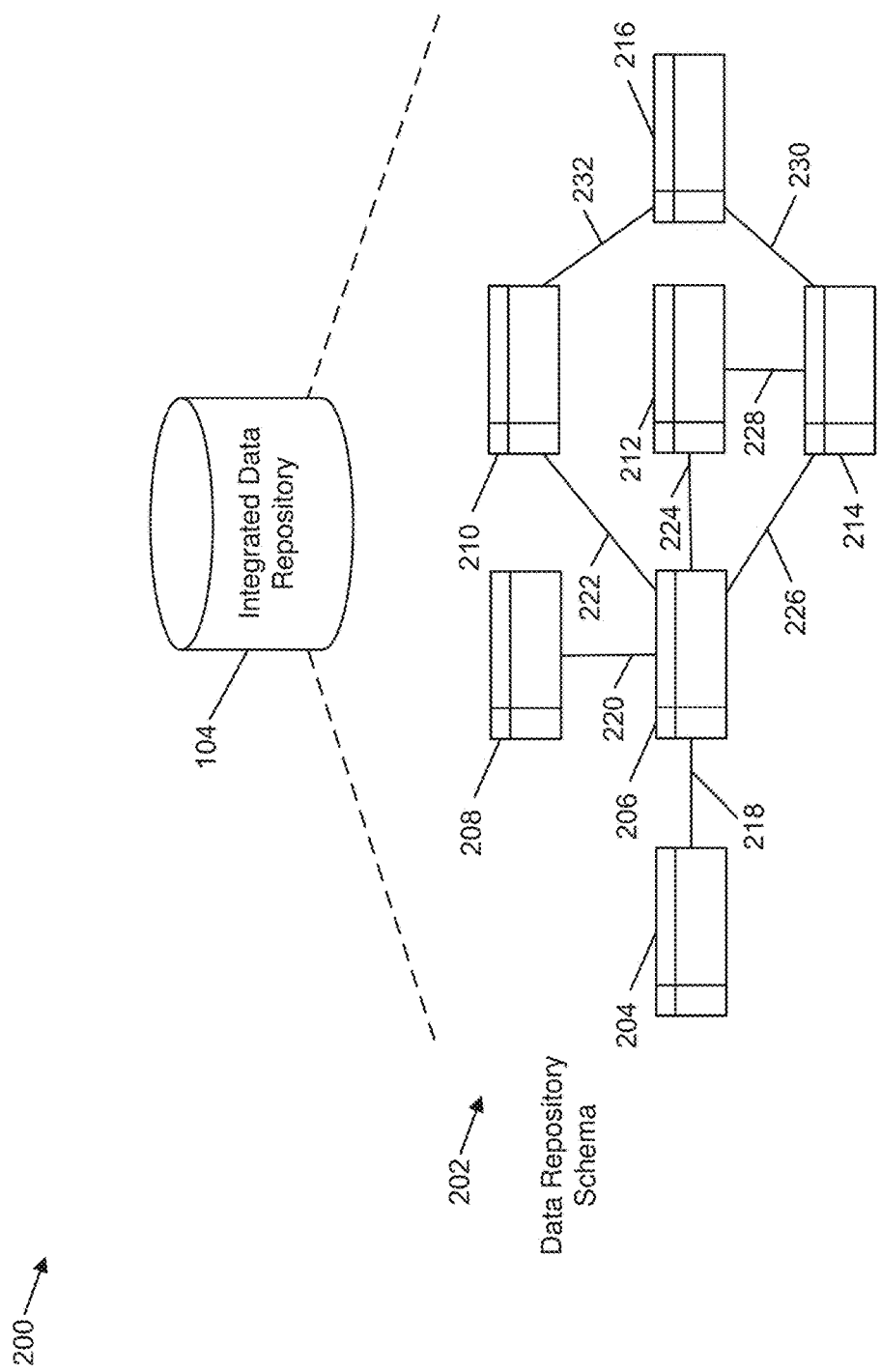
FIG. 2 illustrates an example framework corresponding to an arrangement of data tables in an integrated data repository, according to one or more implementations.

FIG. 2 illustrates an example framework 200 corresponding to an arrangement of data tables in an integrated data repository, according to one or more implementations. In the illustrative example of FIG. 2, the framework 200 includes a data repository schema 202 that includes a first data table 204, a second data table 206, a third data table 208, a fourth data table 210, a fifth data table 212, a sixth data table 214, and a seventh data table 216. Although the illustrative example of FIG. 2 includes seven data tables, in additional implementations, the data repository schema 202 may include more data tables or fewer data tables. The data repository schema 202 may also include links between the data tables 204, 206, 208, 210, 212, 214, 216. The links between the data tables 204, 206, 208, 210, 212, 214, 216 may indicate that information retrieved from one of the data tables 204, 206, 208, 210, 212, 214, 216 results in additional information stored by one or more additional data tables 204, 206, 208, 210, 212, 214, 216 to be retrieved. Additionally, not all the data tables 204, 206, 208, 210, 212, 214, 216 may be linked to each of the other data tables 204, 206, 208, 210, 212, 214, 216. In the illustrative example of FIG. 2, the first data table 204 is logically coupled to the second data table 206 by a first link 218 and the third data table 208 is logically coupled to the second data table 206 by a second link 220. The second data table 206 is also logically coupled to the fourth data table 210 by a third link 222, the second data table 206 is logically coupled to the fifth data table 212 by a fourth link 224, and the second data table 206 is logically coupled to the sixth data table 214 by a fifth link 226. In addition, fifth data table 212 is logically coupled to the sixth data table 214 by a sixth link 228 and the sixth data table 214 is logically coupled to the seventh data table 216 by a seventh link 230. Further, the seventh data table 216 is logically coupled to the fourth data table 210 by an eighth link 232. In various examples, as data tables are added to and/or removed from the data repository schema 202, additional links between data tables may be added to or removed from the data repository schema 202. In one or more illustrative examples, the integrated data repository 104 may store data tables according to the data repository schema 202 for at least a portion of the individuals for which the data integration system 114 obtained information from a combination of at least two of the health insurance claims data repository 106, the molecular data repository 108, and the one or more additional data repositories 110. As a result, the integrated data repository 104 may store respective instances of the data tables 204, 206, 208, 210, 212, 214, 216 according to the data repository schema 204 for thousands, tens of thousands, up to hundreds of thousands or more individuals.

In one or more examples, the first data table 204 may store data corresponding to genomics and genomics testing for individuals. For example, the first data table 204 may include columns that include information corresponding to a panel used to generate genomics data, mutations of genomic regions, types of mutations, copy numbers of genomic regions, coverage data indicating numbers of nucleic acid molecules identified in a sample having one or more mutations, testing dates, and patient information. The first data table 204 may also include one or more columns that include health insurance data codes that may correspond to one or more diagnosis codes. Additionally, the information in first data table 204 may include at least one identifier for an individual that is associated with an instance of the first data table 204.

The second data table 206 may store data related to one or more patient visits by individuals to one or more healthcare providers. The third data table 208 may store information corresponding to respective services provided to individuals with respect to one or more patient visits to one or more healthcare providers indicated by the second data table 206. To illustrate, an individual may visit a healthcare provider and multiple services may be performed with respect to the individual at the visit. A second data table 206 may include columns indicating information for each of the multiple services performed during the patient visit. Multiple third data tables 208 may be generated with respect to the patient visit that include columns indicating information on a more granular level for a respective service provided during the patient visit than the information stored by the second data table 206 related to the patient visit. For example, the second data table 206 may include multiple columns indicating a health insurance code for different services provided to an individual during a patient visit and a third data table 208 related to one of the services may include multiple columns for additional health insurance codes that correspond to additional information related to the respective services. The second data table 206 and the third data table(s) 208 for a patient visit may indicate one or more dates of service corresponding to the patient visit.

The fourth data table 210 may include columns that indicate information about individuals for which information is stored by the integrated data repository 104. For example, the fourth data table 210 may include columns that indicate information related to at least one of a location of an individual, a gender of an individual, a date of birth of an individual, a date of death of an individual (if applicable), or one or more keys associated with the individual. In one or more examples, the fourth data table 210 may include one or more columns related to whether erroneous data has been identified for an individual. In various examples, a single fourth data table 210 may be generated for respective individuals. Thus, the data repository schema 202 may include multiple instances of the fourth data table 210, such as thousands, tens of thousands, up to hundreds of thousands or more.

The fifth data table 212 may include columns that indicate information related to a health insurance company or governmental entity that made payment for one or more services provided to respective individuals. For example, the fifth data table 212 may include one or more payer identifiers. The sixth data table 214 may include columns that include information corresponding to health insurance coverage information for respective individuals. In one or more examples, the sixth data table 214 may include columns indicating the presence of medical coverage for an individual, the presence of pharmacy coverage for an individual, and a type of health insurance plan related to the individual, such as health maintenance organization (HMO), preferred provider organization (PPO), and the like.

The seventh data table 216 may include columns that indicate information related to pharmaceutical treatments obtained by a respective individual. In one or more examples, the seventh data table 216 may include one or more columns indicating health insurance codes corresponding to pharmaceutical treatments that are available via a pharmacy. The health insurance codes may correspond to individual pharmaceutical treatments. Additionally, the health insurance codes may indicate a diagnosis of a biological condition with respect to an individual. The seventh data table 216 may also include additional information, such as at least one of dosage amounts, number of days' supply, quantity dispensed, number of refills authorized, dates of service, or information related to the individual receiving the pharmaceutical treatment.

In various examples, the data repository schema 202 may provide results of analysis of the information stored by the data tables 204, 206, 208, 210, 212, 214, 216 in a more efficient manner than typical data repository schemas. For example, the logical connections between the data tables 204, 206, 208, 210, 212, 214, 216 are arranged to efficiently retrieve data that is related across the different data tables 204, 206, 208, 210, 212, 214, 216. In situations where the data tables 204, 206, 208, 210, 212, 214, 216 are arranged in a serial manner and/or in situations where a greater number of the data tables 204, 206, 208, 210, 212, 214, 216 are logically connected, retrieving data from the integrated data repository 104 from one or more of the data tables 204, 206, 208, 210, 212, 214, 216 to responds to a request for information from the integrated data repository 104 will be less efficient than in situations where the data repository schema 202 is implemented.

Figure 3:
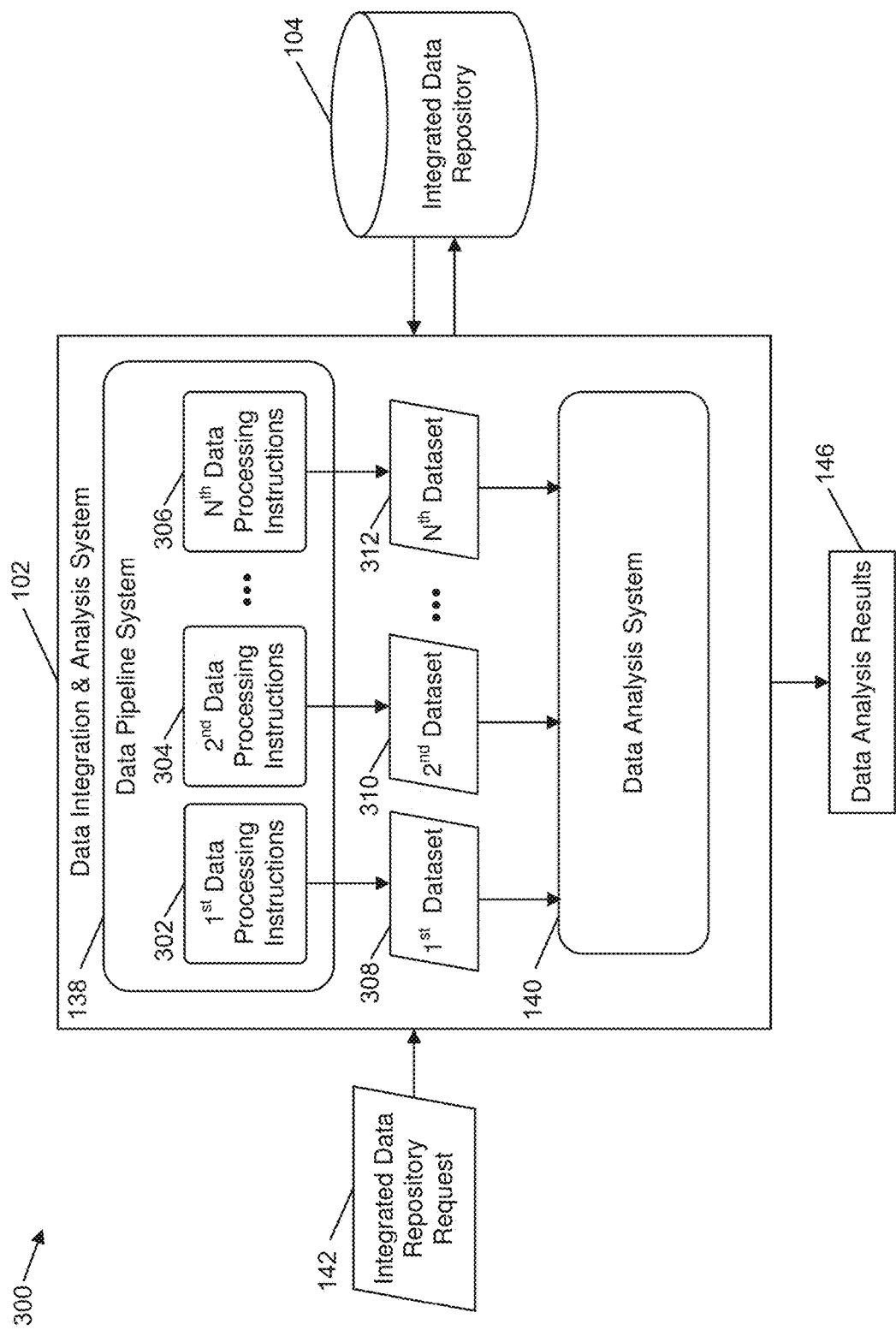
FIG. 3 illustrates an architecture to generate one or more datasets from information retrieved from a data repository that integrates health related data from a number of sources, according to one or more implementations.

FIG. 3 illustrates an architecture 300 to generate one or more datasets from information retrieved from a data repository that integrates health related data from a number of sources, according to one or more implementations. The architecture 300 may include the data integration and analysis system 102 and the integrated data repository 104. Additionally, the data integration and analysis system 102 may include at least the data pipeline system 138 and the data analysis system 140. The data pipeline system 138 may include a number of sets of data processing instructions that are executable to generate respective datasets that may be analyzed by the data analysis system 140 in response to an integrated data repository request 142 to generate data analysis results 146.

The data pipeline system 138 may include first data processing instructions 302, second data processing instructions 304, up to Nth data processing instructions 306. The data processing instructions 302, 304, 306 may be executable by one or more processing units to perform a number of operations to generate respective datasets using information obtained from the integrated data repository 104. In one or more illustrative examples, the data processing instructions 302, 304, 306 may include at least one of software code, scripts, API calls, macros, and so forth. The first data processing instructions 302 may be executable to generate a first dataset 308. In addition, the second data processing instructions 304 may be executable to generate a second dataset 310. Further, the Nth data processing instructions 306 may be executable to generate an Nth dataset 312. In various examples, after the data integration and analysis system 102 generates the integrated data repository 104, the data pipeline system 138 may cause the data processing instructions 302, 304, 306 to be executed to generate the datasets 308, 310, 312. In one or more examples, the datasets 308, 310, 312 may be stored by the integrated data repository 104 or by an additional data repository that is accessible to the data integration and analysis system 102. At least a portion of the data processing instructions 302, 304, 306 may analyze health insurance codes to generate at least a portion of the datasets 308, 310, 312. Additionally, at least a portion of the data processing instructions 302, 304, 306 may analyze genomics data to generate at least a portion of the datasets 308, 310, 312.

In one or more examples, the first data processing instructions 302 may be executable to retrieve data from one or more first data tables stored by the integrated data repository 104. The first data processing instructions 302 may also be executable to retrieve data from one or more specified columns of the one or more first data tables. In various examples, the first data processing instructions 302 may be executable to identify individuals that have a health insurance code stored in one or more column and row combinations that correspond to one or more diagnosis codes. The first data processing instructions 302 may then be executable to analyze the one or more diagnosis codes to determine a biological condition for which the individuals have been diagnosed. In one or more illustrative examples, the first data processing instructions 302 may be executable to analyze the one or more diagnosis codes with respect to a library of diagnosis codes that indicates one or more biological conditions that correspond to respective diagnosis codes. The library of diagnosis codes may include hundreds up to thousands of diagnosis codes. The first data processing instructions 302 may also be executable to determine individuals diagnosed with a biological condition by analyzing timing information of the individuals, such as dates of treatment, dates of diagnosis, dates of death, one or more combinations thereof, and the like.

The second data processing instructions 304 may be executable to retrieve data from one or more second data tables stored by the integrated data repository 104. The second data processing instructions 304 may also be executable to retrieve data from one or more specified columns of the one or more second data tables. In various examples, the second data processing instructions 304 may be executable to identify individuals that have a health insurance code stored in one or more column and row combinations that correspond to one or more treatment codes. The one or more treatment codes may correspond to treatments obtained from a pharmacy. In one or more additional examples, the one or more treatment codes may correspond to treatments received by a medical procedure, such as an injection or intravenously. The second data processing instructions 304 may be executable to determine one or more treatments that correspond to the respective health insurance codes included in the one or more second data tables by analyzing the health insurance code in relation to a predetermined set of information. The predetermined set of information may include a data library that indicates one or more treatments that correspond to one out of hundreds up to thousands of health insurance codes. The second data processing instructions 304 may generate the second dataset 310 to indicate respective treatments received by a group of individuals. In one or more illustrative examples, the group of individuals may correspond to the individuals included in the first dataset 308. The second dataset 310 may be arranged in rows and columns with one or more rows corresponding to a single individual and one or more columns indicating the treatments received by the respective individual.

The Nth processing instructions 306 (where N may be any positive integer) may be executable to generate the Nth dataset 312 by combining information from a number of previously generated datasets, such as the first dataset 308 and the second dataset 310. In addition, the Nth processing instructions 306 may be executable to generate the Nth dataset 312 to retrieve additional information from one or more additional columns of the integrated data repository 104 and incorporate the additional information from the integrated data repository 104 with information obtained from the first dataset 308 and the second dataset 310. For example, the Nth processing instructions 306 may be executable to identify individuals included in the first dataset 308 that are diagnosed with a biological condition and analyze specified columns of one or more additional data tables of the integrated data repository 104 to determine dates of the treatments indicated in the second dataset 210 that correspond to the individuals included in the first dataset 308. In one or more further examples, the Nth processing instructions 306 may be executable to analyze columns of one or more additional data tables of the integrated data repository 104 to determine dosages of treatments indicated in the second dataset 310 received by the individuals included in the first dataset 308. In this way, the Nth processing instructions 306 may be executable to generate an episodes of care dataset based on information included in a cohort dataset and a treatments dataset.

In one or more illustrative examples, in response to receiving an integrated data repository request 142, the data analysis system 140 may determine one or more datasets that correspond to the features of the query related to the integrated data repository request 142. For example, the data analysis system 140 may determine that information included in the first dataset 308 and the second dataset 310 is applicable to responding to the integrated data repository request 142. In these scenarios, the data analysis system 140 may analyze at least a portion of the data included in the first dataset 308 and the second dataset 310 to generate the data analysis results 146. In one or more additional examples, the data analysis system 140 may determine different datasets to respond to different queries included in the integrated data repository request 142 in order to generate the data analysis results 146.

The use of specific sets of data processing instructions to generate respective data sets may reduce the number of inputs from users of the data integration and analysis system 102 as well as reduce the amount of processing resources and memory utilized to process integrated data repository requests 142. For example, without the specific architecture of the data pipeline system 138, each time an integrated data repository request 142 is received, the data utilized to respond to the integrated data repository request 142 is assembled from the data repository 104. In contrast, by implementing the data pipeline system 138 to execute the data processing instruction 302, 304, 306 to generate the datasets 308, 310, 312, the data needed to respond to various integrated data repository requests 142 has already been assembled and may be accessed by the data analysis system 140 to respond to the integrated data repository request 142. Thus, the computing resources used to respond to the integrated data repository request 142 by implementing the data pipeline system 138 to generate the datasets 308, 310, 312 are less than typical systems that perform an information parsing and collecting process for each integrated data repository request 142. Further, in situations where the data pipeline system 138 has not been implemented, users of the data integration and analysis system 102 may need to submit multiple integrated data repository request 142 in order to analyze the information that the users are intending to have analyzed either because the ad hoc collection of data to respond to an integrated data repository request 142 in typical systems is inaccurate or because the data analysis system 140 is called upon multiple times to perform an analysis of information in typical systems that may be performed using a single integrated data repository request 142 when the data pipeline system 138 is implemented.

Figure 4:
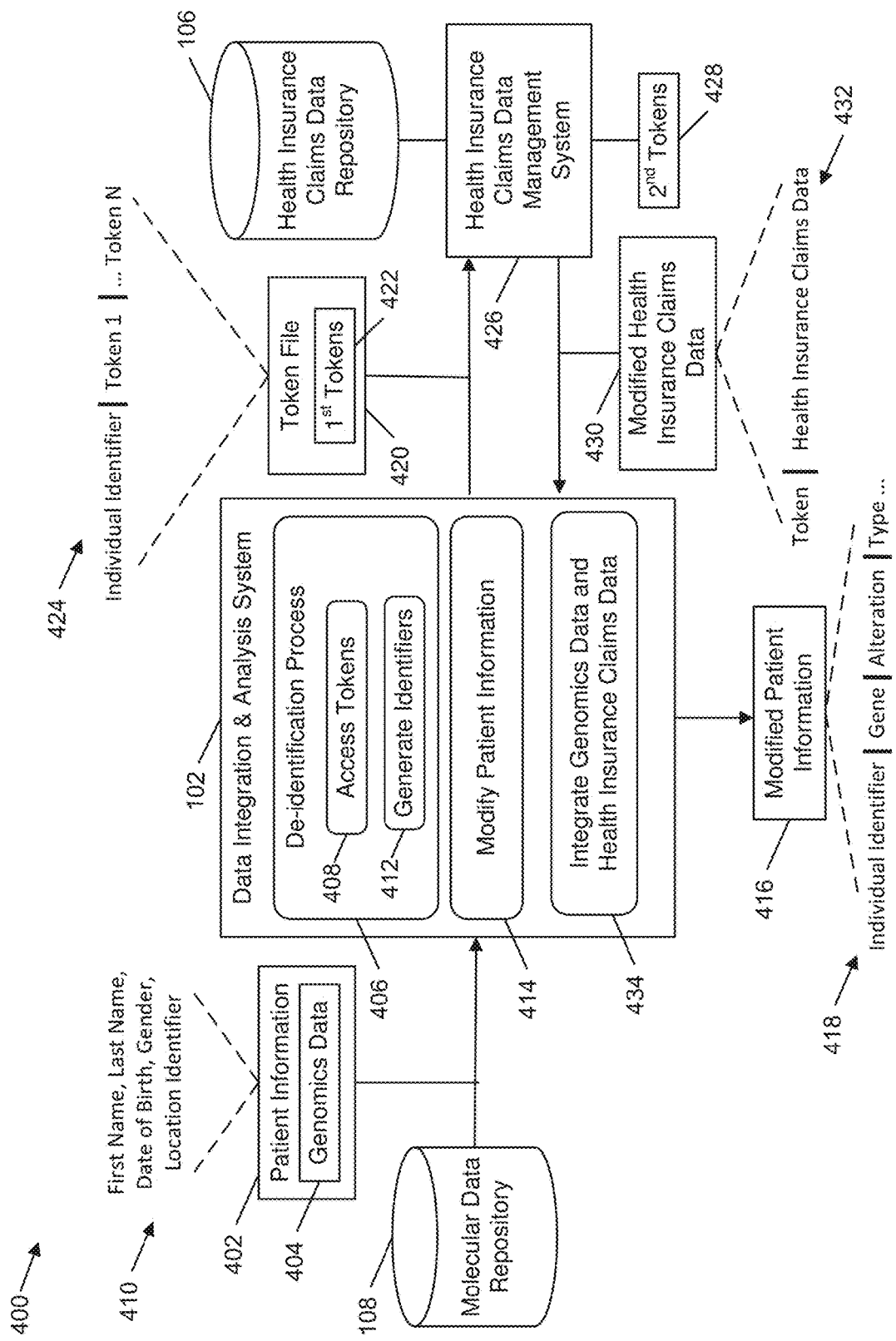
FIG. 4 illustrates an architecture to generate an integrated data repository that includes de-identified health insurance claims data and de-identified genomics data, according to one or more implementations.

FIG. 4 illustrates an architecture 400 to generate an integrated data repository that includes de-identified health insurance claims data and de-identified genomics data it, according to one or more implementations. The architecture 400 may include the data integration and analysis system 102, the health insurance claims data repository 106, and the molecular data repository 108. The data integration and analysis system 102 may obtain patient information 402 from the molecular data repository 108. The patient information 402 may include genomics data 404 for individuals having data stored by the molecular data repository 108. The genomics data 404 may indicate results of one or more nucleic acid sequencing operations that analyze sequences of nucleic acid molecules included in a sample obtained from the individuals with respect to one or more target genomic regions. In one or more examples, the sample may be obtained from tissue of one or more individuals. In one or more additional examples, the sample may be obtained from fluid of one or more individuals, such as blood or plasma. The one or more target genomic regions may correspond to genomic regions that correspond to the presence of one or more biological conditions. For example, the target regions may correspond to genomic regions of a reference genome having mutations that are present in individuals in which a biological condition is present. In one or more illustrative examples, the target regions may correspond to genomic regions of a reference human genome in which one or more mutations are present in individuals in which one or more forms of cancer are present. The patient information 402 may also include information indicating personal information about individuals with data stored by the molecular data repository 108 and information corresponding to the testing and analysis performed on samples provided by individuals.

The data integration and analysis system 102 may perform a de-identification process 406 that anonymizes personal information obtained from the molecular data repository 108. The data integration and analysis system 102 may implement one or more computational techniques as part of the de-identification process to anonymize data related to individuals stored by the molecular data repository 108 such that the de-identified data protects the privacy of the individuals and is in compliance with one or more privacy regulation frameworks. The de-identification process 406 may include, at 408, accessing tokens. In various examples, the tokens may comprise an alphanumeric string of characters. In one or more examples, the tokens may be generated by the data integration and analysis system 102. In one or more additional examples the tokens may be generated by a third-party and obtained by the data integration and analysis system 102.

The tokens may be generated using one or more hash functions in relation to a subset 410 of the patient information 402. To illustrate, for individuals that have information stored by the molecular data repository 108, the tokens may be generated using a combination of at least a portion of a first name of the respective individuals, at least a portion of the last name of the respective individuals, at least a portion of a date of birth of the respective individuals, a gender of the individuals, and at least a portion of a location identifier of the respective individuals. The de-identification process 406 may also include, at 412, generating identifiers for individuals that have data stored by the molecular data repository 108. The identifiers may be generated by the data integration and analysis system 102 using one or more hash functions that are different from the one or more hash functions used to generate the tokens. In one or more illustrative examples, the data integration and analysis system 102 may generate an intermediate version of respective identifiers using one or more hash function and then apply one or more salting techniques to the intermediate versions of the identifiers to generate final versions of the identifiers. A salt function comprises a function configured to add at least one random bit to each intermediate identifier to generate a respective final identifier. In various examples, the data integration and analysis system 102 may generate the identifiers at 412 using at least a portion of the information for respective individuals stored by the molecular data repository 108. In one or more illustrative examples, the identifiers may be generated based on a patient identifier included in the patient information 402. The identifiers generated by the data integration and analysis system 102 may be unique for respective individuals having data stored by the molecular data repository 108.

At operation 414, the data integration and analysis system 102 may generate modified patient information 416 based on the identifiers. The modified patient information 416 may include genomics data 404 related to individuals associated with the molecular data repository 108 and the identifiers of the respective individuals. The modified patient information 416 may have a data structure 418. The data structure 418 may include a column that includes respective identifiers of individuals associated with the molecular data repository 108 and a number of columns that include genomics data 404 related to the individuals, such as identifiers of one or more genes, alterations to the one or more genes, type of alteration to the genes, and so forth.

The data integration and analysis system 102 may generate a token file 420. The token file 420 may include first tokens 422 accessed at operation 408 for respective individuals having data stored by the molecular data repository 108. The token file 420 may have a data structure 424 that includes a number of columns that include information for respective individuals. The data structure 424 may include a column indicating respective identifiers generated by the data integration and analysis system 102 and columns indicating one or more first tokens 422 associated with the respective identifiers. The data integration and analysis system 102 may send the token file 420 to a health insurance claims data management system 426 that is coupled to the health insurance claims data repository 106. The health insurance claims data management system 426 may analyze the first tokens 422 with respect to corresponding second tokens 428. The second tokens 428 may be accessed by or generated by the health insurance claims data management system 426. The second tokens 428 may be generated using a same or similar subset of information for individuals having data stored in the health insurance claims data repository 106 as the subset 410 of the patient information 402. For example, the second tokens 428 may be generated using a combination of at least a portion of a first name of the respective individuals, at least a portion of the last name of the respective individuals, at least a portion of a date of birth of the respective individuals, a gender of the individuals, and at least a portion of a location identifier of the respective individuals.

In various examples, the health insurance claims data management system 426 may retrieve health insurance claims data from the health insurance claims data repository 106 for individuals associated with respective second tokens 428 that match corresponding first tokens 422. A first token 422 may match a second token 428 when the data of the first token 422 has at least a threshold amount of similarity with respect to the data of the second token 428. In one or more examples, a first token 422 may match a second token 428 when the data of the first token 422 is the same as the data of the second token 428.

In response to identifying health insurance claims data for individuals having respective second tokens 428 that correspond to a respective first token 422, the health insurance claims data management system 426 may generate modified health insurance claims data 430. The health insurance claims data management system 426 may send the modified health insurance claims data 430 to the data integration and analysis system 102. In one or more examples, the modified health insurance claims data 430 may be formatted according to a data structure 432. The data structure 432 may include a column that includes a subset of the second tokens 428 that correspond to the first tokens 422 and a number of columns that include the health insurance claims data.

At operation 434, the data integration and analysis system 102 may integrate genomics data and health insurance claims data of individuals that are common to both the molecular data repository 108 and the health insurance claims data repository 106. The data integration and analysis system 102 may determine individuals that are common to both the molecular data repository 108 and the health insurance claims data repository 106 by determining genomics data and health insurance claims data corresponding to common tokens. The data integration and analysis system 102 may determine that a first token 422 related to a portion of the genomics data 404 corresponds to a second token 428 related to a portion of the health insurance claims data by determining a measure of similarity between the first token 422 and the second token 428. In scenarios where the first token 422 has at least a threshold amount of similarity with respect to the second token 428, the data integration and analysis system 102 may store the corresponding portion of the genomics data 404 and the corresponding portion of the health insurance claims data in relation to the identifier of the individual in an integrated data repository, such as the integrated data repository 104 of FIG. 1, FIG. 2, and FIG. 3.

The implementation of the architecture 400 may implement a cryptographic protocol that enables de-identified information from disparate data repositories to be integrated into a single data repository. In this way, the security of the data stored by the integrated data repository 104 is increased. Additionally, the cryptographic protocol implemented by the architecture 400 may enable more efficient retrieval and accurate analysis of information stored by the integrated data repository 104 than in situations where the cryptographic protocol of the architecture 400 is not utilized. For example, by generating a token file 420 that includes first tokens 422 using a cryptographic technique based on a specified set of information stored by the molecular data repository 104 and utilizing second tokens 428 generated using a same or similar cryptographic technique with respect to the similar or same set of information stored by the health insurance claims data repository 106, the data integration and analysis system 102 may match information stored by disparate data repositories that correspond to a same individual. Without implementing the cryptographic protocol of the architecture 400, the probability of incorrectly attributing information from one data repository to one or more individuals increases, which decreases the accuracy of results provided by the data integration and analysis system 102 in response to integrated data repository requests 142 sent to the data integration and analysis system 102.

Figure 5:
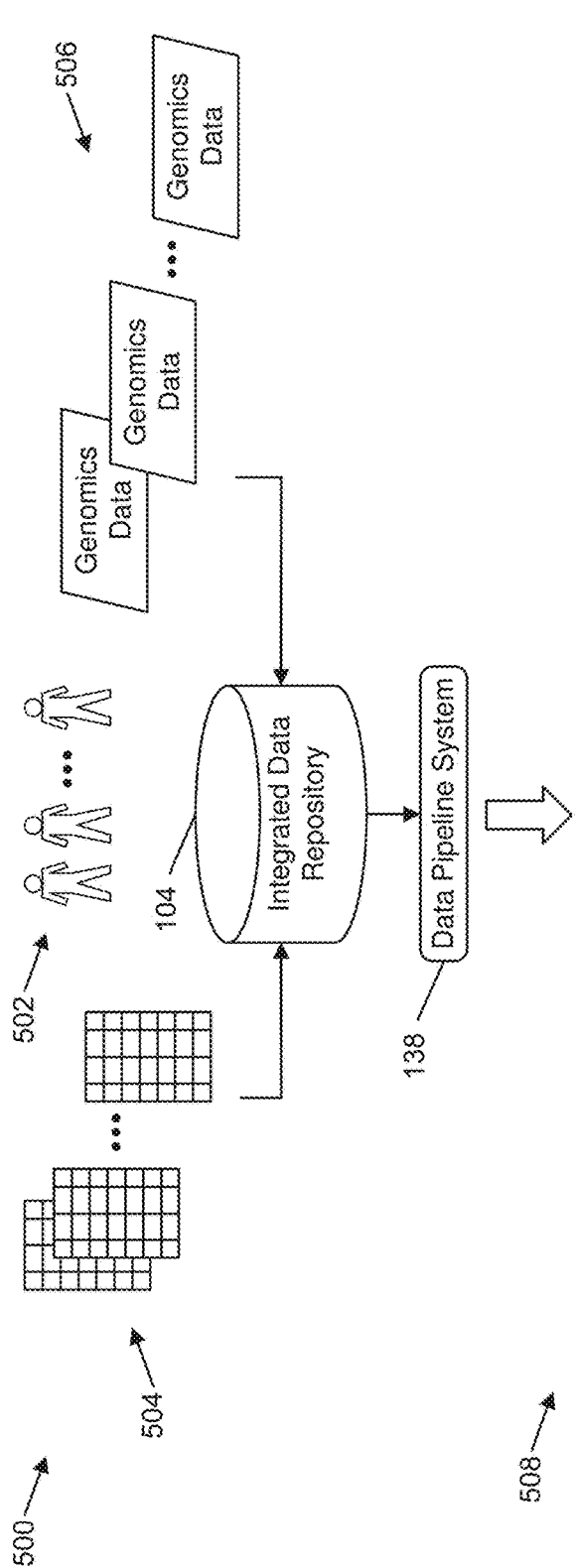
FIG. 5 illustrates a framework to generate a dataset, by a data pipeline system, based on data stored by an integrated data repository, according to one or more implementations.

FIG. 5 illustrates a framework 500 to generate a dataset, by a data pipeline system 138, based on data stored by an integrated data repository 104, according to one or more implementations. The integrated data repository 104 may store health insurance claims data and genomics data for a group of individuals 502. For example, the integrated data repository 104 may store information obtained from health insurance claims records 504 of the group of individuals 502. For each individual included in the group of individuals 502, the integrated data repository 104 may store information obtained from multiple health insurance claim records 504. In various examples, the information stored by the integrated data repository 104 may include and/or be derived from thousands, tens of thousands, hundreds of thousands, up to millions of health insurance claims records 504 for a number of individuals. Additionally, each health insurance claim record may include multiple columns. As a result, the integrated data repository 104 may be generated through the analysis of millions of columns of health insurance claims data.

Further, although the health insurance claims data may be organized according to a structured data format, health insurance claims data is typically arranged to be viewed by health insurance providers, patients, and healthcare providers in order to show financial information and insurance code information related to services provided to individuals by healthcare providers. Thus, health insurance claims data is not easily analyzed to gain insights that may be available in relation to characteristics of individuals in which a biological condition is present and that may aid in the treatment of the individuals with respect to the biological condition. The integrated data repository 104 may be generated and organized by analyzing and modifying raw health insurance claims data in a manner that enables the data stored by the integrated data repository 104 to be further analyzed to determine trends, characteristics, features, and/or insights with respect to individuals in which one or more biological conditions may be present. For example, health insurance codes may be stored in the integrated data repository 104 in such a way that at least one of medical procedures, biological conditions, treatments, dosages, manufacturers of medications, distributors of medications, or diagnoses may be determined for a given individual based on health insurance claims data for the individual. In various examples, the data integration and analysis system 102 may generate and implement one or more tables that indicate correlations between health insurance claims data and various treatments, symptoms, or biological conditions that correspond to the health insurance claims data. Further, the integrated data repository 104 may be generated using genomics data records 506 of the group of individuals 502. In various examples, the large amounts of health insurance claims data may be matched with genomics data for the group of individuals 502 to generate the integrated data repository 104.

By integrating the genomics data records 506 for the group of individuals 502 with the health insurance claims records 504, the data integration and analysis system 102 may determine correlations between the presence of one or more biomarkers that are present in the genomics data records 506 with other characteristics of individuals that are indicated by the health insurance claims data records 506 that existing systems are typically unable to determine. For example, the data integration and analysis system 102 may determine one or more genomic characteristics of individuals that correspond to treatments received by individuals, timing of treatments, dosages of treatments, diagnoses of individuals, smoking status, presence of one or more biological conditions, presence of one or more symptoms of a biological condition, one or more combinations thereof, and the like. Based on the correlations determined by the data integration and analysis system 102 using the integrated data repository 104, cohorts of individuals that may benefit from one or more treatments may be identified that would not have been identified in existing systems. In one or more examples, the processes and techniques implemented to integrate the health insurance claims records 504 and the genomics claims records 506 in order to generate the integrated data repository 104 may be complex and implement efficiency-enhancing techniques, systems, and processes in order to minimize the amount of computing resources used to generate the integrated data repository 104.

In one or more illustrative examples, the data pipeline system 138 may access information stored by the integrated data repository 104 to generate datasets that include a number of additional data records 508 that include information related to at least a portion of the group of individuals 502. In the illustrative example of FIG. 5, the additional data record 508 includes information indicating whether individuals are included in a cohort of individuals in which lung cancer is present. The data pipeline system 138 may execute a plurality of different sets of data processing instructions to determine a cohort of the group of individuals 502 in which lung cancer is present. In various examples, the additional data record 508 may indicate information used to determine a status of an individual 502 with respect to lung cancer, such as one or more transaction insurance identifier, one or more international classification of diseases (ICD) codes, and one or more health insurance transaction dates. In addition to including a column that indicates whether an individual 502 is included in the lung cancer cohort, the additional data record 508 may include a column indicating a confidence level of the status of the individual 502 with respect to the presence of lung cancer.

Figure 6A:
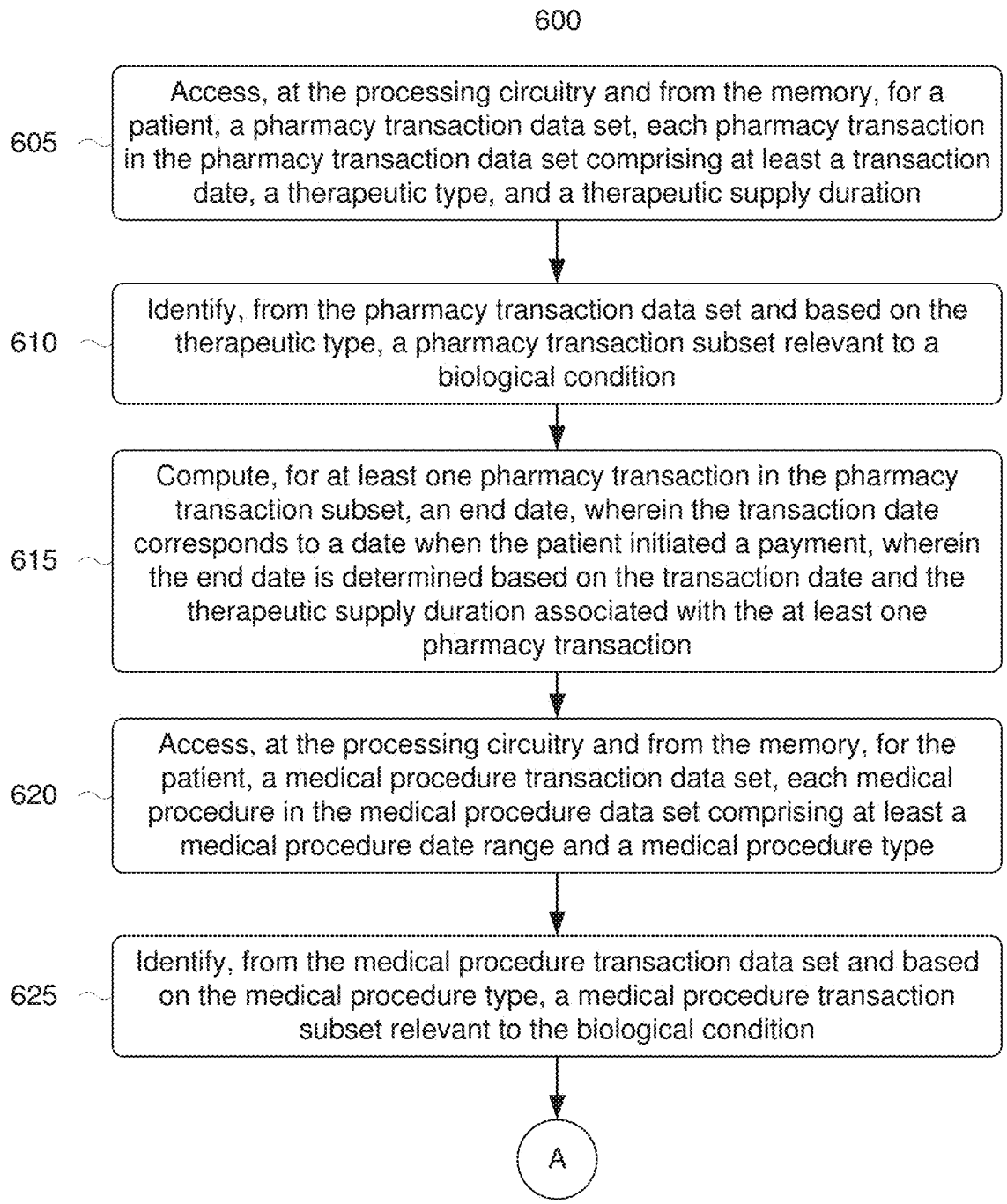
FIGS. 6A-6B illustrate a flowchart of an example process associated with determining lines of therapy, according to one or more implementations.
Figure 6B:
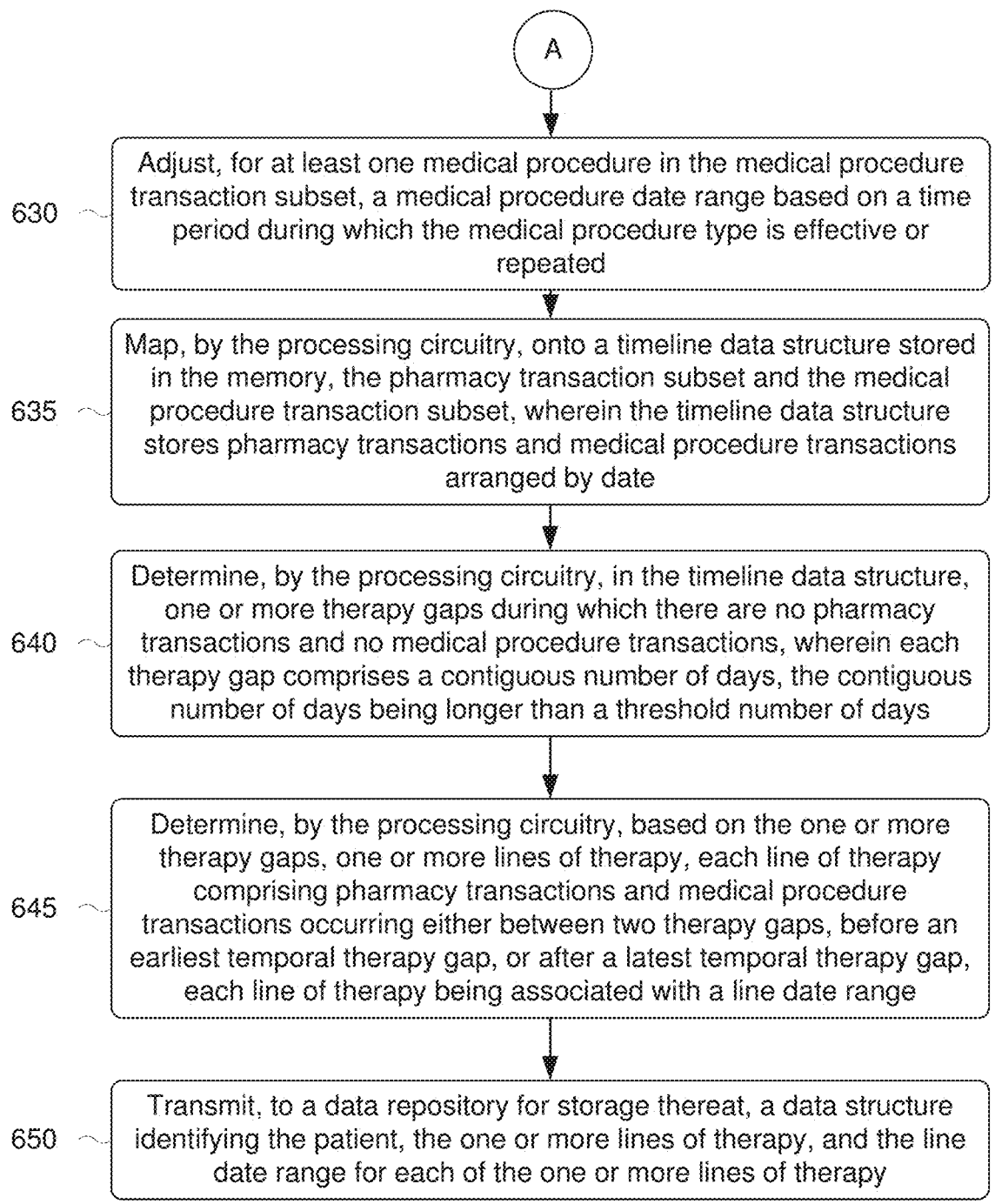

FIGS. 6A-6B illustrate a flowchart of an example process 600 associated with determining lines of therapy. In some implementations, one or more process blocks of FIGS. 6A-6B may be performed by a computing machine (e.g., computing device 900 of FIG. 8) that includes processing circuitry (e.g., processor 904) and memory (e.g., main memory 906, static memory 908, or storage device 918). In some implementations, one or more process blocks of FIGS. 6A-6B may be performed by another device or a group of devices separate from or including the computing machine. Additionally, or alternatively, one or more process blocks of FIGS. 6A-6B may be performed by one or more components of the computing device 900, such as processor 904, main memory 906, static memory 908, network interface device 922, sensor(s) 924, display unit 912, alpha numeric input device 914, user interface (UI) navigation device 916, storage device 918, signal generation device 920, and output controller 930.

As shown in FIG. 6A, process 600 may include accessing, at the processing circuitry and from the memory, for a patient, a pharmacy transaction data set. Each pharmacy transaction in the pharmacy transaction data set may comprise at least a transaction date, a therapeutic type, and a therapeutic supply duration (block 605). For example, the computing machine may access, at the processing circuitry and from the memory, for a given patient, a pharmacy transaction data set. In one or more examples, the pharmacy transaction data set may include one or more data tables that include health records of a plurality of individuals. The health records may include medical information that is obtained in relation to visits by the plurality of individuals to one or more clinical settings. In at least some examples, the one or more clinical settings may include facilities that are used to conduct clinical trials research. In one or more additional examples, the one or more clinical settings may include facilities that are used primarily to provide care to individuals diagnosed with, at risk of contracting, or suspected of having a biological condition. In one or more illustrative examples, the pharmacy transaction data set may include one or more data tables that include health insurance claims data of a plurality of individuals. The health insurance claims data may include health insurance codes. The health insurance codes may indicate treatments received by a patient. In one or more illustrative examples, the health insurance codes may include pharmaceutical treatments received by the patients. To illustrate, the health insurance codes may indicate a National Drug Code (NDC) that corresponds to a pharmaceutical treatment received by the patient. In one or more additional illustrative examples, the pharmacy transaction data set may include information obtained from one or more electronic medical records. The electronic medical records may include imaging information, laboratory test results, diagnostic test information, clinical observations, dental health information, notes of healthcare practitioners, medical history forms, diagnostic request forms, medical procedure order forms, medical information charts, one or more combinations thereof, and so forth.

In various examples, the pharmaceutical treatment may include an ingestible form of a pharmaceutical substance that is provided to the patient in the treatment of a biological condition. For example, the pharmaceutical treatment may include one or more pills or other form of a pharmaceutical substance that is ingestible by mouth by a patient. In addition, the pharmaceutical treatment may include an inhalable form of the therapeutic agent. In one or more examples, the pharmacy transaction data may indicate a number of times per day that the pharmaceutical treatment is to be provided to the patient. In one or more further examples, the pharmacy transaction data may indicate a dosage of a pharmaceutical treatment, such as a number of milligrams of the pharmaceutical treatment. The therapeutic supply duration may correspond to an amount of time that a patient is to receive a pharmaceutical treatment. To illustrate, the therapeutic supply duration may indicate a number of days, a number of weeks, or a number of months that the pharmaceutical treatment is to be provided to the patient. In at least some examples, the therapeutic type may indicate that a pharmaceutical treatment is an antineoplastic or an immunotherapy.

The transaction date included in the pharmacy transaction data set may indicate a date that a claim was paid for a given pharmacy transaction. For example, the transaction date may indicate a date that a health insurance provider and/or a patient paid for a pharmaceutical treatment for a biological condition. In one or more additional examples, the transaction date may correspond to a date that a patient received a pharmaceutical treatment. To illustrate, the transaction date may indicate a date that a prescription for a pharmaceutical treatment was filled or a date that an amount of a pharmaceutical treatment was picked up from a provider of the pharmaceutical treatment by the patient.

As further shown in FIG. 6A, process 600 may include identifying, from the pharmacy transaction data set and based on the therapeutic type, a pharmacy transaction subset relevant to a biological condition (block 610). For example, the computing machine may identify, from the pharmacy transaction data set and based on the therapeutic type, a pharmacy transaction subset relevant to a biological condition, as described above. In one or more illustrative examples, the pharmacy transaction subset may include pharmacy transactions that correspond to one or more categories of chemotherapy provided to a patient. In various examples, one or more therapeutics may be excluded from the pharmacy transaction data set. In one or more examples, patients being treated for a biological condition may receive a number of different types of treatments for the biological condition. To illustrate, a patient may receive one or more primary treatments that are meant to directly treat the biological condition and one or more additional treatments that are intended to indirectly treat the biological condition and/or that are intended to treat side effects that are caused by the one or more primary treatments. In one or more illustrative examples, a patient being treated for cancer may receive one or more chemotherapy pharmaceutical treatments and one or more steroids, such as one or more glucocorticoids. In these scenarios, the pharmacy transaction subset may include the one or more chemotherapy pharmaceutical treatments and exclude the one or more steroids.

As further shown in FIG. 6A, process 600 may include computing, for at least one pharmacy transaction in the pharmacy transaction subset, an end date. The end date may be determined based on the transaction date and the therapeutic supply duration associated with the at least one pharmacy transaction (block 615). For example, the computing machine may compute, for at least one pharmacy transaction in the pharmacy transaction subset, an end date. In one or more examples, the end date for a therapeutic treatment may be determined based on the number of days supply of a therapeutic treatment added to the transaction date indicated by the pharmacy transaction data set.

As further shown in FIG. 6A, process 600 may include accessing, at the processing circuitry and from the memory, for the patient, a medical procedure transaction data set. Each medical procedure in the medical procedure data set may include at least a medical procedure date range and a medical procedure type (block 620). For example, the computing machine may access, at the processing circuitry and from the memory, for the patient, a medical procedure transaction data set. The medical procedure transaction data set may include one or more data tables that indicate medical procedures obtained by a patient for treatment of a biological condition. In one or more examples, the medical procedure transaction data set may include a number of health records of a patient. In one or more illustrative examples, the medical procedure transaction data may include health insurance claims data for a patient that include health insurance codes that correspond to medical procedures. In various examples, the procedure transaction data set may include one or more healthcare common procedure coding system (HCPCS) codes that correspond to medical procedures obtained by a patient in the course of treatment for a biological condition. In one or more examples, the medical procedures obtained by a patient may include procedures that provide one or more therapeutic agents to a patient. For example, a patient may receive one or more injections of one or more therapeutic agents to treat a biological condition. Additionally, a patient may receive one or more intravenous infusions of one or more therapeutic agents.

The medical procedure date range included in the medical procedure transaction data may indicate a period of time over which a medical procedure was performed. In at least some instances, the medical procedure date range may indicate that the medical procedure was performed over a single day. In one or more additional examples, the medical procedure date range may indicate that the medical procedure was performed over a number of days. The medical procedure type included in the medical procedure transaction data may indicate a category related to a given medical procedure. In one or more examples, the medical procedure type may correspond to medical procedures performed by a physician, such as surgeries, medical devices provided to patients, pathology services provided to patients, radiology services provided to patients, administration of therapeutic agents to patients, and so forth.

As further shown in FIG. 6A, process 600 may include identifying, from the medical procedure transaction data set and based on the medical procedure type, a medical procedure transaction subset relevant to the biological condition (block 625). In one or more examples, the medical procedure transaction subset may include medical procedure transactions that correspond to one or more specified health insurance codes. In one or more illustrative examples, a patient being treated for cancer may have medical procedure transactions that correspond to radiological procedures, radiation procedures, surgical procedures, chemotherapy procedures, orally administered medication procedures, one or more combinations thereof, and the like. In various examples, to determine one or more lines of therapy provided to a patient, the medical procedure transaction data set may be analyzed with respect to one or more criteria to determine medical procedure transactions that correspond to one or more lines of therapy. In various examples, the medical procedure transaction subset may include medical procedure transactions that correspond to one or more health insurance codes that correspond to chemotherapy treatments and/or non-orally administered medications, such as medications delivered by injection or delivered intravenously. Additionally, at least some health insurance codes may be excluded from the medical procedure transaction subset. To illustrate, when determining a line of therapy for a patient being treated for cancer, medical procedure transactions having health insurance codes that correspond to radiation treatment, surgeries, and/or radiological services may be excluded.

As shown in FIG. 6B, process 600 may include adjusting, for at least one medical procedure in the medical procedure transaction subset, a medical procedure date range based on a time period during which the medical procedure type is effective or repeated (block 630). In one or more examples, a medical procedure may be associated with a period of time that the medical procedure is effective in treating a biological condition. The period of time may be determined based on information obtained from individuals that previously received the medical procedure. In addition, at least some medical procedures may be repeated over a period of time at a given frequency. The frequency at which the medical procedure is performed and the overall period of time that the medical procedure is performed by be based on one or more therapeutic agents delivered during the medical procedure. For example, in scenarios where a medical procedure includes an injection of a therapeutic agent and/or intravenous administration of a therapeutic agent, the medical procedure data range may correspond to the dosage of the therapeutic agent. In various examples, the medical procedure date range may correspond to a period of time between two instances of medical procedure being administered. In one or more additional examples, the medical procedure data range may correspond to a period of time over which a series of instances of the medical procedure being administered.

As further shown in FIG. 6B, process 600 may include mapping onto a timeline data structure stored in the memory, the pharmacy transaction subset and the medical procedure transaction subset, wherein the timeline data structure stores pharmacy transactions and medical procedure transactions arranged by date (block 635). In one or more examples, the timeline data structure may include one or more data tables that indicate one or more first periods of time over which one or more pharmacy treatments are provided to a patient and one or more second periods of time over which one or more medical treatments are provided to the patient. In one or more illustrative examples, the timeline data structure may indicate a first period of time that a patient received an initial supply of a first pharmaceutical treatment and two refills of the first pharmaceutical treatment. The timeline data structure may also indicate a second period of time that the patient received an initial supply and one refill of a second pharmaceutical treatment. In one or more further examples, the timeline data structure may indicate a third period of time over which a medical procedure was administered with respect to the patient. In at least some examples, at least one of the first period of time, the second period of time, or the third period of time overlap.

As further shown in FIG. 6B, process 600 may include determining in the timeline data structure, one or more therapy gaps during which there are no pharmacy transactions and no medical procedure transactions, wherein each therapy gap comprises a contiguous number of days, the contiguous number of days being longer than a threshold number of days (block 640). In one or more examples, a therapy gap with respect to therapeutic agents may include a number of days between the end of a supply of a therapeutic agent and a time when a new supply of the therapeutic agent was obtained by the patient or prescribed for the patient. In one or more additional examples, a therapy gap with respect to a medical procedure may correspond to a number of days between a first instance of the medical procedure being performed and a second instance of the medical procedure being performed. In at least some examples, a therapy gap may be identified without being able to determine the number of days of the therapy gap. In these scenarios, an imputed therapy gap may be determined based on a therapy gap for previous patients that have obtained the same therapy. In one or more illustrative examples, the imputed therapy gap corresponds to a median therapy gap for patients that previously obtained the same treatment. In one or more additional examples, the imputed therapy gap may be determined based on therapy gaps of patients that previously obtained a number of different therapies. To illustrate, health insurance data of at least a subset of individuals that received a number of different treatments may be analyzed to determine a median therapy gap for patients that previously received a number of different treatments. In various examples, the number of different treatments may be related to treatment of a given biological condition. To illustrate, the number of different treatments may be related to treatment of one or more cancers.

As further shown in FIG. 6B, process 600 may include determining based on the one or more therapy gaps, one or more lines of therapy, each line of therapy comprising pharmacy transactions and medical procedure transactions occurring either between two therapy gaps, before an earliest temporal therapy gap, or after a latest temporal therapy gap, each line of therapy being associated with a line date range (block 645). In one or more examples, individual lines of therapy may indicate one or more periods of time that a pharmaceutical treatment was obtained by a patient. In at least some examples, the pharmaceutical treatment may be obtained for a first period of time and a second period of time with a gap between the first period of time and the second period of time that is less than a threshold gap. An individual line of therapy may also include a medical procedure that is provided to a patient for one or more periods of time. The one or more periods of time that the medical procedure is performed with respect to the patient may overlap with a period of time that a pharmaceutical treatment is provided to the patient. In one or more additional examples, the one or more periods of time that the medical procedure is performed with respect to the patient may be within a treatment interval of the pharmaceutical treatment. In one or more illustrative examples, a patient being treated for a biological condition may be provided with a line of therapy that includes at least one of an ingestible pharmaceutical treatment or an inhalable pharmaceutical treatment in addition to at least one of an injection of a therapeutic agent or an intravenous dose of a therapeutic agent.

In one or more examples, a patient may receive multiple lines of therapy. Additional lines of therapy may be identified in response to determining a change in the treatment provided to an individual after a first line of therapy ends. In various examples, the end of a line of therapy may be identified based on determining that a treatment different from an initial treatment was provided to a patient more than a threshold therapy gap after a last treatment of the initial line of therapy. For example, a patient may receive a first pharmaceutical treatment as part of a first line of therapy. The patient may receive one or more doses of the first pharmaceutical treatment. In at least some examples, there may be a therapy gap between two doses of the first pharmaceutical treatment that is less than a threshold therapy gap. After more than a threshold amount of time since the last dose of the first pharmaceutical treatment, the patient may receive a second pharmaceutical treatment that is different from the first pharmaceutical treatment. The patient may receive one or more doses of the second pharmaceutical treatment. In one or more illustrative examples, the patient may receive a medical procedure as part of the first line of therapy or as part of the second line of therapy.

As further shown in FIG. 6B, process 600 may include transmitting, to a data repository for storage thereat, a data structure identifying the patient, the one or more lines of therapy, and the line date range for each of the one or more lines of therapy (block 650). In one or more examples, the data repository may store lines of therapy for a number of patients. In one or more illustrative examples, the data repository may store lines of therapy for hundreds of patients, for thousands of patients, up to tens of thousands of patients or more. In various examples, the lines of therapy for one or more cohorts of patients may be analyzed to determine an effectiveness of a treatment for the cohort of individuals. In one or more additional examples, the lines of therapy for one or more cohorts may be analyzed in conjunction with genomic data for individuals to determine an effectiveness of a treatment for patients having one or more genomic mutations. In one or more further examples, the effectiveness of treatments for patients that have previously undergone a pharmacy treatment and/or a medical procedure with regard to the treatment of a biological condition may be analyzed in conjunction with a genomic profile of the patients to determine a treatment for patients newly diagnosed with the biological condition based on the genomic profile of the new patients.

Process 600 may include additional implementations, such as any single implementation or any combination of implementations described below and/or in connection with one or more other processes described elsewhere herein.

In some implementations, process 600 includes determining, within a single line of therapy, a first pharmacy transaction or medical procedure associated with a first biological condition stage and a second pharmacy transaction or medical procedure associated with a second biological condition stage, wherein a start date associated with the second pharmacy transaction or medical procedure is later than a start date associated with the first pharmacy transaction or medical procedure, and dividing the single line of therapy into two lines of therapy using the start date associated with the second pharmacy transaction.

In some implementations, the processing circuitry comprises a plurality of multithreaded graphics processing units (GPUs). The patient is one of multiple patients. The one or more lines of therapy for the patient are determined in parallel, using parallel threads of the plurality of multithreaded GPUs, with determining lines of therapy for other patients from among the multiple patients.

In some implementations, determining the lines of therapy for the multiple patients comprises generating multiple intermediate tables. Each of the multiple intermediate tables is stored in the data repository for reviewing and adjusting the performance of the one or more computing machines. In one or more implementations, multiple intermediate tables may increase a computing speed in relation to determining the lines of therapy for the multiple patients by storing intermediate computation results.

For at least one medical procedure transaction in the medical procedure transaction subset, the medical procedure date range includes a single date. At least one medical procedure transaction is mapped onto the timeline data structure based on the single date. In one or more additional examples, for at least one medical procedure transaction in the medical procedure transaction subset, the medical procedure date range includes a medical procedure start date and a medical procedure end date. At least one medical procedure transaction is mapped onto the timeline data structure based on the medical procedure start date and the medical procedure end date.

Further, pharmacy transactions from the pharmacy transaction subset are mapped onto the timeline data structure based on the transaction date. At least one pharmacy transaction is mapped onto the timeline data structure based on the transaction date and the end date. The threshold number of days may be determined based on a condition type of the biological condition.

In some implementations, the therapeutic type is a National Drug Code (NDC) classification. The pharmacy transaction dataset includes one or more tables. The process 600 further includes determining a set of columns in the one or more tables related to drugs, parsing the set of columns to identify NDC classifications, determining a set of the NDC classifications that correspond to drugs, and identifying a subset of the set of NDC classifications that correspond to drugs. The subset is associated with drugs related to the biological condition. The process 600 further includes identifying rows in the one or more tables for placement into the pharmacy transaction subset based on the group of NDC classifications related to the biological condition.

Although FIGS. 6A-6B show example blocks of process 600, in some implementations, process 600 may include additional blocks, fewer blocks, different blocks, or differently arranged blocks than those depicted in FIGS. 6A-6B. Additionally, or alternatively, two or more of the blocks of process 600 may be performed in parallel.

Figure 7A:
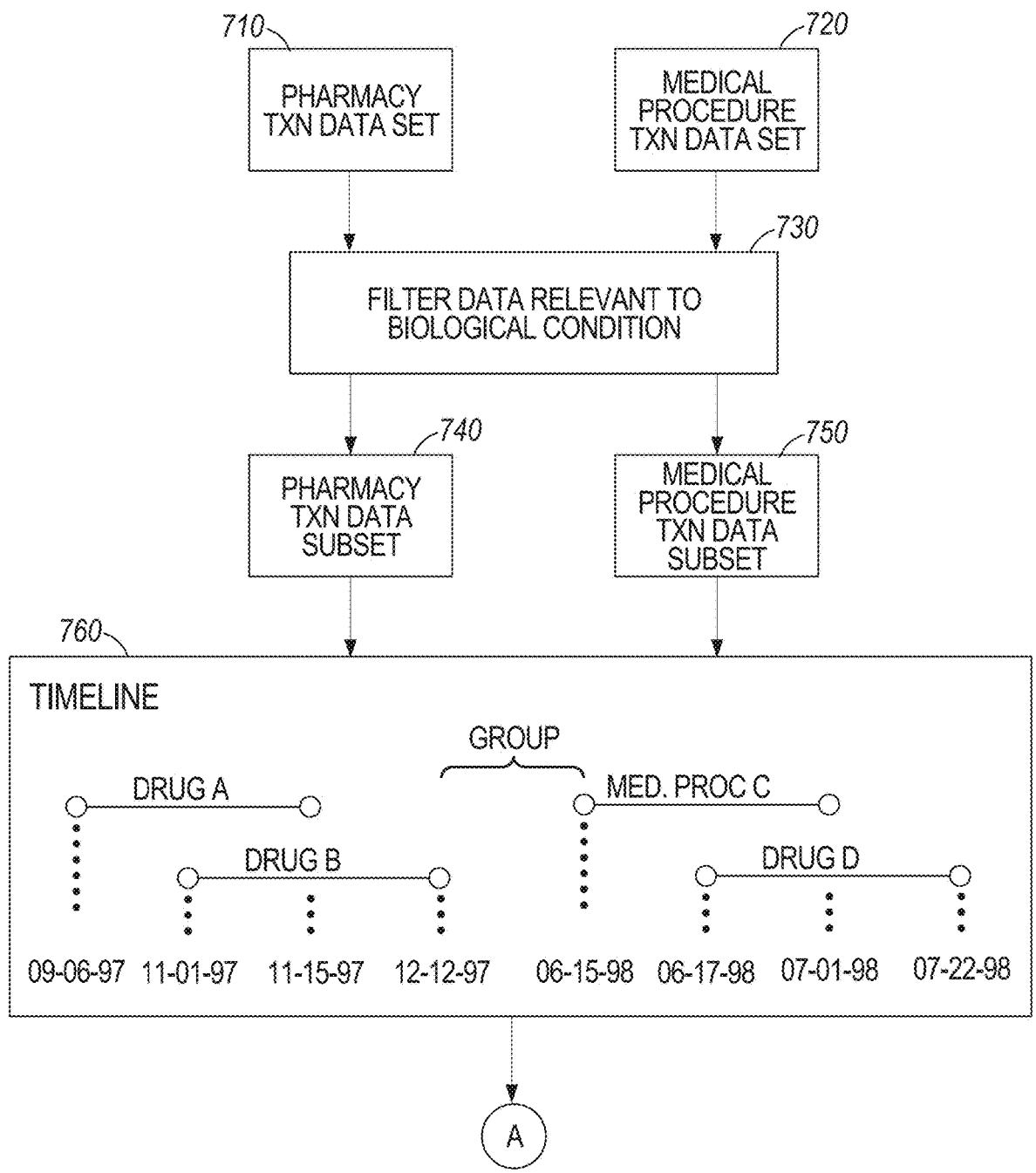
FIGS. 7A-7B are a data flow diagram of an example process to determine lines of therapy from pharmacy transaction data and medical procedure transaction data, according to one or more implementations.
Figure 7B:
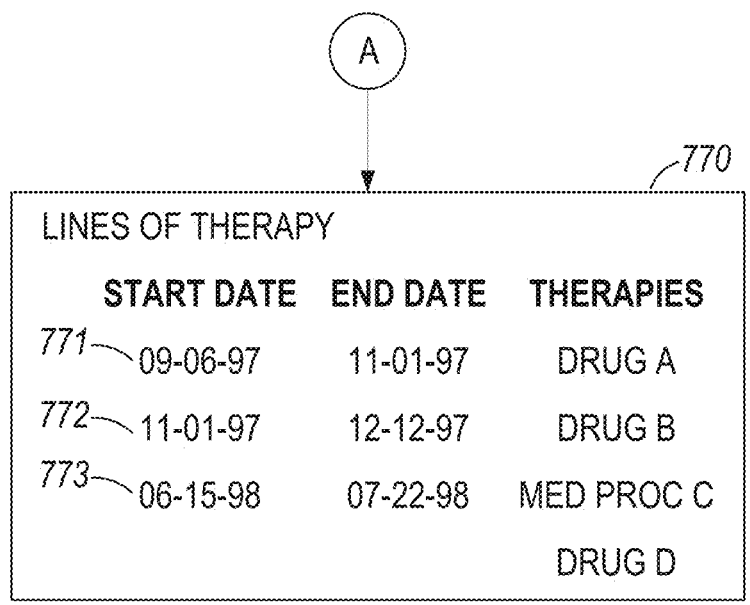

FIGS. 7A-7B are a data flow diagram of an example process 700 to determine lines of therapy from pharmacy transaction data and medical procedure transaction data, according to one or more implementations. The process 700 may be implemented at a computing machine (e.g., computing device 900) that includes processing circuitry and memory.

As shown in FIG. 7A, in the process 700, the computing machine accesses a pharmacy transaction (txn) data set 710 and a medical procedure transaction data set 720 for a patient who has (e.g., based on a formal or informal diagnosis or a machine prediction) a biological condition. The pharmacy transaction data set 710 and/or the medical procedure transaction data set 720 may reside within the health insurance claims data repository 106, shown in FIG. 1. Alternatively, the pharmacy transaction data set 710 and the medical procedure transaction data set 720 may reside in separate data repositories. In some cases, the data from the health insurance claims data repository 106 is provided to the computing machine in an anonymized manner. Affirmative consent from patients is always obtained before sharing any patient data that is not anonymized or that can be used to identify an individual patient with his/her medical data.

At block 730, the computing machine filters data relevant to the biological condition from the pharmacy transaction data set 710 and the medical procedure transaction data set 720, respectively, to yield the pharmacy transaction data subset 740 and the medical procedure transaction data subset 750. In the filtering of block 730, the transactions that are not relevant to the biological condition are removed to yield the subsets of transactions that are relevant to the biological condition in blocks 740 and 750. The filtering of block 730 may be done based on drug codes (e.g., NDC classifications) or procedure codes (e.g., Healthcare Common Procedure Coding System (HCPCS) classifications) that are known to be relevant or irrelevant to the biological condition. The known codes may be stored in a table or list data structure or data repository that is consulted by the computing machine. For example, if the biological condition is lung cancer, then the filtering of block 730 may cause a pharmacy transaction from the pharmacy transaction data set 710 representing a purchase of a lung cancer drug to be placed into the pharmacy transaction data subset 740. However, a pharmacy transaction from pharmacy transaction data set 710 representing an influenza vaccination might not be placed into the pharmacy transaction data subset 740 (assuming that influenza vaccination is not related to lung cancer).

According to some embodiments, a data repository accessible to the computing machine stores a list (or other data structure) of NDC or HCPCS codes related to different biological conditions (e.g., lung cancer, breast cancer, liver cancer, and the like) or collections of biological conditions (e.g., all cancers). The stored list of codes may be determined based on one or more of RxNorm and National Comprehensive Cancer Network (NCCN) clinical practice guidelines for oncology. A person (or artificial intelligence engine) may review the NCCN guidelines and identify NDC or HCPCS codes that are relevant to different biological conditions or collections of biological conditions.

As illustrated in FIG. 7A, a timeline data structure 760 is generated, by the computing machine, from the pharmacy transaction data subset 740 and/or the medical procedure transaction data subset 750. (It should be noted that the timeline shown in the timeline data structure 760 is not drawn to scale.) As shown, the timeline data structure 760 indicates that the patient took Drug A between 09-06-97 (date in month-day-year format) and 11-15-97. This may be determined because, for example, the patient purchased enough supply of Drug A on 09-06-97 to last until 11-15-97. The timeline data structure 760 also indicates that the patient took Drug B between 11-01-97 and 12-12-97. Between 12-12-97 and 06-15-98, there is a gap where no pharmacy or medical procedure transactions related to the biological condition were recorded. The patient underwent Medical Procedure C (Med. Proc. C) between 06-15-98 and 07-01-98. Also, the patient took Drug D between 06-17-98 and 07-22-98.

Based on the timeline data structure 760, as shown in FIG. 7B, lines of therapy 770 are identified. The lines of therapy 770 and/or the timeline data structure 760 may be provided as a visual output via a graphical user interface (GUI) on a display coupled to the computing machine. Alternatively, the lines of therapy 770 and/or the timeline data structure 760 may be transmitted to one or more data repositories (e.g., integrated data repository 104) for storage thereat.

As shown, each line of therapy from among the lines of therapy 770 is associated with a start date, an end date, and therapies (e.g., drugs, medical procedure visits, and medical procedures). As shown, line of therapy 771 has a start date of 09-06-97 and an end date of 11-01-97, and includes Drug A. Line of therapy 772 has a start date of 11-01-97 and an end date of 12-12-97, and includes Drug B. Line of therapy 773 has a start date of 06-15-98 and an end date of 07-22-98, and includes Medical Procedure C and Drug D.

The computing machine determined that lines of therapy 771/772 and 773 are distinct because the gap between 12-12-97 and 06-15-98 exceeds a predefined minimum gap size (e.g., 30 days or 60 days). The predefined minimum gap size may be set by a researcher depending on the amount of confidence that the researcher needs to determine that different therapies are associated with different lines. For example, if a high amount of confidence is desirable, a minimum gap size of 90 days may beset. If a low amount of confidence is acceptable, a minimum gap size of 7 days may be set.

However, it should be noted that there is no gap between line of therapy 771 representing Drug A and line of therapy 772 representing Drug B. In fact, as shown in the timeline data structure 760, Drug A and Drug B appear to overlap from 11-01-97 until 11-15-97. The distinction between line of therapy 771 for Drug A and line of therapy 772 for Drug B may be made because Drug A and Drug B may be associated with different stages of the biological condition. For example, Drug A may be associated with Stage II Cancer and Drug B may be associated with Stage III Cancer. Based on this intelligence, which may be stored in the memory of the computing machine or in a data repository coupled with the computing machine, the computing machine may determine that, on 11-01-97, it was determined (e.g., by a medical professional) that the patient's cancer had progressed from Stage II to Stage III and, thus, the patient was switched from Drug A to Drug B. It is likely that the patient did not take Drug A anymore after 11-01-97, as it was not useful in treating the current stage of cancer. (While the patient obtained (e.g., from a pharmacy) supply of Drug A from 11-01-97 until 11-15-97, the patient did not use this supply.) Based on this information, the computing machine assigned line of therapy 771, associated with Drug A, the dates of 09-06-97 through 11-01-97. The computing machine assigned line of therapy 772, associated with Drug B (and not Drug A), the dates of 11-01-97 through 12-12-97.

In some embodiments, the computing machine first uses the gap between 12-12-97 and 06-15-98 in the timeline data structure 760 to separate lines of therapy 771/772 and line of therapy 773. Then, the line of therapy 771 is identified as distinct from the line of therapy 772 by the computing machine determining that Drug A and Drug B are associated with different cancer stages. The start date for Drug A of 09-06-97 is earlier than the start date of Drug B of 11-01-97. Thus, the line of therapy 771 for Drug A is assigned the dates between 09-06-97 and 11-01-97. A different line of therapy 772 for only Drug B is assigned the dates from the start date of Drug B (11-01-97) until the end date for Drug B (12-12-97).

In some cases, the intermediate lines of therapy (e.g., combination of lines of therapy 771/772) are stored in an intermediate table. A user of the computing machine may inspect the intermediate table(s) that are generated to verify that the process 700 is working correctly and/or to modify the thresholds or the intelligence that are used in the process 700. For example, if the user determines that Drug A and Drug B might have been taken together (based on the medical knowledge that existed in 1997) then the lines of therapy 771/772 may be combined into a single line of therapy with both Drug A and Drug B. Alternatively, if the minimum gap size is set to 240 days, then the lines of therapy 772/773 could be combined into a single line of therapy between 11-01-97 and 07-22-98 which includes Drug B, Medical Procedure C, and Drug D. The gap shown in the timeline data structure 760 between 12-12-97 and 06-15-98 is 185 days long.

In addition to the above, other data may also be useful in identifying lines of therapy. For example, if a patient's pharmacy transaction data subset 740 indicates that the patient purchased a 30-day supply of Drug E on 02-01-01, where Drug E is for Stage III Cancer, and the patient was hospitalized (based on the medical procedure transaction data subset 750) from 02-15-01 until 04-15-01, then the hospitalization might be assigned a different line of therapy than the use of Drug E, because Drug E was not provided to the patient in the hospital. In other words, there would be a first line of therapy for Drug E from 02-01-01 until 02-15-01, and a second line of therapy for the hospitalization from 02-15-01 until 04-15-01.

In addition to providing useful information for users of the computing machine who may wish to tailor the threshold values or intelligence used in the process 700, the intermediate tables may increase a computing speed of determining lines of therapy for multiple patients in parallel by storing intermediate computation results. In some embodiments, the intermediate tables may store intermediate results of calculations. These intermediate results could be used for different types of calculations, such as statistical or machine learning-based calculations. Storing the data in the intermediate tables may increase the computing speed because the stored data may accelerate the statistical or machine learning-based calculations.

Some embodiments are described herein with the biological condition being cancer or lung cancer. However, it should be noted that the technology described herein may be used in conjunction with any other biological condition, for example, Alzheimer's, Arthritis, Influenza, and the like.

Figure 7C:
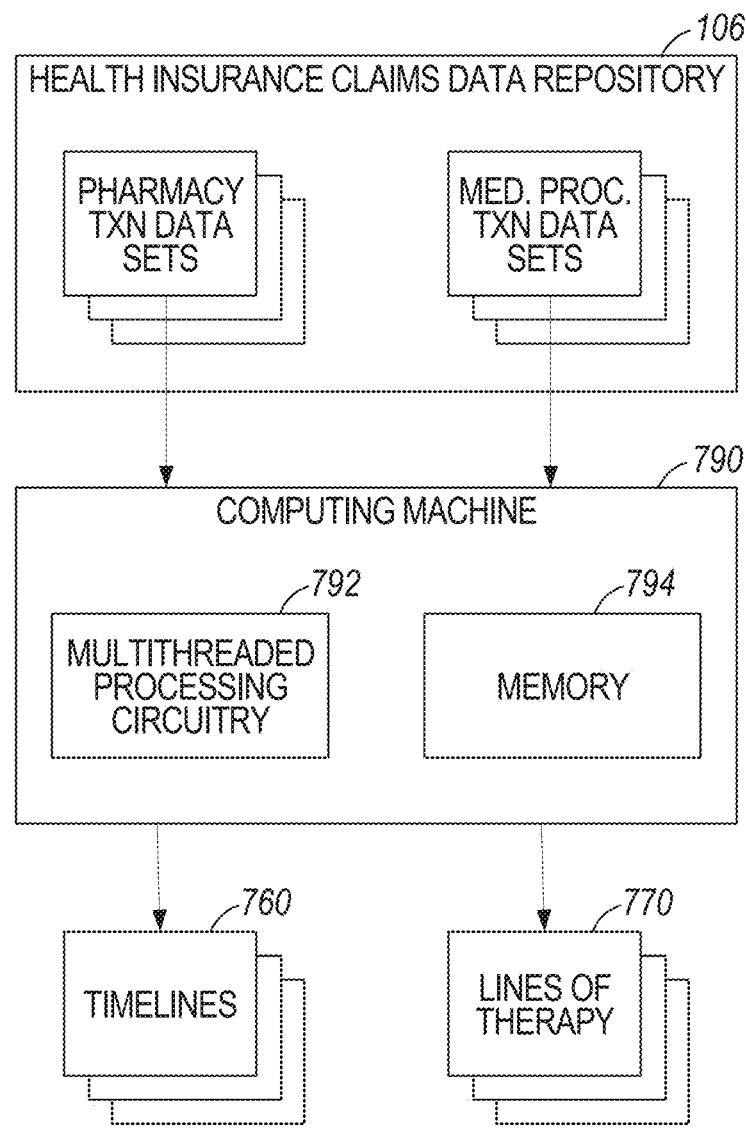
FIG. 7C illustrates an example system for determining lines of therapy, according to one or more implementations.

FIG. 7C illustrates an example system 700C for determining lines of therapy, according to one or more implementations. As shown in FIG. 7C, the health insurance claims data repository 106 includes multiple pharmacy transaction data sets 710 and multiple medical procedure transaction data sets 720 for multiple patients. A computing machine 790 accesses the pharmacy transaction data sets 710 and the medical procedure transaction data sets 720 for the multiple patients. The computing machine 790 may include all or a portion of the components of the computing device 900.

As shown, the computing machine 790 includes multithreaded processing circuitry 792 and memory 794. The multithreaded processing circuitry 792 may include one or more multithreaded graphics processing units (GPUs) and/or one or more multithreaded central processing units (CPUs). The multithreaded processing circuitry 792, by executing instructions from the memory 794, processes, in parallel, the multiple pharmacy transaction data sets 710 and multiple medical procedure transaction data sets 720 for the multiple patients (e.g., as described in conjunction with FIGS. 6A-6B and 7A-7B). The computing machine 790 outputs the generated timelines 760 and lines of therapy 770 for the multiple patients. The generated timelines 760 and/or lines of therapy 770 may be stored in the integrated data repository 104, as shown in FIG. 1. Alternatively, these data structures may be stored in another data repository and/or provided as visual output to a user of the computing machine 790.

Using the architecture of the system 700C, health insurance claims data for multiple patients may be processed in parallel, greatly increasing the processing speed at which the output (e.g., timelines 760 and/or lines of therapy 770) is generated.

Figure 8:
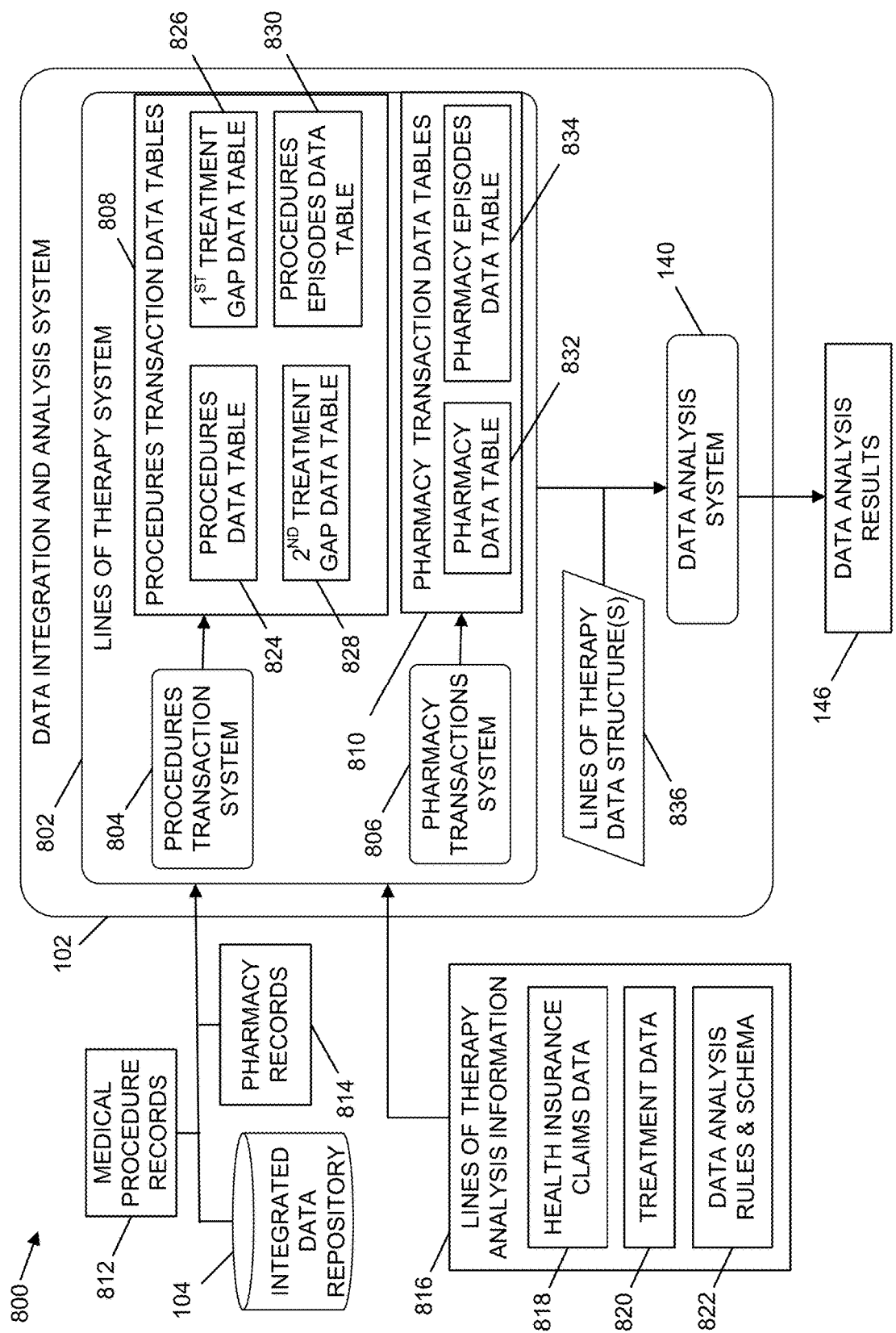
FIG. 8 illustrates a computing architecture having one or more systems to generate lines of therapy that may be analyzed to determine outcomes for patients, according to one or more implementations.

FIG. 8 illustrates a computing architecture 800 having one or more systems to generate lines of therapy that may be analyzed to determine outcomes for patients, according to one or more implementations. The architecture 800 may include the data integration and analysis system 102 and the integrated data repository 104 described with respect to FIGS. 1-5. In addition, the data integration and analysis system 102 may include a lines of therapy system 802. The lines of therapy system 802 may analyze data obtained from the integrated data repository 104 to determine lines of therapy for one or more patients. A line of therapy may indicate one or more treatments provided to a patient to treat a biological condition. The one or more treatments may include at least one of one or more medical procedures or one or more therapeutic substances. In one or more illustrative examples, the one or more therapeutic substances may include one or more pharmaceutical substances. In one or more additional illustrative examples, the one or more medical procedures may correspond to administration of one or more pharmaceutical substances.

The lines of therapy system 802 may include a procedures transaction system 804 and a pharmacy transactions system 806. The procedures transaction system 804 may analyze health transactions information related to medical procedures to generate one or more procedures transaction data tables 808. In addition, the pharmacy transactions system 806 may analyze health transactions information related to therapeutic substances provided to one or more patients to generate one or more pharmacy transaction data tables 810. At least one of the one or more procedures transaction data tables 808 or the pharmacy transaction data tables 810 may be analyzed to determine one or more lines of therapy for one or more patients. In one or more examples, the health transactions information analyzed by the procedures transaction system 804 and by the pharmacy transaction system 806 may include at least one of health insurance claims data or electronic medical records. In various examples, the electronic medical records may include at least one of structured data or unstructured data. In one or more illustrative examples, the electronic medical records may include imaging information, laboratory test results, diagnostic test information, clinical observations, dental health information, notes of healthcare practitioners, medical history forms, diagnostic request forms, medical procedure order forms, medical information charts, one or more combinations thereof, and so forth. In one or more additional examples, the health transaction information analyzed by at least one of the procedures transaction system 804 or the pharmacy transactions system 806 may be obtained from participation of patients in one or more clinical trials.

In various examples, the procedures transaction system 804 may analyze medical procedure records 812 obtained from the integrated data repository 104 to generate the procedures transaction data tables 808. The medical procedure records may be stored by a medical procedures data table stored by the integrated data repository 104. The medical procedure records 812 may include information corresponding to a number of health insurance transactions for a number of patients related to medical procedures obtained by the patients. In one or more examples, the medical procedure records 812 may indicate medical procedures provided to patients in at least one of clinical healthcare settings or as part of a clinical trial.

Further, the pharmacy transaction system 806 may analyze pharmacy records 814 obtained from the integrated data repository 104 to generate the pharmacy transaction data tables 810. The pharmacy records 814 may be stored by a pharmacy records data table stored by the integrated data repository 104. The pharmacy records 814 may include information corresponding to a number of health insurance transactions for a number of patients related to therapeutic substances obtained by the patients. In various examples, the pharmacy records 814 may indicate pharmaceutical substances provided to patients in at least one of clinical healthcare settings or as part of a clinical trial.

Additionally, the lines of therapy system 802 may analyze lines of therapy analysis information 816 to generate one or more lines of therapy for one or more patients. At least a portion of the lines of therapy analysis information 816 may be obtained from one or more third-party sources. At least a portion of the lines of therapy analysis information 816 may also be generated using one or more computational techniques. In one or more examples, the lines of therapy analysis information 816 may be generated using one or more machine learning techniques. Further, at least a portion of the lines of therapy analysis information 816 may be obtained from a service provider that at least one of controls, maintains, manages, or creates the data integration and analysis system 102 and the integrated data repository 104. For example, at least a portion of the lines of therapy analysis information 816 may include information curated by the service provider.

The lines of therapy analysis information 816 may include health insurance claims data 818. The health insurance claims data 818 may correspond to one or more therapeutic substances that may be used to treat one or more biological conditions. Additionally, the health insurance claims data 818 may correspond to one or more medical procedures that may be used to treat one or more biological conditions. In various examples, the health insurance claims data 818 may include a set of health insurance codes that correspond to at least one of therapeutic substances or medical procedures used to treat a biological condition. In one or more examples, the health insurance claims data 818 may indicate one or more health insurance codes that are to be used to identify the transactions to include in at least one of the medical procedure records 812 or the pharmacy records 814. In one or more additional examples, the health insurance claims data 818 may indicate one or more additional health insurance codes that are to be used to exclude transactions stored in the integrated data repository 104 from the medical procedure records 812 and/or the pharmacy records 814. In one or more illustrative examples, the health insurance claims data 818 may include one or more NDC identifiers. In one or more additional illustrative examples, the health insurance claims data 818 may include one or more HCPCS codes. In one or more further examples, the health insurance claims data 818 may indicate one or more columns of one or more database tables stored by the integrated data repository 104 to analyze to determine the presence or absence of one or more health insurance codes.

In at least some examples, the health insurance claims data 818 may include a number of groups of health insurance codes. Individual groups of health insurance codes may correspond to different biological conditions. In various illustrative examples, the health insurance claims data 818 may include one or more health insurance codes that correspond to treatments that are provided to patients during the treatment of a specified biological condition. To illustrate, the health insurance claims data 818 may indicate a first set of health insurance codes that correspond to treatments provided to patients in relation to Alzheimer's disease and a second set of health insurance codes that correspond to treatments provided to patients in relation to type II diabetes. In one or more additional examples, the health insurance claims data 818 may include health insurance codes that correspond to different forms of biological condition, such as different forms of cancer. For example, the health insurance claims data 818 may include a first set of health insurance codes that correspond to treatments provided to patients in relation to colorectal cancer and a second set of health insurance codes that correspond to treatments provided to patients in relation to breast cancer.

The lines of therapy analysis information 816 may also include treatment data 820. The treatment data 820 may include a list of treatments that are to be included in health transactions information comprising at least one of the medical procedure records 812 or the pharmacy records 814. In one or more additional examples, the treatment data 820 may include an additional list of treatments used to exclude from health transactions information from at least one of the medical procedure records 812 or the pharmacy records 814. Further, the treatment data 820 may indicate at least one of primary treatments for one or more biological conditions, secondary treatments for one or more biological conditions, or tertiary treatments for one or more biological conditions. In one or more illustrative examples, primary treatments for a biological condition may indicate one or more first treatments to be provided to a patient diagnosed with or suspected of having the biological condition. In addition, the secondary treatments for a biological condition may indicate one or more second treatments to be provided to a patient diagnosed with or suspected of having the biological condition when the one or more first treatments are not effective. Further, tertiary treatments for a biological condition may indicate one or more third treatments to be provided to a patient diagnosed with or suspected of having the biological condition when the one or more first treatments and the one or more second treatments are ineffective.

In one or more additional examples, the lines of therapy analysis information 816 may include data analysis rules and schema 822. The data analysis rules and schema 822 may provide a framework by which the lines of therapy system 802 may analyze the medical procedure records 812 and the pharmacy records 814. For example, the data analysis rules and schema 822 may include a framework to determine a period of time that a patient has taken a pharmaceutical substance when a first date of supply of the pharmaceutical substance overlaps with a second date of supply of the pharmaceutical substance. In one or more additional examples, the data analysis rules and schema 822 may include a framework to determine a period of time that a patient has received a pharmaceutical substance via a medical procedure, such as via one or more injections or one or more intravenous administrations of the pharmaceutical substance, when health insurance claims for the medical procedure overlap. In one or more further examples, the data analysis rules and schema 822 from include a framework to determine a length of treatment for a patient that dies before a next treatment is obtained or that dies before a threshold period of time after the last treatment is obtained. The data analysis rules and schema 822 may also include a framework to determine a date of next treatment for a patient. To illustrate, a time-to-next-treatment may be cut off at the date of death of a patient even when a last active date of the patient is after the date of death. That is, a date of a health insurance claim may be after the date of death of a patient and may indicate a real world time-to-next-treatment that is after the date of death. In these scenarios, the real world time-to-next-treatment is determined to be the date of death rather than the date of the last active health insurance claim.

In one or more illustrative examples, a framework for determining a real world time-to-next-treatment may depend on whether the date of the last activity of a patient is less than a threshold amount of time. In one or more examples, the threshold amount of time is at least 30 days, at least 45 days, at least 60 days, at least 75 days, at least 90 days, at least 105 days, at least 120 days, at least 135 days, at least 150 days, at least 175 days, or at least 190 days. In at least some examples, in situations where a patient receives a treatment after a threshold period of time, the next treatment may be determined to be part of a new line of therapy rather than a continuation of a current line of therapy. In various examples, the threshold period of time may be determined based on an analysis of health insurance data of a number of patients that previously received one or more treatments for a biological condition.

In one or more additional illustrative examples, the lines of therapy analysis information 816 may include one or more rules for determining a date of death of a patient. For example, in situations where patients with a date of death occur before initiation of treatment, the patient is excluded from the procedures transaction data tables 808 and the pharmacy transaction data tables 810. Additionally, in various examples, the integrated data repository 104 may indicate a month and year of death and not date of death. In one or more examples, the date of death may be determined as one day after a sample collection date for a patent that died in the same month that a sample was collected. The sample may be collected in conjunction with a diagnostic procedure, such as one or more liquid biopsy procedures. In one or more additional examples, the date of death of patients may be estimated as a specified date of the month that the patient died, such as the $1^{st}$ day of the month, the $5^{th}$ day of the month, the $10^{th}$ day of the month, or the $15^{th}$ day of the month.

In one or more further illustrative examples, the lines of therapy analysis information 816 may indicate that real world time-to-next-treatment is defined as the time from the start of a first line of therapy to the start of a next line of therapy. Different biological conditions may have different rules or frameworks for determining lines of therapy. In one or more examples, a new line of therapy for a first biological condition, such as a first form of cancer, may be defined as a change or addition within a non-biologics drug category indicates a new line of therapy if outside of a first threshold time window since initiation of an initial line of therapy, where the first threshold time window is at least 5 days, at least 10 days, at least 15 days, at least 20 days, at least 30 days, at least 45 days, or at least 60 days. Additionally, a new line of therapy for the first biological condition may be initiated in response to a change or addition within biologics or immune checkpoint inhibitor (ICI) drugs if outside of a second threshold time window since initiation of the initial line of therapy, where the second threshold time window is different from the first threshold time window and is at least 15 days, at least 30 days, at least 45 days, at least 60 days, at least 75 days, or at least 90 days. Further, another rule with regard to lines of therapy for the first biological condition may indicate that adding or removing chemotherapies does not correspond to a new line of therapy. In one or more examples, the first biological condition may include colorectal cancer, the chemotherapies may include Fluorouracil, Leucovorin or Levoleucovorin, the non-biologics may include Fluorouracil, Capecitabine, Irinotecan, Oxaliplatin, Leucovorin, Levoleucovorin, and biologics may include at least a portion of the other colorectal cancer treatments under National Comprehensive Cancer Network (NCCN) guidelines that are not included in the non-biologics list. In still additional examples for the first biological condition, a treatment episode that takes place after a third threshold time window is considered a new line of therapy, where the third threshold time window is different from the first threshold time window, the second threshold time window, and is at least 120 days, at least 135 days, at least 150 days, at least 165 days, at least 180 days, at least 195 days, at least 210 days, at least 225 days, or at least 240 days.

In addition, the lines of therapy analysis information 816 may include additional rules of a framework for determining new lines of therapy for a second biological condition, such as a second form of cancer. In one or more examples, the additional rules may indicate that an end of a first line of therapy occurs when a first period of time elapses and treatment with a same pharmaceutical treatment is reinitiated or treatment with an additional pharmaceutical occurs after a second period of time after commencing the first line of therapy. The first period of time may be at least 20 days, at least 25 days, at least 30 days, at least 35 days, at least 40 days, at least 45 days, or at least 60 days. The second period of time may be different from the first period of time and may be at least 30 days, at least 35 days, at least 40 days, at least 45 days, at least 50 days, at least 60 days, at least 70 days, at least 80 days, or at least 90 days. Continuation of a same pharmaceutical substance within the first period of time may indicate that a first line of therapy is continuing and that a second line of therapy has not yet commenced. In various examples, when the second biological condition is non-small cell lung cancer, a line of therapy will not be changed from a first line of therapy to a second line of therapy if cisplatin and carboplatin are substituted for one another, if paclitaxel was substituted for nab-paclitaxel, or bevacizumab was added to a chemotherapy.

The procedures transaction system 804 may generate a procedures data table 824 that is included in the procedures transaction data tables 808. The procedures data table 824 may indicate medical procedures provided to a patient. In one or more examples, the procedures data table 824 may indicate a number of procedures provided to a patient with respect to a given biological condition. For example, the procedures data table 824 may indicate medical procedures provided to a patient to treat diabetes or to treat a form of cancer. In one or more illustrative examples, the procedures data table may indicate one or more medical procedures that included administration of a pharmaceutical substance to a patient. In various examples, the procedures transaction system 804 may analyze one or more columns of data tables stored by the integrated data repository 104 that include health insurance claims data with respect to one or more criteria. For example, the procedures transaction system 804 may analyze one or more columns of data tables stored by the integrated data repository 104 to determine one or more rows of the data tables that correspond to the one or more criteria. The one or more criteria may correspond to one or more columns including at least one of one or more NDC identifiers or one or more HCPCS codes. The procedures transaction system 804 may determine that individual rows of the one or more data tables stored by the integrated data repository 104 correspond to health insurance transactions related to the treatment of a biological condition. At least a portion of the information included in the one or more rows may be included in the medical procedure records 812 and stored by the procedures data table 824. Information included in the one or more rows may be stored in the procedures data table 824 in association with an identifier of the patient that received the medical procedure.

In one or more illustrative examples, the procedures transaction system 804 may analyze a set of columns of one or more data tables stored by the integrated data repository 104 where the set of columns is specified in the health insurance claims data 818 to determine one or more rows of the one or more data tables that include a number of HCPCS codes that are included in the health insurance claims data 818 and that correspond to a given biological condition. The procedures transaction system 804 may extract information from the one or more rows to generate a row of a procedures data table 824 that is included in the procedures transaction data tables 808. In scenarios where an HCPCS code included in a row of a data table stored by the integrated data repository 104 is not included in the health insurance claims data 818 with respect to the biological condition, the procedures transaction system 804 may analyze the row to determine whether the row includes an NDC identifier included in the lines of therapy analysis information 816. In situations where a row corresponding to a medical procedure includes an HCPCS code that is not included in the health insurance claims data 818, but does include an NDC identifier included in the health insurance claims data 818, the procedures transaction system 804 may extract information from the row and include the information in the procedures data table 824. Thus, although the NDC identifier may refer to a pharmaceutical substance provided to treat the biological condition, the information from the corresponding row of the data table may be stored in conjunction with a procedures data table 824 because the pharmaceutical substance was administered as part of a medical procedure.

Individual rows of the procedures data table 824 may include information related to the medical procedure obtained by the patient, such as at least one of an identifier of the patient, one or more sources of the medical procedure (e.g., an identifier of a database table stored by the integrated data repository 104 that provided the information for the row), one or more identifiers of the medical procedure, one or more classes of the medical procedure, one or more categories of the medical procedure, one or more dates of the medical procedure, one or more HSPCS codes related to the medical procedure, one or more NDC identifies related to the medical procedure, or one or more locations where the medical procedure was administered. In situations where a pharmaceutical substance was provided as part of the medical procedure a row of the procedure data table 824 may include at least one of one or more names of the pharmaceutical substance, an indicator of whether the pharmaceutical substance is a generic version, or one or more dosages of the pharmaceutical substance.

The procedures transaction system 804 may also analyze the medical procedures records 812 to determine one or more treatment gap tables that are included in the procedures transaction data tables 808. The treatment gap tables may include a first treatment gap data table 826 that indicates a period of time between two successive instances of a medical procedure being administered for a patient having a same HCPCS code, a same procedure name, and a same dosage. In one or more examples, the first treatment gap data table 826 may include a plurality of rows corresponding to a single treatment when multiple individuals received the same medical procedure. In this way, each row related to the treatment indicates a period of time between successive instances of the medical procedure being administered for each of the plurality of patients receiving the medical procedure.

In one or more additional examples, the procedures transaction system 804 may generate a second treatment gap data table 828 based on the information included in the first treatment gap table. In various examples, the second treatment gap data table 828 may indicate at least one of a median gap or a mean gap between successive instances of a medical procedure being administered. In these scenarios, the procedures transaction system 804 may analyze a plurality of rows of the first treatment gap table 826 that correspond to an individual medical procedure to determine at least one of the median or the mean gap for the medical procedure. In this way, the second treatment gap data table 828 may include an individual row for each individual treatment indicating at least one of a median gap or a mean gap between successive instances of the medical procedure being administered to patients. In one or more illustrative examples, in scenarios where a treatment gap for a patient is unknown, the median treatment gap or the mean treatment gap indicated by the second treatment gap data table 828 may be used to indicate the treatment gap for the patient. Additionally, in situations where the treatment gap for a patient is greater than a threshold amount of time or the treatment gap is outside of a threshold number of standard deviations of the mean treatment gap, the median treatment gap or the mean treatment gap stored by the second treatment gap data table 828 may be substituted for the actual treatment gap for the patient.

The procedures transaction system 804 may utilize the information stored by the procedures data table 824 and at least one of the first treatment gap data table 826 or the second treatment gap data table 828 to generate a procedures episodes data table 830. The procedures episodes data table 830 may include a number of rows that correspond to individual patients that have obtained one or more medical procedures during the course of treatment for a biological condition. Individual rows of the procedures episodes data table 830 may indicate one or more instances of medical procedure being obtained by a patient and a period of time over which the one or more instances of the medical procedure were administered. In situations where a medical procedure involved the administration of a pharmaceutical substance, the individual rows of the procedures episodes data table 830 may indicate at least one of a name of the pharmaceutical substance, a category of the pharmaceutical substance, a class of the pharmaceutical substance, or a dosage of the pharmaceutical substance. In various examples, the procedures episodes data table 830 may indicate a plurality of lines of treatment obtained by a patient that involved a medical procedure.

The pharmacy transactions system 806 may generate a pharmacy data table 832 that is included in the pharmacy transaction data tables 810. The pharmacy transactions system 806 may generate the pharmacy data table 832 by analyzing information stored by the integrated data repository 104 and that is included in the pharmacy records 804. In one or more examples, the pharmacy transactions system

806 may analyze one or more columns of one or more data tables stored by the integrated data repository 104. The one or more columns analyzed by the pharmacy transactions system 806 may be identified in the health insurance claims data 818. In various examples, the pharmacy transactions system 806 may analyze one or more columns of a data table stored by the integrated data repository 104 to identify rows of the data table that include one or more NDC identifiers included in the health insurance claims data 818. In one or more illustrative examples, the one or more NDC identifiers may correspond to pharmaceutical substances provided to patients being treated for a given biological condition. In one or more additional examples, the pharmacy transactions system 806 may also analyze one or more rows of one or more e data tables stored by the integrated data repository 104, to determine at least one row of the one or more data tables that include a name of a pharmaceutical substance that corresponds to a name of a pharmaceutical substance included in the lines of therapy analysis information 816.

The pharmacy transaction system 806 may also analyze individual rows of the one or more data tables stored by the integrated data repository 104 to determine at least one of a number of days of supply of the pharmaceutical substance provided to the patient, a category of the pharmaceutical substance, a name of the pharmaceutical substance provided to the patient, or a date of service indicating a date that the pharmaceutical substance was provided to the patient. Based on the analysis by the pharmacy transactions system 806 of the information stored by one or more data tables of the integrated data repository 104 in conjunction with the health insurance claims data 818, the pharmacy transactions system 806 may generate the pharmacy data table 832. In addition to at least a portion of the information extracted by the pharmacy transactions system 806 from the one or more data tables of the integrated data repository 104, the pharmacy data table 832 may also include a start date and an end date for treatment of the patient using the pharmaceutical substance.

In various examples, the pharmacy transaction system 806 may analyze the information included in the pharmacy data table 832 to generate a pharmacy episodes data table 834. The pharmacy episodes data table 834 may indicate a number of episodes of care for a plurality of individuals. Individual episodes of care stored by the pharmacy episodes data table 834 may indicate a pharmaceutical substance provided to a patient in the course of treatment of a biological condition and an amount of time that the patient received the pharmaceutical substance. In one or more examples, the amount of time that the patient received the pharmaceutical substance may be determined by the pharmacy transactions system 806 using the data analysis rules and schema 822. For examples, in situations where the days of supply for a first instance of treatment for a patient using a pharmaceutical substance overlaps with the days of supply for a second instance of treatment for the patient using the pharmaceutical substance, the pharmacy transactions system 806 may determine that the overall period of treatment for the patient using the pharmaceutical substance is a combination of the days of supply for the first and second instances of treatment using the pharmaceutical substance rather than the overall days of supply including the overlap period. If the overlap period were used to determine the episode of care for the patient, there may be an inaccuracy in the actual timing of the episode of care.

In one or more examples, the lines of therapy system 802 may analyze the procedures episodes data table 830 and the pharmacy episodes data table 834 to determine one or more lines of therapy data structures 836. The lines of therapy data structures 836 may indicate one or more lines of therapy provided to one or more patients for the treatment of one or more biological conditions. Individual lines of therapy stored by the lines of therapy data structures 836 may indicate one or more therapeutic substances provided to a patient during a course of treatment for a biological condition and/or one or more medical procedures obtained by the patient during the course of treatment for the biological condition. Individual lines of therapy stored by the lines of therapy data structures 836 may also indicate periods of time over which at least one of a therapeutic substance or a medical procedure was obtained by the patient during a course of treatment for a biological condition. In order to generate the lines of therapy data structures 836, the lines of therapy system 802 may analyze thousands, tens of thousands, hundreds of thousands, up to millions of health insurance claims records. For a single line of therapy data structure 832 corresponding to a given biological condition, the lines of therapy system 802 may analyze health insurance claims data of hundreds, thousands, tens of thousands, up to hundreds of thousands or more patients diagnosed with the biological condition.

In one or more additional examples, the lines of therapy data structures 836 may store multiple lines of therapy for an individual patient. In at least some examples, the lines of therapy data structures 836 may include a first line of therapy that corresponds to a primary course of treatment obtained by the patient for a biological condition and a second line of therapy that corresponds to a secondary course of treatment obtained by the patient for the biological condition. In various examples, the lines of therapy system 802 may analyze the procedures episodes data table 830 and the pharmacy episodes data table 834 in accordance with the lines of therapy analysis information 816 to determine different lines of therapy for an individual. For example, the lines of therapy system 802 may determine that a patient received one or more first therapeutic substances during a first period of time and one or more second therapeutic substances during a second period of time.

In one or more illustrative examples, the lines of therapy system 802 may analyze the lines of therapy analysis information 816 to determine that the one or more first therapeutic substances and the one or more second therapeutic substances are both included in a primary course of treatment for the biological condition. The lines of therapy system 802 may also determine that a gap between the first period of time and the second period of time is less than a first threshold gap. In these scenarios, the lines of therapy system 802 may determine that the one or more first therapeutic substances and the one or more second therapeutic substances are part of a same line of therapy. Thus, a patient may receive different therapeutic substances during different periods of time that are part of the same line of therapy. To illustrate, one or more therapeutic substances included in a primary course of treatment may be exchanged for one or more additional therapeutic substances included in a primary course of treatment and still be considered part of a same line of therapy. In addition, the lines of therapy system 802 may determine that a line of therapy for a patient is discontinued in response to determining that the gap between the first period of time and the second period of time is at least the first threshold gap. In one or more examples, the first threshold gap may be at least 30 days, at least 45 days, at least 60 days, at least 75 days, at least 90 days, at least 105 days, at least 120 days, at least 135 days, at least 150 days, at least 165 days, or at least 180 days.

Further, the lines of therapy system 802 may determine that a line of therapy for a patient is discontinued by determining that the patient has died. In situations where a patient has died, the lines of therapy system 802 may analyze one or more periods of time that the patient received treatment in relation to the date of death of the patient with respect to the lines of therapy analysis information 816 to determine a date that the line of therapy was discontinued. For example, the lines of therapy system 802 may determine that an end date of a line of therapy is the death date of the patient when the death date is within a period of time that the patient was receiving one or more treatments for the biological condition. Additionally, the lines of therapy system 802 may determine that a date the line of therapy was discontinued is the death date of the patient in response to determining that the death date is within a third threshold gap after a last treatment was received by the patient. To illustrate, in situations where the patient dies within at least 30 days, at least 45 days, at least 60 days, at least 90 days, at least 120 days, at least 150 days, or at least 180 days of a last treatment, the lines of therapy system 802 may determine that the line of therapy was discontinued on the date of death of the patient. In scenarios where the patient dies at or after the third threshold gap in relation to the last treatment for the biological condition, the lines of therapy system 802 may determine that the line of therapy was discontinued on a date that is the date of last treatment plus the period of time corresponding to the third threshold gap, such as date of last treatment plus 60 days or date of last treatment plus 90 days.

In one or more additional illustrative examples, the lines of therapy system 802 may analyze the lines of therapy analysis information 816 to determine that the one or more first therapeutic substances are part of a first course of treatment for the biological condition and the one or more second therapeutic substances are part of a second course of treatment for the biological condition. In these situations, the lines of therapy system 802 may determine that the one or more first therapeutic substances are part of a first line of therapy and that the one or more second therapeutic substances are part of a first line of therapy. In one or more further illustrative examples, the lines of therapy system 802 may analyze a gap between the first period of time and the second period of time with respect to one or more threshold gaps included in the lines of therapy analysis information 816 to determine whether the one or more first therapeutic substances and the one or more second therapeutic substances are part of a same course of treatment or part of a different course of treatment for the biological condition. For example, the lines of therapy system 802 may determine that the one or more first therapeutic substances are part of a first course of treatment for a biological condition and that the one or more second therapeutic substances are part of a second course of treatment. The lines of therapy system 802 may also determine that a gap between the first period time and the second period of time is at least a second threshold gap. In these instances, the lines of therapy system 802 may determine that the one or more first therapeutic substances are part of a first line of therapy and the one or more second therapeutic substances are part of a second line of therapy. In one or more additional scenarios, the lines of therapy system 802 may determine that the one or more first therapeutic substances and the one or more second therapeutic substances are part of a same line of therapy in response to determining that the gap between the first period of time and the second period of time is less than the second threshold gap. The second threshold gap may be different from the first threshold gap. The second threshold gap may include at least 10 days, at least 15 days, at least 20 days, at least 25 days, at least 30 days, at least 40 days, at least 50 days, at least 60 days, at least 70 days, at least 80 days, or at least 90 days.

In one or more examples, the lines of therapy date structures 836 may include one or more data tables. The one or more data tables may store lines of therapy information for individual patients that received treatment for a biological condition. In at least some examples, the lines of therapy data structures 836 may include a plurality of data tables with individual data tables of the plurality of data tables corresponding to an individual biological condition. For example, the lines of therapy data structures 836 may include a first data table indicating lines of therapy for patients receiving treatment for influenza and a second data table indicating lines of therapy for patients received treatment for diabetes. In one or more additional examples, the lines of therapy data structures 836 may include a number of data tables that correspond to patients receiving treatment for different forms of a biological condition. To illustrate, the lines of therapy data structures 836 may include a first data table indicating lines of therapy for patients that received treatment for type I diabetes and a second data table indicating lines of therapy for patients that received treatment for type II diabetes. In one or more additional examples, the lines of therapy data structures 836 may include a number of data tables that correspond to patients that received treatment for different forms of cancer. In one or more illustrative examples, the lines of therapy data structures 836 may include a first data table indicating lines of therapy that correspond to patients receiving treatment for non-small cell lung cancer, a second data table indicating lines of therapy that correspond to patients receiving treatment for breast cancer, and a third data table indicating lines of therapy that correspond to patients receiving treatment for colorectal cancer.

In various examples, individual data tables included in the lines of therapy data structures 836 may include a column indicating an identifier of a patient that received treatment for one or more biological conditions. Individual rows of the data tables may correspond to a line of therapy for a given patient. In situations where a patient received treatment corresponding to multiple lines of therapy, a data table included in the lines of therapy data structures 836 may include multiple rows with each row indicating a different line of therapy for the patient. The data tables may also include one or more columns indicating a start date and an end date for the line of therapy. In addition, the data tables may include one or more columns indicating names of treatments received in relation to a line of therapy and one or more columns indicating a category of treatments received by the patient in relation to the line of therapy. Further, the data tables may include one or more columns indicating whether a combination of treatments were provided to the patient for the line of therapy, whether an adjuvant treatment was received by the patient, or whether maintenance treatment has been obtained by the patient.

In one or more examples, the data tables included in the lines of therapy data structures 836 may also include one or more columns indicating a time-to-next-treatment for the patient. In at least some examples, the time-to-next-treatment may indicate a period of time from a date that a first line of therapy was initiated to a subsequent date that a second line of therapy was initiated. In at least some examples, the lines of therapy system 802 may determine a time-to-next-treatment using the lines of therapy analysis information 816. For example, the lines of therapy system

802 may determine that a time-to-next-treatment is the date of death of a patient in situations where the date of death is before an end date of a line of therapy or last active date for the patient. The last active date for the patient may correspond to a last insurance claim that was paid for the patient in relation to treatment for the biological condition. Additionally, the end date of the line of therapy may correspond to a number of days of supply of one or more therapeutic substances provided to the patient or an amount of time that a medical procedure is expected to be effective for the patient. In one or more additional examples, the lines of therapy system 802 may determine that the time-to-next-treatment is also the date of death of the patient in scenarios where the date of death is within a threshold period of time of the end date of a line of therapy. Further, the lines of therapy system 802 may determine that the time-to-next-treatment is a last active date for the patient in instances where the last active date is before the end date of the line of therapy. In these examples, the patient may not have followed up with a treatment regimen for the full period of time. In still other examples, the lines of therapy system 802 may determine that a time-to-next-treatment for a patient is a threshold period of time after an end date of a line of therapy including in situations where a new line of therapy was initiated but after the threshold period of time or when no new line of therapy was initiated for the patient after the end date of the initial line of therapy. In these implementations, the lines of therapy system 802 may determine that the time-to-next-treatment is the end date of the line of therapy plus the threshold period of time. In one or more illustrative examples, the threshold period of time may be 15 days, 30 days, 45 days, 60 days, 75 days, 90 days, 105 days, 120 days, 135 days, 150 days, 165 days, or 180 days.

The lines of therapy system 802 may provide the one or more lines of therapy data structures 836 to the data analysis system 140. The data analysis system 140 may analyze information stored by the one or more lines of therapy data structures 836 to determine data analysis results 146. In one or more examples, the data analysis system 146 may receive a request to analyze information that corresponds to lines of therapy received by patients treated for a given biological condition. In response to the request, the data analysis system 140 may query the lines of therapy system 802 to obtain one or more lines of therapy data structures 836 that correspond to the biological condition. For example, the data analysis system 140 may receive a request to analyze information related to lines of therapy of patients that received treatment for non-small cell lung cancer. In these scenarios, the data analysis system 140 may query the lines of therapy system 802 to obtain one or more lines of therapy data structures 836 that correspond to non-small cell lung cancer. The data analysis system 140 may then analyze information stored by the one or more lines of therapy data structures 836 to generate the data analysis results 146.

In at least some examples, the data analysis system 140 may analyze information stored by the one or more lines of therapy data structures 836 to generate data analysis results 146 that include one or more quantitative measures corresponding to patients included in the one or more lines of therapy data structures 836 being analyzed. To illustrate, the data analysis system 140 may analyze the lines of therapy data structures 836 to determine real world survival metrics for patients treated for a biological condition. In various examples, the data analysis system 140 may analyze one or more lines of therapy data structures 836 that correspond to a biological condition to determine a survival probability over a period of time for patients receiving one or more lines of therapy to treat the biological condition. In one or more illustrative examples, the data analysis system 140 may analyze lines of therapy information stored by the one or more lines of therapy data structures 836 to determine real-world overall survival metrics for patients. In one or more additional illustrative examples, the data analysis system 140 may analyze lines of therapy information stored by the one or more lines of therapy data structures 836 to determine time-to-next-treatment metrics and/or time to discontinuation metrics for patients diagnosed with a biological condition.

In various examples, the data analysis system 140 may analyze information stored by the one or more lines of therapy data structures 836 corresponding to a biological condition to determine an amount of progression of the biological condition within at least a subset of the patients included in a lines of therapy data structure 836 corresponding to the biological condition. In one or more examples, the data analysis system 140 may determine an amount of progression for patients receiving one or more pharmaceutical substances as part of a line of therapy based on an analysis of lines of therapy information stored by one or more lines of therapy data structures 836 that correspond to the biological condition. Additionally, the data analysis system 140 may determine an amount of progression for patients having one or more genomic mutations based on an analysis of lines of therapy information stored by one or more lines of therapy data structures 836 that correspond to the biological condition. In one or more illustrative examples, the data analysis system 140 may analyze at least one of time-to-next-treatment metrics or time to discontinuation metrics generated based on lines of therapy information stored by one or more lines of therapy data structures 836 that correspond to the biological condition to determine an amount of progression of the biological condition for patients having the genomic mutations. In these instances, the data analysis system 140 may query the integrated data repository 104 to determine patients having the one or more genomic mutations. The data analysis system 140 may then query the one or more lines of therapy data structures 836 that correspond to a given biological condition for lines of therapy information related to the patients having the one or more genomic mutations and analyze the lines of therapy information to determine the data analysis results 146. In at least some examples, the data analysis system 140 may analyze at least one of time-to-next-treatment metrics or time to discontinuation metrics to determine progression of a biological condition for patients having the one or more genomic mutations and that received treatment for the biological condition.

In one or more further examples, the data analysis system 140 may analyze lines of therapy information stored by one or more lines of therapy data structures 836 that correspond to a biological condition to determine a level of resistance developed by one or more patients receiving one or more treatments for the biological condition. For example, the data analysis system 140 may analyze lines of therapy information stored by one or more lines of therapy data structures 836 that correspond to a biological condition to determine a level of resistance in one or more patients that received one or more pharmaceutical substances as part of a line of therapy to treat the biological condition. In various examples, the data analysis system 140 may analyze at least one of time-to-next-treatment metrics, time to discontinuation metrics, or real-world survival metrics to determine a level of resistance developed by patients that received treatment for the biological condition. In at least some examples, the data analysis system 140 may also determine a level of resistance with respect to one or more treatments for individuals having one or more genomic mutations. In at least some examples, the level of resistance may be greater in situations where a time-to-next-treatment or a real world survival rate have lower values and the level of resistance may be lower in situations where values of time-to-next-treatment or real-world survival rate are relatively higher.

In at least some examples, the data analysis system 108 may analyze lines of therapy information stored by the one or more lines of therapy data structures 836 that correspond to a biological condition to determine a recommendation for one or more treatments to administer to a patient diagnosed with a biological condition. In one or more examples, the data analysis system 140 may analyze lines of therapy information stored by one or more lines of therapy data structures 836 related to a biological condition to determine one or more characteristics of patients that received one or more lines of therapy in which a level of resistance is relatively low and/or an amount of progression is relatively low. The data analysis system 140 may then analyze characteristics of one or more additional patients diagnosed with the biological condition to determine whether to recommend the one or more lines of therapy as treatment to the one or more additional patients. At least a portion of the one or more additional patients may have already received treatment for the biological condition. In one or more additional examples, at least a portion of the one or more additional patients may not have received treatment for the biological condition. In various examples, the data analysis system 140 may also analyze lines of therapy information stored by the lines of therapy data structures 836 that correspond to a biological condition to determine an effectiveness of a line of therapy for a patient diagnosed with the biological condition. The effectiveness of the line of therapy may correspond to a probability of the line of therapy at least one of reducing the effects of or eliminating the biological condition with respect the patient.

In various examples, an amount of progression of the biological condition, an effectiveness of a line of therapy to treat the biological condition, the probability of developing resistance to a line of treatment, or a combination thereof, may be determined by the data analysis system 140 using at least one of one or more statistical techniques or one or more machine learning techniques. To illustrate, the data analysis system 140 may implement at least one of Cox proportional hazards models, chi-squared tests, log-rank tests, or Kaplan-Meier methods to determine at least one of an amount of progression of the biological condition, an effectiveness of a line of therapy to treat the biological condition, or the probability of developing resistance to a line of treatment. In one or more additional examples, the data analysis system 140 may implement one or more neural networks, one or more convolutional neural networks, or one or more residual neural networks to determine at least one of an amount of progression of the biological condition, an effectiveness of a line of therapy to treat the biological condition, or the probability of developing resistance to a line of treatment.

In one or more illustrative examples, the data analysis system 140 may determine one or more characteristics of patients that have at least one of less than a threshold probability of developing resistance to a line of therapy or at least at an additional threshold amount of effectiveness for the line of therapy. In one or more scenarios, the data analysis system 140 may analyze lines of therapy information stored by one or more lines of therapy data structures 836 to determine the one or more characteristics. In at least some examples, the data analysis system 140 may implement at least one of one or more statistical techniques or one or more machine learning techniques to determine the one or more characteristics of patients that have at least one of less than a threshold probability of developing resistance to a line of therapy or at least at an additional threshold amount of effectiveness for the line of therapy. In one or more examples, the data analysis system 140 may implement at least one of one or more extraction algorithms or one or more classification algorithms to determine the one or more characteristics. In various examples, the data analysis system 140 may implement at least one of one or more neural networks, one or more feedforward neural networks, one or more recurrent neural networks, one or more residual networks, or one or more autoencoders to determine the one or more characteristics that have at least one of less than a threshold probability of developing resistance to a line of therapy or at least at an additional threshold amount of effectiveness for the line of therapy.

In one or more additional illustrative examples, the data analysis system 140 may implement one or more log-rank tests to analyze differences between time to death metrics and time-to-next-treatment metrics determined based on the one or more lines of therapy data structures 836 for patients having one or more genomic mutations and diagnosed with a given biological condition or in which the given biological condition is suspected to be present. In various examples, the patients included in the analysis may also have received one or more specified lines of therapy to treat the biological condition. Additionally, the data analysis system 140 may implement one or more Chi-squared tests to determine the proportion of patients having one or more specified genomic mutations and, in at least some instances, one or more co-occurring genomic mutations in patients having one or more additional genomic characteristics, such as one or more clonal genomic mutations versus one or more subclonal genomic mutations. Further, one or more Cox proportional hazards models may be implemented by the data analysis system 140 to determine survival metrics for the patients. In this way, the effectiveness of one or more lines of therapy to treat the biological condition may be determined by the data analysis system 140 based on survival probabilities determined using the Cox proportional hazards models.

The lines of therapy analysis information 816 used by the lines of therapy system 802 include a number of criteria, thresholds, and other information that enable the lines of therapy system 802 to generate lines of therapy data structures 836 that may be used by the data analysis system 140 to accurately generate the data analysis results 146. That is, based on the lines of therapy analysis information 816 and the computational techniques implemented by the lines of therapy system 802, real world survival metrics, disease progression metrics, disease resistance metrics, treatment effectiveness levels, one or more combinations thereof, and so forth may be accurately determined. The accurate determination of these quantitative measures enables the data analysis system 140 to provide treatment recommendations to patients that are accurate, effective, and result in improved outcomes for patients. Without the frameworks and protocols specified in the lines of therapy analysis information 816 and the computational techniques implemented by the lines of therapy system 802 and the data analysis system 140, the treatment recommendations included in the data analysis results 146 are not as likely to improve outcomes for patients. The lines of therapy analysis information 816 has been generated over time using a number of computational techniques, training processes, and feedback loops to determine a specified set of criteria, frameworks, protocols, thresholds, and computational techniques that produce optimal treatment recommendations, provide accurate metrics indicating the effectiveness of lines of therapy on outcomes, and provide accurate information regarding the impact of genomic mutations on treatment outcomes.

Figure 9:
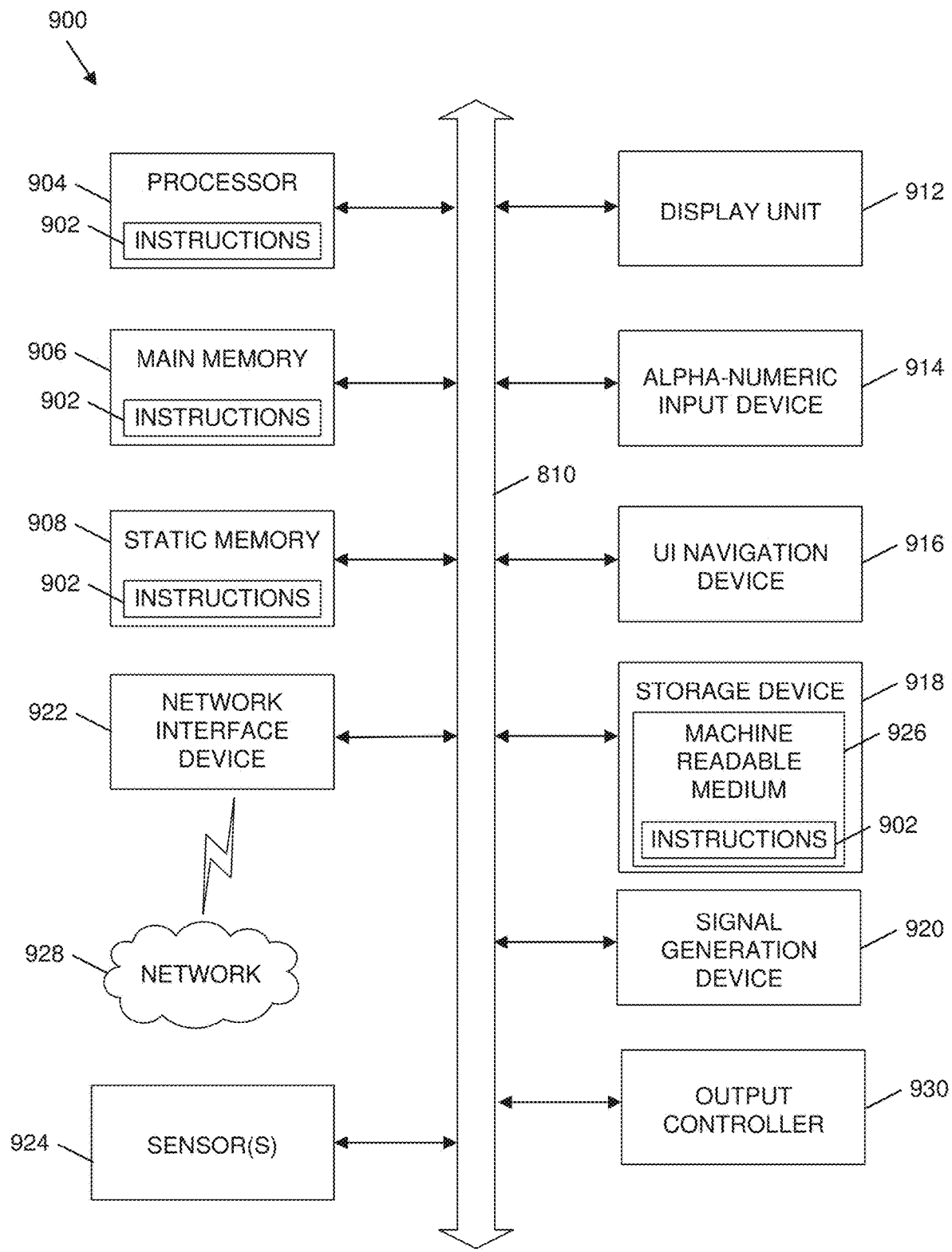
FIG. 9 illustrates a diagrammatic representation of a machine in the form of a computer system within which a set of instructions may be executed for causing the machine to perform any one or more of the methodologies discussed herein, according to one or more implementations.

FIG. 9 illustrates a diagrammatic representation of a computing device 900 in the form of a computer system within which a set of instructions may be executed for causing the computing device 900 to perform any one or more of the methodologies discussed herein, according to an example, according to an example implementation. Specifically, FIG. 9 shows a diagrammatic representation of the computing device 900 in the example form of a computer system, within which instructions 902 (e.g., software, a program, an application, an applet, an app, or other executable code) for causing the computing device 900 to perform any one or more of the methodologies discussed herein may be executed. For example, the instructions 902 may cause the computing device 900 to implement the architectures and frameworks 100, 200, 300, 400, 500 described with respect to FIGS. 1, 2, 3, 4, and 5, respectively, to execute the methods 600, 700 described with respect to FIGS. 6 and 7, respectively, and to implement the architecture 800 described with respect to FIG. 8.

The instructions 902 transform the general, non-programmed computing device 900 into a particular computing device 900 programmed to carry out the described and illustrated functions in the manner described. In alternative implementations, the computing device 900 operates as a standalone device or may be coupled (e.g., networked) to other machines. In a networked deployment, the computing device 900 may operate in the capacity of a server machine or a client machine in a server-client network environment, or as a peer machine in a peer-to-peer (or distributed) network environment. The computing device 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 902, sequentially or otherwise, that specify actions to be taken by the computing device 900. Further, while only a single computing device 900 is illustrated, the term "machine" shall also be taken to include a collection of machines 900 that individually or jointly execute the instructions 902 to perform any one or more of the methodologies discussed herein.

Examples of computing device 900 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In implementations in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example implementations (e.g., apparatus, systems, or methods) can be implemented in digital electronic circuitry, in computer hardware, in firmware, in software, or in any combination thereof. Example implementations can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In implementations deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., computing device 900) and software architectures that can be deployed in example implementations.

In an example, the computing device 900 can operate as a standalone device or the computing device 900 can be connected (e.g., networked) to other machines.

In a networked deployment, the computing device 900 can operate in the capacity of either a server or a client machine in server-client network environments. In an example, computing device 900 can act as a peer machine in peer-to-peer (or other distributed) network environments. The computing device 900 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the computing device 900. Further, while only a single computing device 900 is illustrated, the term "computing device" shall also be taken to include any collection of machines that individually or jointly execute a set (or multiple sets) of instructions to perform any one or more of the methodologies discussed herein.

Example computing device 900 can include a processor 904 (e.g., a central processing unit CPU), a graphics processing unit (GPU) or both), a main memory 906 and a static memory 908, some or all of which can communicate with each other via a bus 910. The computing device 900 can further include a display unit 912, an alphanumeric input device 914 (e.g., a keyboard), and a user interface (UI) navigation device 916 (e.g., a mouse). In an example, the display unit 912, input device 914 and UI navigation device 916 can be a touch screen display. The computing device 900 can additionally include a storage device (e.g., drive unit) 918, a signal generation device 920 (e.g., a speaker), a network interface device 922, and one or more sensors 924, such as a global positioning system (GPS) sensor, compass, accelerometer, or another sensor. The computing device 900 may include an output controller 930 that controls the output generated by the computing device 900.

The storage device 918 can include a machine readable medium 926 on which is stored one or more sets of data structures or instructions 902 (e.g., software) embodying or utilized by any one or more of the methodologies or functions described herein. The instructions 902 can also reside, completely or at least partially, within the main memory 906, within static memory 908, or within the processor 904 during execution thereof by the computing device 900. In an example, one or any combination of the processor 904, the main memory 906, the static memory 908, or the storage device 918 can constitute machine readable media.

While the machine readable medium 926 is illustrated as a single medium, the term "machine readable medium" can include a single medium or multiple media (e.g., a centralized or distributed database, and/or associated caches and servers) that configured to store the one or more instructions 902. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine-readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 902 can further be transmitted or received over a communications network 928 using a transmission medium via the network interface device 922 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 902.11 standards family known as Wi-Fi®, IEEE 902.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

As used herein, a component, can refer to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described implementations, as long as the teaching remains operable.

The various steps of the methods disclosed herein, or the steps carried out by the systems disclosed herein, may be carried out at the same time or different times, and/or in the same geographical location or different geographical locations, e.g., countries. The various steps of the methods disclosed herein can be performed by the same person or different people.

Various implementations of systems, devices, and methods have been described herein. These implementations are given only by way of example and are not intended to limit the scope of the claimed inventions. It should be appreciated, moreover, that the various features of the implementations that have been described may be combined in various ways to produce numerous additional implementations. Moreover, while various materials, dimensions, shapes, configurations and locations, etc. have been described for use with disclosed implementations, others besides those disclosed may be utilized without exceeding the scope of the claimed inventions.

Persons of ordinary skill in the relevant arts will recognize that implementations may comprise fewer features than illustrated in any individual implementation described above. The implementations described herein are not meant to be an exhaustive presentation of the ways in which the various features may be combined. Accordingly, the implementations are not mutually exclusive combinations of features; rather, implementations can comprise a combination of different individual features selected from different individual implementations, as understood by persons of ordinary skill in the art. Moreover, elements described with respect to one implementation can be implemented in other implementations even when not described in such implementations unless otherwise noted. Although a dependent claim may refer in the claims to a specific combination with one or more other claims, other implementations can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one implementation," "an implementation," or "some implementations" means that a particular feature, structure, or characteristic, described in connection with the implementation, is included in at least one implementation of the teaching. The appearances of the phrase "in one implementation" in various places in the specification are not necessarily all referring to the same implementation.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Although an implementation has been described with reference to specific example implementations, it will be evident that various modifications and changes may be made to these implementations without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific implementations in which the subject matter may be practiced. The implementations illustrated are described in sufficient detail to enable those skilled in the art to practice the teachings disclosed herein. Other implementations may be utilized and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

Although specific implementations have been illustrated and described herein, it should be appreciated that any arrangement calculated to achieve the same purpose may be substituted for the specific implementations shown. This disclosure is intended to cover any and all adaptations or variations of various implementations. Combinations of the above implementations, and other implementations not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

A numbered non-limiting list of aspects of the present subject matter is presented below. These numbered aspects are provided for illustrative purposes only and do not limit the technology disclosed herein.

Aspect 1. A method implemented at one or more computing machines comprising processing circuitry and memory, the method comprising: accessing, at the processing circuitry and from the memory, for a patient, a pharmacy transaction data set, each pharmacy transaction in the pharmacy transaction data set comprising at least a transaction date, a therapeutic type, and a therapeutic supply duration; identifying, from the pharmacy transaction data set and based on the therapeutic type, a pharmacy transaction subset relevant to a biological condition; computing, for at least one pharmacy transaction in the pharmacy transaction subset, an end date, wherein the transaction date corresponds to a date when the patient initiated a payment, wherein the end date is determined based on the transaction date and the therapeutic supply duration associated with the at least one pharmacy transaction; accessing, at the processing circuitry and from the memory, for the patient, a medical procedure transaction data set, each medical procedure in the medical procedure data set comprising at least a medical procedure date range and a medical procedure type; identifying, from the medical procedure transaction data set and based on the medical procedure type, a medical procedure transaction subset relevant to the biological condition; adjusting, for at least one medical procedure in the medical procedure transaction subset, a medical procedure date range based on a time period during which the medical procedure type is effective or repeated; mapping, by the processing circuitry, onto a timeline data structure stored in the memory, the pharmacy transaction subset and the medical procedure transaction subset, wherein the timeline data structure stores pharmacy transactions and medical procedure transactions arranged by date; determining, by the processing circuitry, in the timeline data structure, one or more therapy gaps during which there are no pharmacy transactions and no medical procedure transactions, wherein each therapy gap comprises a contiguous number of days, the contiguous number of days being longer than a threshold number of days; determining, by the processing circuitry, based on the one or more therapy gaps, one or more lines of therapy, each line of therapy comprising pharmacy transactions and medical procedure transactions occurring either between two therapy gaps, before an earliest temporal therapy gap, or after a latest temporal therapy gap, each line of therapy being associated with a line date range; and transmitting, to a data repository for storage thereat, a data structure identifying the patient, the one or more lines of therapy, and the line date range for each of the one or more lines of therapy.

Aspect 2. The method of aspect 1, further comprising: determining, within a single line of therapy, a first pharmacy transaction or medical procedure associated with a first biological condition stage and a second pharmacy transaction or medical procedure associated with a second biological condition stage, wherein a start date associated with the second pharmacy transaction or medical procedure is later than a start date associated with the first pharmacy transaction or medical procedure; and dividing the single line of therapy into two lines of therapy using the start date associated with the second pharmacy transaction.

Aspect 3. The method of any of aspects 1-2, wherein: the processing circuitry comprises a plurality of multithreaded graphics processing units (GPUs), the patient is one of multiple patients, the one or more lines of therapy for the patient are determined in parallel, using parallel threads of the plurality of multithreaded GPUs, with determining lines of therapy for other patients from among the multiple patients.

Aspect 4. The method of aspect 3, wherein determining the lines of therapy for the multiple patients comprises generating multiple intermediate tables, wherein each of the multiple intermediate tables is stored in the data repository for reviewing and adjusting the performance of the one or more computing machines.

Aspect 5. The method of aspect 4, wherein the multiple intermediate tables increase a computing speed of determining the lines of therapy for the multiple patients by storing intermediate computation results.

Aspect 6. The method of any of aspects 1-5, wherein, for at least one medical procedure transaction in the medical procedure transaction subset, the medical procedure date range comprises a single date, wherein the at least one medical procedure transaction is mapped onto the timeline data structure based on the single date.

Aspect 7. The method of any of aspects 1-6, wherein, for at least one medical procedure transaction in the medical procedure transaction subset, the medical procedure date range comprises a medical procedure start date and a medical procedure end date, wherein the at least one medical procedure transaction is mapped onto the timeline data structure based on the medical procedure start date and the medical procedure end date.

Aspect 8. The method of any of aspects 1-7, wherein pharmacy transactions from the pharmacy transaction subset are mapped onto the timeline data structure based on the transaction date.

Aspect 9. The method of aspect 8, wherein the at least one pharmacy transaction is mapped onto the timeline data structure based on the transaction date and the end date.

Aspect 10. The method of any of aspects 1-9, wherein the therapeutic type comprises a National Drug Code (NDC) classification, wherein the pharmacy transaction dataset comprises one or more tables, the method further comprising: determining a set of columns in the one or more tables related to drugs; parsing the set of columns to identify NDC classifications; determining a set of the NDC classifications that correspond to drugs; identifying a subset of the set of NDC classifications that correspond to drugs, the subset being associated with drugs related to the biological condition; and identifying rows in the one or more tables for placement into the pharmacy transaction subset based on the group of NDC classifications related to the biological condition.

Aspect 11. The method of any of aspects 1-10, wherein the threshold number of days is determined based on a condition type of the biological condition.

Aspect 12. A system comprising: processing circuitry; and memory storing instructions which, when executed by the processing circuitry, cause the processing circuitry to: access, for a patient, a pharmacy transaction data set, each pharmacy transaction in the pharmacy transaction data set comprising at least a transaction date, a therapeutic type, and a therapeutic supply duration; identify, from the pharmacy transaction data set and based on the therapeutic type, a pharmacy transaction subset relevant to a biological condition; compute, for at least one pharmacy transaction in the pharmacy transaction subset, an end date, wherein the transaction date corresponds to a date when the patient initiated a payment, wherein the end date is determined based on the transaction date and the therapeutic supply duration associated with the at least one pharmacy transaction; access, at the processing circuitry and from the memory, for the patient, a medical procedure transaction data set, each medical procedure in the medical procedure data set comprising at least a medical procedure date range and a medical procedure type; identify, from the medical procedure transaction data set and based on the medical procedure type, a medical procedure transaction subset relevant to the biological condition; adjust, for at least one medical procedure in the medical procedure transaction subset, a medical procedure date range based on a time period during which the medical procedure type is effective or repeated; map, onto a timeline data structure stored in the memory, the pharmacy transaction subset and the medical procedure transaction subset, wherein the timeline data structure stores pharmacy transactions and medical procedure transactions arranged by date; determine, in the timeline data structure, one or more therapy gaps during which there are no pharmacy transactions and no medical procedure transactions, wherein each therapy gap comprises a contiguous number of days, the contiguous number of days being longer than a threshold number of days; determine, based on the one or more therapy gaps, one or more lines of therapy, each line of therapy comprising pharmacy transactions and medical procedure transactions occurring either between two therapy gaps, before an earliest temporal therapy gap, or after a latest temporal therapy gap, each line of therapy being associated with a line date range; and transmit, to a data repository for storage thereat, a data structure identifying the patient, the one or more lines of therapy, and the line date range for each of the one or more lines of therapy.

Aspect 13. The system of aspect 12, wherein the memory stores additional instructions which, when executed by the processing circuitry, cause the processing circuitry to: determine, within a single line of therapy, a first pharmacy transaction or medical procedure associated with a first biological condition stage and a second pharmacy transaction or medical procedure associated with a second biological condition stage, wherein a start date associated with the second pharmacy transaction or medical procedure is later than a start date associated with the first pharmacy transaction or medical procedure; and divide the single line of therapy into two lines of therapy using the start date associated with the second pharmacy transaction.

Aspect 14. The system of any of aspects 12-13, wherein: the processing circuitry comprises a plurality of multithreaded graphics processing units (GPUs), the patient is one of multiple patients, and the one or more lines of therapy for the patient are determined in parallel, using parallel threads of the plurality of multithreaded GPUs, with determining lines of therapy for other patients from among the multiple patients.

Aspect 15. The system of aspect 14, wherein determining the lines of therapy for the multiple patients comprises generating multiple intermediate tables, wherein each of the multiple intermediate tables is stored in the data repository for reviewing and adjusting the performance of the one or more computing machines.

Aspect 16. The system of aspect 15, wherein the multiple intermediate tables increase a computing speed of determining the lines of therapy for the multiple patients by storing intermediate computation results.

Aspect 17. The system of any of aspects 12-16, wherein, for at least one medical procedure transaction in the medical procedure transaction subset, the medical procedure date range comprises a single date, wherein the at least one medical procedure transaction is mapped onto the timeline data structure based on the single date.

Aspect 18. The system of any of aspects 12-17, wherein, for at least one medical procedure transaction in the medical procedure transaction subset, the medical procedure date range comprises a medical procedure start date and a medical procedure end date, wherein the at least one medical procedure transaction is mapped onto the timeline data structure based on the medical procedure start date and the medical procedure end date.

Aspect 19. The system of any of aspects 12-18, wherein pharmacy transactions from the pharmacy transaction subset are mapped onto the timeline data structure based on the transaction date.

Aspect 20. The system of aspect 19, wherein the at least one pharmacy transaction is mapped onto the timeline data structure based on the transaction date and the end date.

Aspect 21. The system of any of aspects 12-20, wherein the therapeutic type comprises a National Drug Code (NDC) classification, wherein the pharmacy transaction dataset comprises one or more tables, the memory stores additional instructions which, when executed by the processing circuitry, cause the processing circuitry to: determine a set of columns in the one or more tables related to drugs; parse the set of columns to identify NDC classifications; determine a set of the NDC classifications that correspond to drugs; identify a subset of the set of NDC classifications that correspond to drugs, the subset being associated with drugs related to the biological condition; and identify rows in the one or more tables for placement into the pharmacy transaction subset based on the group of NDC classifications related to the biological condition.

Aspect 22. The system of any of aspects 12-21, wherein the threshold number of days is determined based on a condition type of the biological condition.

Aspect 23. One or more non-transitory machine-readable media storing instructions which, when executed by processing circuitry of one or more computing machines, cause the processing circuitry to: access, for a patient, a pharmacy transaction data set, each pharmacy transaction in the pharmacy transaction data set comprising at least a transaction date, a therapeutic type, and a therapeutic supply duration; identify, from the pharmacy transaction data set and based on the therapeutic type, a pharmacy transaction subset relevant to a biological condition; compute, for at least one pharmacy transaction in the pharmacy transaction subset, an end date, wherein the transaction date corresponds to a date when the patient initiated a payment, wherein the end date is determined based on the transaction date and the therapeutic supply duration associated with the at least one pharmacy transaction; access, at the processing circuitry and from the memory, for the patient, a medical procedure transaction data set, each medical procedure in the medical procedure data set comprising at least a medical procedure date range and a medical procedure type; identify, from the medical procedure transaction data set and based on the medical procedure type, a medical procedure transaction subset relevant to the biological condition; adjust, for at least one medical procedure in the medical procedure transaction subset, a medical procedure date range based on a time period during which the medical procedure type is effective or repeated; map, onto a timeline data structure stored in the memory, the pharmacy transaction subset and the medical procedure transaction subset, wherein the timeline data structure stores pharmacy transactions and medical procedure transactions arranged by date; determine, in the timeline data structure, one or more therapy gaps during which there are no pharmacy transactions and no medical procedure transactions, wherein each therapy gap comprises a contiguous number of days, the contiguous number of days being longer than a threshold number of days; determine, based on the one or more therapy gaps, one or more lines of therapy, each line of therapy comprising pharmacy transactions and medical procedure transactions occurring either between two therapy gaps, before an earliest temporal therapy gap, or after a latest temporal therapy gap, each line of therapy being associated with a line date range; and transmit, to a data repository for storage thereat, a data structure identifying the patient, the one or more lines of therapy, and the line date range for each of the one or more lines of therapy.

Aspect 24. The one or more machine-readable media of aspect 23, storing additional instructions which, when executed by the processing circuitry, cause the processing circuitry to: determine, within a single line of therapy, a first pharmacy transaction or medical procedure associated with a first biological condition stage and a second pharmacy transaction or medical procedure associated with a second biological condition stage, wherein a start date associated with the second pharmacy transaction or medical procedure is later than a start date associated with the first pharmacy transaction or medical procedure; and divide the single line of therapy into two lines of therapy using the start date associated with the second pharmacy transaction.

Aspect 25. The one or more machine-readable media of any of aspects 23-24, wherein: the processing circuitry comprises a plurality of multithreaded graphics processing units (GPUs), the patient is one of multiple patients, and the one or more lines of therapy for the patient are determined in parallel, using parallel threads of the plurality of multithreaded GPUs, with determining lines of therapy for other patients from among the multiple patients.

Aspect 26. The one or more machine-readable media of aspect 25, wherein determining the lines of therapy for the multiple patients comprises generating multiple intermediate tables, wherein each of the multiple intermediate tables is stored in the data repository for reviewing and adjusting the performance of the one or more computing machines.

Aspect 27. The one or more machine-readable media of aspect 26, wherein the multiple intermediate tables increase a computing speed of determining the lines of therapy for the multiple patients by storing intermediate computation results.

Aspect 28. The one or more machine-readable media of any of aspects 23-27, wherein, for at least one medical procedure transaction in the medical procedure transaction subset, the medical procedure date range comprises a single date, wherein the at least one medical procedure transaction is mapped onto the timeline data structure based on the single date.

Aspect 29. The one or more machine-readable media of any of aspects 23-28, wherein, for at least one medical procedure transaction in the medical procedure transaction subset, the medical procedure date range comprises a medical procedure start date and a medical procedure end date, wherein the at least one medical procedure transaction is mapped onto the timeline data structure based on the medical procedure start date and the medical procedure end date.

Aspect 30. The one or more machine-readable media of any of aspects 23-29, wherein pharmacy transactions from the pharmacy transaction subset are mapped onto the timeline data structure based on the transaction date.

Aspect 31. The one or more machine-readable media of aspect 23-30, wherein the at least one pharmacy transaction is mapped onto the timeline data structure based on the transaction date and the end date.

Aspect 32. The one or more machine-readable media of any of aspects 23-31, wherein the therapeutic type comprises a National Drug Code (NDC) classification, wherein the pharmacy transaction dataset comprises one or more tables, and the one or more machine-readable media store additional instructions which, when executed by the processing circuitry, cause the processing circuitry to: determine a set of columns in the one or more tables related to drugs; parse the set of columns to identify NDC classifications; determine a set of the NDC classifications that correspond to drugs; identify a subset of the set of NDC classifications that correspond to drugs, the subset being associated with drugs related to the biological condition; and identify rows in the one or more tables for placement into the pharmacy transaction subset based on the group of NDC classifications related to the biological condition.

Aspect 33. The one or more machine-readable media of any of aspects 23-32, wherein the threshold number of days is determined based on a condition type of the biological condition.

Aspect 34. A method comprising: analyzing, by a computing system having one or more processors and memory, health insurance aspects data stored by an integrated data repository to determine a number of patients that are at least one of diagnosed with a biological condition or have one or more genomic mutations detected, wherein the integrated data repository stores the health insurance aspects data in conjunction with genomic data of the number of patients; determining, by the computing system, a subset of the health insurance aspects data that corresponds to the number of patients; analyzing, by the computing system, the subset of the health insurance aspects data to determine medical procedures records for first patients of the number of patients, the medical procedures records indicating one or more medical procedures administered to treat the biological condition in the first patients and indicating one or more first dates of the one or more medical procedures; analyzing, by the computing system, the subset of health insurance aspects data to determine pharmacy records for second patients of the number of patients, the pharmacy records indicating one or more pharmaceutical treatments provided to the second patients to treat the biological condition and indicating one or more second dates related to the one or more pharmaceutical treatments; determining, by the computing system, a line of therapy corresponding to a patient of the number of patients based on at least one of the medical procedure records of the patient or the pharmacy records of the patient, the line of therapy indicating at least one of (i) a medical procedure administered to the patient to treat the biological condition and a first period of time that the medical procedure was administered or (ii) a pharmaceutical treatment provided to the individual to treat the biological condition and a second period of time that the pharmaceutical treatment is to be provided to the patient; generating, by the computing system, a lines of therapy data structure that includes the line of therapy of the patient and a number of additional lines of therapy of the first patients and the second patients; analyzing, by the computing system, information stored by the lines of therapy data structure to determine one or more quantitative measures for the first patients and the second patients in relation to at least one of a medical procedure included in the one or more medical procedures or a pharmaceutical treatment of the one or more pharmaceutical treatments, the one or more quantitative measures corresponding to at least one of a first probability of progression of the biological condition or a second probability of resistance to at least one of the medical procedure or the pharmaceutical treatment; and determining, by the computing system and based on the one or more quantitative measures, at least one of an amount of progression of the biological condition or a level of resistance to the pharmaceutical treatment for at least one of the first patients or the second patients.

Aspect 35. The method of aspect 34, comprising: determining, by the computing system and based on the one or more quantitative measures, a level of effectiveness of at least one of the medical procedure or the pharmaceutical treatment for at least one of the first patients or the second patients.

Aspect 36. The method of aspect 34 or 35, wherein: the pharmacy records indicate a first instance of the patient receiving a first supply of the pharmaceutical substance and a second instance of the patient receiving a second supply of the pharmaceutical substance; the first supply of the pharmaceutical substance and the second supply of the pharmaceutical substance is for a number of days; and the method comprises determining, by the computing system, that the first instance of the patient receiving the first supply takes place on a first date and the second instance of the patient receiving the second supply takes place on a second date.

Aspect 37. The method of aspect 36, comprising: determining, by the computing system, that the second date is less than a threshold period of time after an intermediate date that comprises the number of days of the first supply added to the first date; and determining, by the computing system, that the second instance of the patient receiving the second supply of the pharmaceutical substance is part of the line of therapy.

Aspect 38. The method of aspect 37, comprising: determining, by the computing system, that the second date is at least a threshold period of time after an intermediate date that comprises the number of days of the first supply added to the first date; and determining, by the computing system, that the second instance of the patient receiving the second supply of the pharmaceutical substance is part of an additional line of therapy that is different from the line of therapy.

Aspect 39. The method of any one of aspects 34-38, wherein: the pharmacy records indicate a first instance of the patient receiving a first supply of the pharmaceutical substance and a second instance of the patient receiving a second supply of a second pharmaceutical substance; the first supply of the pharmaceutical substance and the second supply of the pharmaceutical substance is for a number of days; and the method comprises determining, by the computing system, that the first instance of the patient receiving the first supply takes place on a first date and the second instance of the patient receiving the second supply takes place on a second date.

Aspect 40. The method of aspect 39, comprising: determining, by the computing system, that the second date is at least a threshold period of time after an intermediate date that comprises the number of days of the first supply added to the first date; and determining, by the computing system, that the second instance of the patient receiving the second supply of the second pharmaceutical substance is part of an additional line of therapy that is different from the line of therapy.

Aspect 41. The method of aspect 39, comprising: determining, by the computing system, that the second date is at least a threshold period of time after an intermediate date that comprises the number of days of the first supply added to the first date; determining, by the computing system, that the first pharmaceutical substance and the second pharmaceutical substance are part of a primary course of treatment for the biological condition; and determining, by the computing system, that the second instance of the patient receiving the second supply of the second pharmaceutical substance is part of the line of therapy.

Aspect 42. The method of any one of aspects 34-41, wherein the one or more quantitative measures include at least one of time-to-next-treatment, time to death, or real world overall survival.

Aspect 43. The method of aspect 42, comprising: determining, by the computing system, at least one of the amount of progression of the biological condition or the level of resistance to the pharmaceutical substance for the patient based on the time-to-next-treatment for the patient over a period of time with respect to the line of therapy and one or more additional lines of therapy.

Aspect 44. The method of any one of aspects 34-43, comprising: generating, by the computing system, a procedures data table that stores the medical procedures records for first patients; generating, by the computing system, a pharmacy data table storing the pharmacy records for second patients; and analyzing, by the computing system, first information stored by the procedures data table and second information stored by the pharmacy data table according to a framework that indicates at least one of one or more threshold time periods, one or more criteria, or one or more data analysis rules that correspond to the biological condition to generate a lines of therapy data structure that includes the line of therapy.

Aspect 45. A system comprising: one or more hardware processing units; one or more computer-readable storage media storing computer-executable instructions that, when executed by the one or more hardware processing units, cause the system to perform operations comprising: analyzing health insurance aspects data stored by an integrated data repository to determine a number of patients that are at least one of diagnosed with a biological condition or have one or more genomic mutations detected, wherein the integrated data repository stores the health insurance aspects data in conjunction with genomic data of the number of patients; determining a subset of the health insurance aspects data that corresponds to the number of patients; analyzing the subset of the health insurance aspects data to determine medical procedures records for first patients of the number of patients, the medical procedures records indicating one or more medical procedures administered to treat the biological condition in the first patients and indicating one or more first dates of the one or more medical procedures; analyzing the subset of health insurance aspects data to determine pharmacy records for second patients of the number of patients, the pharmacy records indicating one or more pharmaceutical treatments provided to the second patients to treat the biological condition and indicating one or more second dates related to the one or more pharmaceutical treatments; determining, by the computing system, a line of therapy corresponding to a patient of the number of patients based on at least one of the medical procedure records of the patient or the pharmacy records of the patient, the line of therapy indicating at least one of (i) a medical procedure administered to the patient to treat the biological condition and a first period of time that the medical procedure was administered or (ii) a pharmaceutical treatment provided to the individual to treat the biological condition and a second period of time that the pharmaceutical treatment is to be provided to the patient; generating a lines of therapy data structure that includes the line of therapy of the patient and a number of additional lines of therapy of the first patients and the second patients; analyzing information stored by the lines of therapy data structure to determine one or more quantitative measures for the first patients and the second patients in relation to at least one of a medical procedure included in the one or more medical procedures or a pharmaceutical treatment of the one or more pharmaceutical treatments, the one or more quantitative measures corresponding to at least one of a first probability of progression of the biological condition or a second probability of resistance to at least one of the medical procedure or the pharmaceutical treatment; and determining, based on the one or more quantitative measures, at least one of an amount of progression of the biological condition or a level of resistance to the pharmaceutical treatment for at least one of the first patients or the second patients.

Aspect 46. The system of aspect 45, wherein the one or more computer-readable storage media store additional computer-executable instructions that, when executed by the one or more hardware processing units, cause the system to perform additional operations comprising: determining, based on the one or more quantitative measures, a level of effectiveness of at least one of the medical procedure or the pharmaceutical treatment for at least one of the first patients or the second patients.

Aspect 47. The system of aspect 45 or 46, wherein: the pharmacy records indicate a first instance of the patient receiving a first supply of the pharmaceutical substance and a second instance of the patient receiving a second supply of the pharmaceutical substance; the first supply of the pharmaceutical substance and the second supply of the pharmaceutical substance is for a number of days; and the one or more computer-readable storage media store additional computer-executable instructions that, when executed by the one or more hardware processing units, cause the system to perform additional operations comprising determining that the first instance of the patient receiving the first supply takes place on a first date and the second instance of the patient receiving the second supply takes place on a second date.

Aspect 48. The system of aspect 47, wherein the one or more computer-readable storage media store additional computer-executable instructions that, when executed by the one or more hardware processing units, cause the system to perform additional operations comprising: determining that the second date is less than a threshold period of time after an intermediate date that comprises the number of days of the first supply added to the first date; and determining that the second instance of the patient receiving the second supply of the pharmaceutical substance is part of the line of therapy.

Aspect 49. The system of aspect 48, wherein the one or more computer-readable storage media store additional computer-executable instructions that, when executed by the one or more hardware processing units, cause the system to perform additional operations comprising: determining that the second date is at least a threshold period of time after an intermediate date that comprises the number of days of the first supply added to the first date; and determining that the second instance of the patient receiving the second supply of the pharmaceutical substance is part of an additional line of therapy that is different from the line of therapy.

Aspect 50. The method of any one of aspects 45-49, wherein: the pharmacy records indicate a first instance of the patient receiving a first supply of the pharmaceutical substance and a second instance of the patient receiving a second supply of a second pharmaceutical substance; the first supply of the pharmaceutical substance and the second supply of the pharmaceutical substance is for a number of days; and the one or more computer-readable storage media store additional computer-executable instructions that, when executed by the one or more hardware processing units, cause the system to perform additional operations comprising determining that the first instance of the patient receiving the first supply takes place on a first date and the second instance of the patient receiving the second supply takes place on a second date.

Aspect 51. The system of aspect 50, wherein the one or more computer-readable storage media store additional computer-executable instructions that, when executed by the one or more hardware processing units, cause the system to perform additional operations comprising: determining that the second date is at least a threshold period of time after an intermediate date that comprises the number of days of the first supply added to the first date; and determining that the second instance of the patient receiving the second supply of the second pharmaceutical substance is part of an additional line of therapy that is different from the line of therapy.

Aspect 52. The system of aspect 51, wherein the one or more computer-readable storage media store additional computer-executable instructions that, when executed by the one or more hardware processing units, cause the system to perform additional operations comprising: determining that the second date is at least a threshold period of time after an intermediate date that comprises the number of days of the first supply added to the first date; determining that the first pharmaceutical substance and the second pharmaceutical substance are part of a primary course of treatment for the biological condition; and determining that the second instance of the patient receiving the second supply of the second pharmaceutical substance is part of the line of therapy.

Aspect 53. The system of any one of aspects 45-52, wherein the one or more quantitative measures include at least one of time-to-next-treatment, time to death, or real world overall survival.

Aspect 54. The system of aspect 53, wherein the one or more computer-readable storage media store additional computer-executable instructions that, when executed by the one or more hardware processing units, cause the system to perform additional operations comprising: determining at least one of the amount of progression of the biological condition or the level of resistance to the pharmaceutical substance for the patient based on the time-to-next-treatment for the patient over a period of time with respect to the line of therapy and one or more additional lines of therapy.

Aspect 55. The system of any one of aspects 45-54, wherein the one or more computer-readable storage media store additional computer-executable instructions that, when executed by the one or more hardware processing units, cause the system to perform additional operations comprising: generating a procedures data table that stores the medical procedures records for first patients; generating a pharmacy data table storing the pharmacy records for second patients; and analyzing first information stored by the procedures data table and second information stored by the pharmacy data table according to a framework that indicates at least one of one or more threshold time periods, one or more criteria, or one or more data analysis rules that correspond to the biological condition to generate a lines of therapy data structure that includes the line of therapy.

Aspect 56. One or more non-transitory computer-readable storage media storing computer-executable instructions that, when executed by one or more hardware processing units, cause the system to perform operations comprising: analyzing health insurance aspects data stored by an integrated data repository to determine a number of patients that are at least one of diagnosed with a biological condition or have one or more genomic mutations detected, wherein the integrated data repository stores the health insurance aspects data in conjunction with genomic data of the number of patients; determining a subset of the health insurance aspects data that corresponds to the number of patients; analyzing the subset of the health insurance aspects data to determine medical procedures records for first patients of the number of patients, the medical procedures records indicating one or more medical procedures administered to treat the biological condition in the first patients and indicating one or more first dates of the one or more medical procedures; analyzing the subset of health insurance aspects data to determine pharmacy records for second patients of the number of patients, the pharmacy records indicating one or more pharmaceutical treatments provided to the second patients to treat the biological condition and indicating one or more second dates related to the one or more pharmaceutical treatments; determining, by the computing system, a line of therapy corresponding to a patient of the number of patients based on at least one of the medical procedure records of the patient or the pharmacy records of the patient, the line of therapy indicating at least one of (i) a medical procedure administered to the patient to treat the biological condition and a first period of time that the medical procedure was administered or (ii) a pharmaceutical treatment provided to the individual to treat the biological condition and a second period of time that the pharmaceutical treatment is to be provided to the patient; generating a lines of therapy data structure that includes the line of therapy of the patient and a number of additional lines of therapy of the first patients and the second patients; analyzing information stored by the lines of therapy data structure to determine one or more quantitative measures for the first patients and the second patients in relation to at least one of a medical procedure included in the one or more medical procedures or a pharmaceutical treatment of the one or more pharmaceutical treatments, the one or more quantitative measures corresponding to at least one of a first probability of progression of the biological condition or a second probability of resistance to at least one of the medical procedure or the pharmaceutical treatment; and determining, based on the one or more quantitative measures, at least one of an amount of progression of the biological condition or a level of resistance to the pharmaceutical treatment for at least one of the first patients or the second patients.

Aspect 57. The one or more non-transitory computer-readable media of aspect 56, comprising additional computer-executable instructions that, when executed by the one or more hardware processing units, cause the system to perform additional operations comprising: determining, based on the one or more quantitative measures, a level of effectiveness of at least one of the medical procedure or the pharmaceutical treatment for at least one of the first patients or the second patients.

Aspect 58. The one or more non-transitory computer-readable media of aspect 56 or 57, wherein: the pharmacy records indicate a first instance of the patient receiving a first supply of the pharmaceutical substance and a second instance of the patient receiving a second supply of the pharmaceutical substance; the first supply of the pharmaceutical substance and the second supply of the pharmaceutical substance is for a number of days; and the one or more non-transitory computer-readable storage media store additional computer-executable instructions that, when executed by the one or more hardware processing units, cause the one or more hardware processing units to perform additional operations comprising determining that the first instance of the patient receiving the first supply takes place on a first date and the second instance of the patient receiving the second supply takes place on a second date.

Aspect 59. The one or more non-transitory computer-readable media of aspect 58, comprising additional computer-executable instructions that, when executed by the one or more hardware processing units, cause the system to perform additional operations comprising: determining that the second date is less than a threshold period of time after an intermediate date that comprises the number of days of the first supply added to the first date; and determining that the second instance of the patient receiving the second supply of the pharmaceutical substance is part of the line of therapy.

Aspect 60. The one or more non-transitory computer-readable media of aspect 59, comprising additional computer-executable instructions that, when executed by the one or more hardware processing units, cause the system to perform additional operations comprising: determining that the second date is at least a threshold period of time after an intermediate date that comprises the number of days of the first supply added to the first date; and determining that the second instance of the patient receiving the second supply of the pharmaceutical substance is part of an additional line of therapy that is different from the line of therapy.

Aspect 61. The one or more non-transitory computer-readable media of any one of aspects 56-60, wherein: the pharmacy records indicate a first instance of the patient receiving a first supply of the pharmaceutical substance and a second instance of the patient receiving a second supply of a second pharmaceutical substance; the first supply of the pharmaceutical substance and the second supply of the pharmaceutical substance is for a number of days; and the one or more non-transitory computer-readable storage media store additional computer-executable instructions that, when executed by the one or more hardware processing units, cause the one or more hardware processing units to perform additional operations comprising determining that the first instance of the patient receiving the first supply takes place on a first date and the second instance of the patient receiving the second supply takes place on a second date.

Aspect 62. The one or more non-transitory computer-readable media of aspect 61, comprising additional computer-executable instructions that, when executed by the one or more hardware processing units, cause the system to perform additional operations comprising: determining that the second date is at least a threshold period of time after an intermediate date that comprises the number of days of the first supply added to the first date; and determining that the second instance of the patient receiving the second supply of the second pharmaceutical substance is part of an additional line of therapy that is different from the line of therapy.

Aspect 63. The one or more non-transitory computer-readable media of aspect 56, comprising additional computer-executable instructions that, when executed by the one or more hardware processing units, cause the system to perform additional operations comprising: determining that the second date is at least a threshold period of time after an intermediate date that comprises the number of days of the first supply added to the first date; determining that the first pharmaceutical substance and the second pharmaceutical substance are part of a primary course of treatment for the biological condition; and determining that the second instance of the patient receiving the second supply of the second pharmaceutical substance is part of the line of therapy.

Aspect 64. The one or more non-transitory computer-readable media of any one of aspects 56-63, wherein the one or more quantitative measures include at least one of time-to-next-treatment, time to death, or real world overall survival.

Aspect 65. The one or more non-transitory computer-readable media of aspect 64, comprising additional computer-executable instructions that, when executed by the one or more hardware processing units, cause the system to perform additional operations comprising: determining at least one of the amount of progression of the biological condition or the level of resistance to the pharmaceutical substance for the patient based on the time-to-next-treatment for the patient over a period of time with respect to the line of therapy and one or more additional lines of therapy.

Aspect 66. The one or more non-transitory computer-readable media of any one of aspects 56-65, comprising additional computer-executable instructions that, when executed by the one or more hardware processing units, cause the system to perform additional operations comprising: generating a procedures data table that stores the medical procedures records for first patients; generating a pharmacy data table storing the pharmacy records for second patients; and analyzing first information stored by the procedures data table and second information stored by the pharmacy data table according to a framework that indicates at least one of one or more threshold time periods, one or more criteria, or one or more data analysis rules that correspond to the biological condition to generate a lines of therapy data structure that includes the line of therapy.

Aspect 67 is an apparatus comprising means to implement any of Aspects 1-11.

Aspect 68 is an apparatus comprising means to implement any of Aspects 34-44.

Example 1

Figure 11:
FIG. 11 illustrates a graph and a table showing the MSI-H score, the maximum variant allele fraction (VAF), and intervening treatment for serial testing for MSI-H.

Identification of microsatellite instability in the high status (MSI-H) is clinically meaningful in patients with advanced gastrointestinal (aGI) cancers given the associated approval of multiple immune checkpoint inhibitors (ICI). MSI-H has long been assessed via tissue analysis and insights from plasma-based approaches are limited to small validation studies. We sought to assess prevalence of initial and potentially acquired MSI-H status across aGI and report real-world outcomes of colorectal cancer (CRC) patients who received ICI after MSI-H identification by a commercially available liquid biopsy assay. Assessment of MSI prevalence Genomic results from patients with advanced GI cancers who had testing using the commercially available liquid biopsy assay as part of routine clinical care from October 2019-September 2021 were queried to assess MSI-H prevalence and identify cases of potential acquired MSI-H. The prevalence of MSI-H in nearly 30,000 advanced GI patients is shown in FIG. 10. FIG. 11 shows the MSI-H score, the maximum variant allele fraction (VAF), and intervening treatment for serial testing for MSI-H.

Assessment of outcomes for patients with colorectal cancer with MSI-H were identified from the liquid biopsy assay. Real-world evidence (RWE) was sourced from an integrated data repository, which comprised of aggregated payer claims and de-identified records from >150,000 individuals with comprehensive cell-free circulating tumor DNA (ctDNA) test results via the liquid biopsy assay, from November 2018-May 2021. Patients with plasma-identified MSI-H who started new therapy ≤60 days after assay report date were sorted into groups: Group 1 was treated with chemotherapy+/−biologic therapy ("Chemo") Group 2 was treated with immunotherapy via pembrolizumab or nivolumab ("ICI")—Real-world time to discontinuation (rwTTD) and real-world time-to-next-treatment (rwTTNT) were assessed as proxies for progression free survival. Log-rank tests were used to assess differences in rwTTD, rwTTNT and overall survival.

Figure 12:
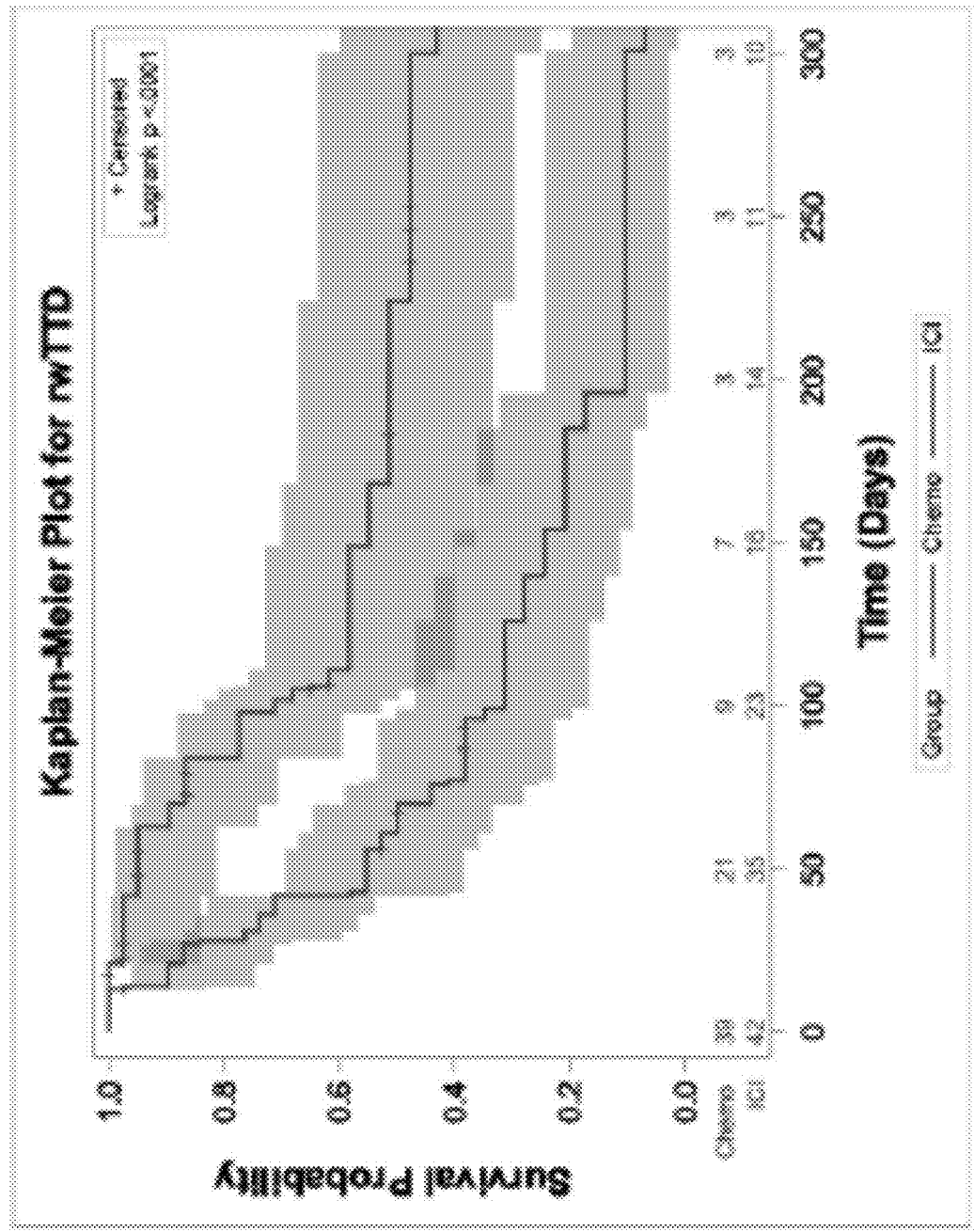
FIG. 12 illustrates a Kaplan-Meier plot showing real world time to death across treatment groups.
Figure 13:
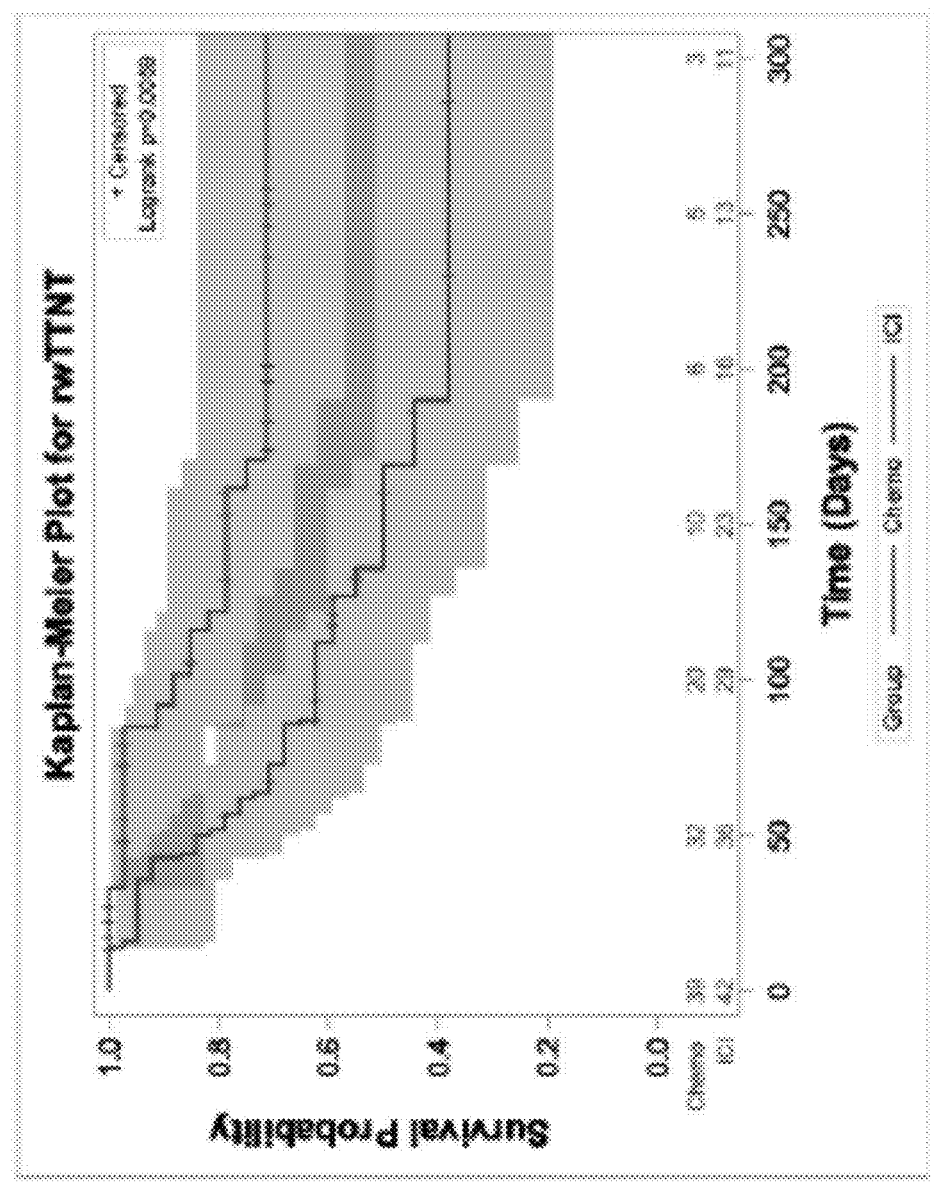
FIG. 13 illustrates a Kaplan-Meier plot showing real world time-to-next-treatment across treatment groups.
Figure 14:
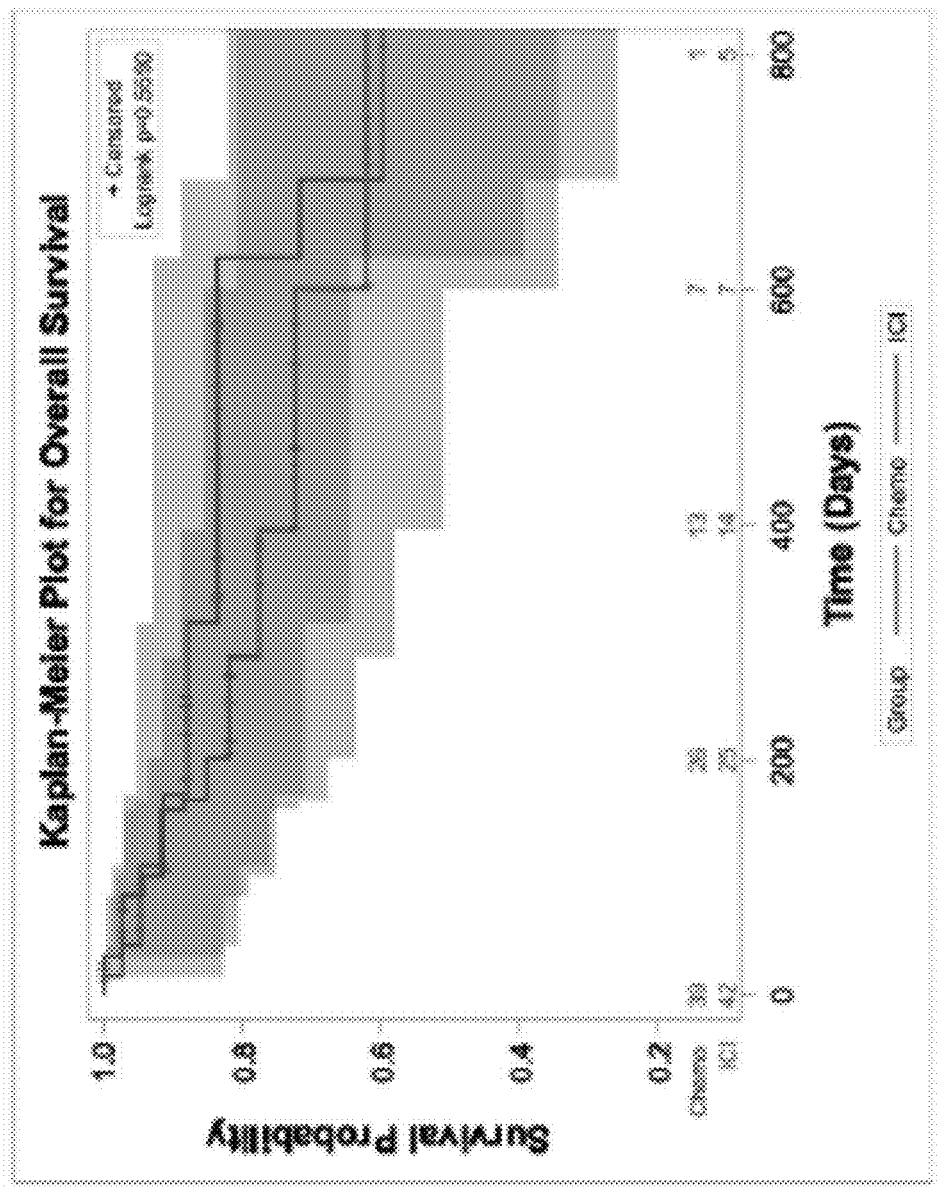
FIG. 14 illustrates a Kaplan-Meier plot showing overall survival probability across treatment groups.

Patients who received ICI following MSI-H detection on liquid biopsy had significantly longer rwTTD, rwTTNT compared to patients who received chemotherapy. Of 1,227 patients with MSI-H in the integrated data repository, 222 had CRC and were eligible for RWE analysis. 89/222 (45%) started new therapy within 60 days of results: 42 (47%) received ICI, 39 (44%) received chemo, 8 (9%) received mixed regimens. FIG. 12 illustrates rwTTD across treatment groups. Patients who received ICI had significantly longer rwTTD than patients who received chemotherapy: median months to discontinuation=7.5 (95% CI 3.4-12.3) vs. 2 (95% 1.4-3.3), p<0.001. FIG. 13 illustrates rwTTNT across treatment groups. Patients who received ICI had significantly longer rwTTNT than patients who received chemotherapy: median months to next treatment=23.8 (95% 10.6-NA) vs. 4.5 (95% CI 2.9-NA), p=0.006. Additionally, FIG. 14 illustrates overall survival across treatment groups. No significant overall survival difference was observed between patients treated with ICI and patients treated with chemotherapy (p=0.559).

This commercial liquid biopsy assay detected MSI-H at similar frequencies to published tissue cohorts and may identify acquired MSI-H following early lines of therapy, although a rare phenomenon. Well-validated liquid biopsy is a viable tool to identify initial and acquired MSI-H in advanced gastric cancers and may expand the number of patients who could benefit from ICI therapy, particularly in cases where access to tissue specimens is not feasible. Serial analysis and/or testing patients with aGI cancers using liquid biopsy at progression may maximize opportunities to access ICI. Patients who received ICI following identification of MSI-H via liquid biopsy achieved clinical responses consistent with published data in pre-treated advanced colorectal cancer; MSI-H may be treated when identified on liquid biopsy similarly as it would as if identified on tissue.

Example 2

Alpelisib is an alpha-selective PI3K-inhibitor approved in combination with fulvestrant for PIK3CA-mt HR+/HER2− advanced breast cancer. These mutations may either be truncal (clonal) or acquired (subclonal) under treatment pressure; however, data regarding the efficacy of alpelisib in these two population are currently limited. This study utilized RWE to assess how the PIK3CA genomic environment impacts alpelisib response.

RWE was sourced from an integrated data repository, which comprises aggregated commercial payer health claims and de-identified records from over 140,000 individuals with comprehensive cell-free circulating tumor DNA (ctDNA) test results via a commercially available liquid biopsy. All HR+/HER2− advanced breast cancer patients with one or more of the 11 PIK3CA-mt cited in the therascreen PIK3CA RGQ PCR Kit alpelisib companion diagnostic identified via ctDNA since May 2019 (the month alpelisib was FDA-approved) were included.

Figure 15:
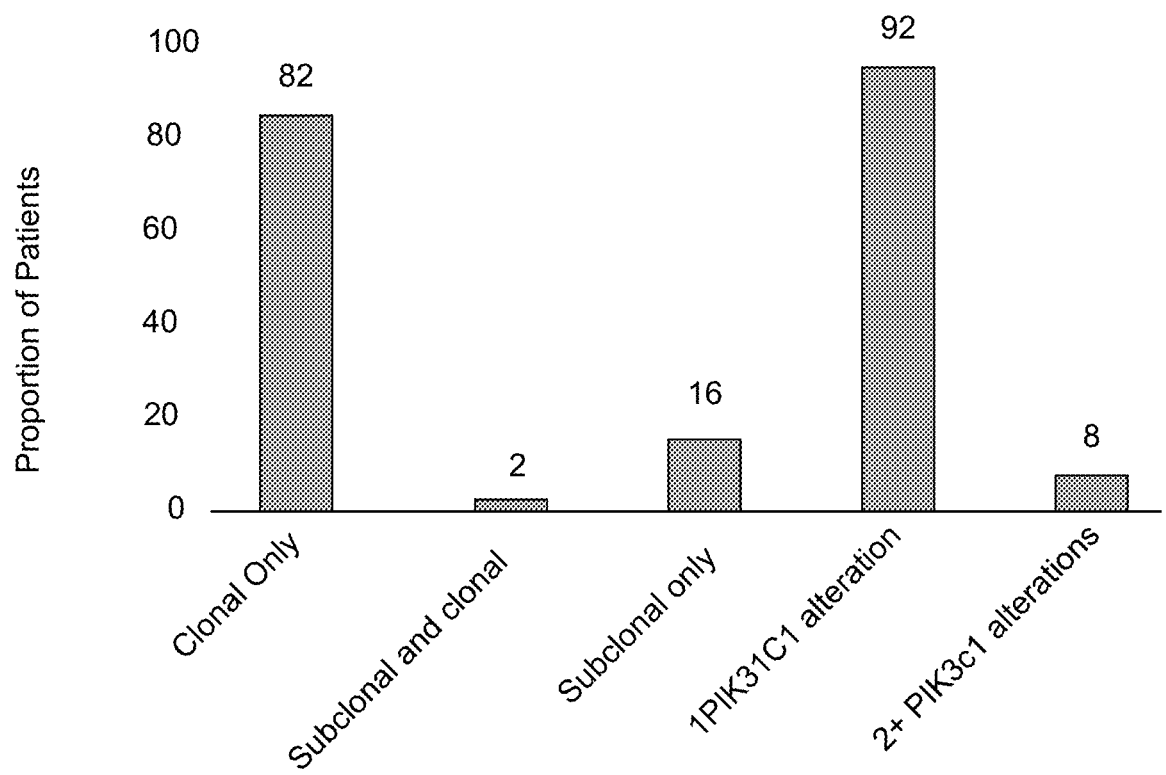
FIG. 15 illustrates a table showing a proportion of patients having one or more PIK3CA-mt mutations and indicating whether the mutations were clonal, subclonal, or both.

PIK3CA-mt were defined by clonal fraction (copy number-adjusted PIK3CA mutation allelic fraction/maximum somatic mutation allelic fraction) >50% (clonal) or ≤50% (subclonal). Real-world time to treatment discontinuation (rwTTD) and real-world time-to-next-treatment (rwTTNT) were assessed as proxies for progression free survival. Log-rank tests were used to assess differences in rwTTD and rwTTNT and Chi-squared tests were used to compare the proportion of PIK3CA-mt and other co-occurring alterations between patients with only clonal and only subclonal PIK3CA-mt. Cox proportional hazards models were used to obtain hazard ratios. Of 223 eligible patients, 216 (96%) had no prior alpelisib exposure and were included for further analysis. As indicated in FIG. 15, most patients had one PIK3CA-mt (73%), and 82% harbored only clonal mutations.

Figure 16:
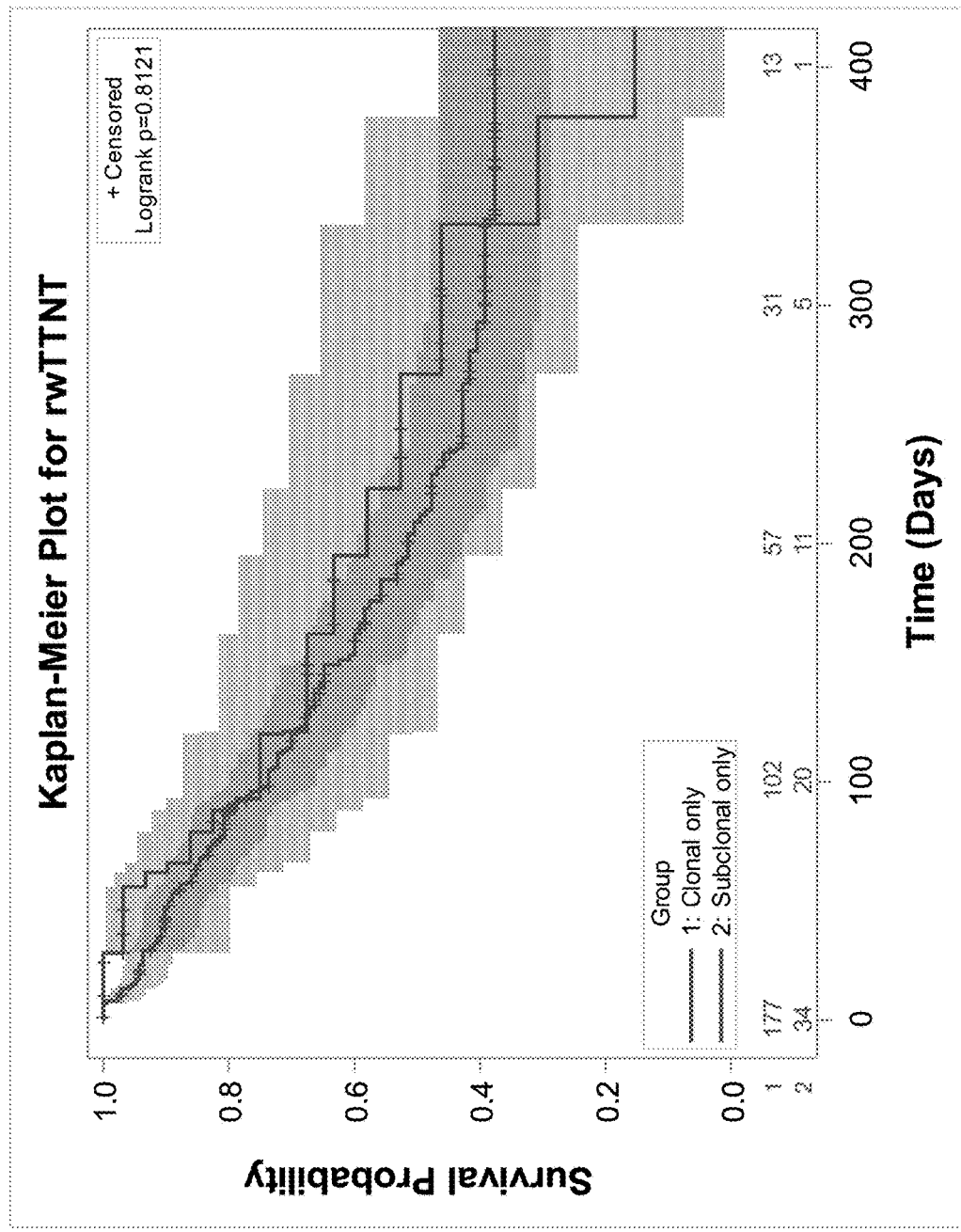
FIG. 16 illustrates a Kaplan-Meier plot showing real world time-to-next-treatment for groups having clonal PIK3CA-mt mutations or subclonal PIK3CA-mt mutations.
Figure 17:
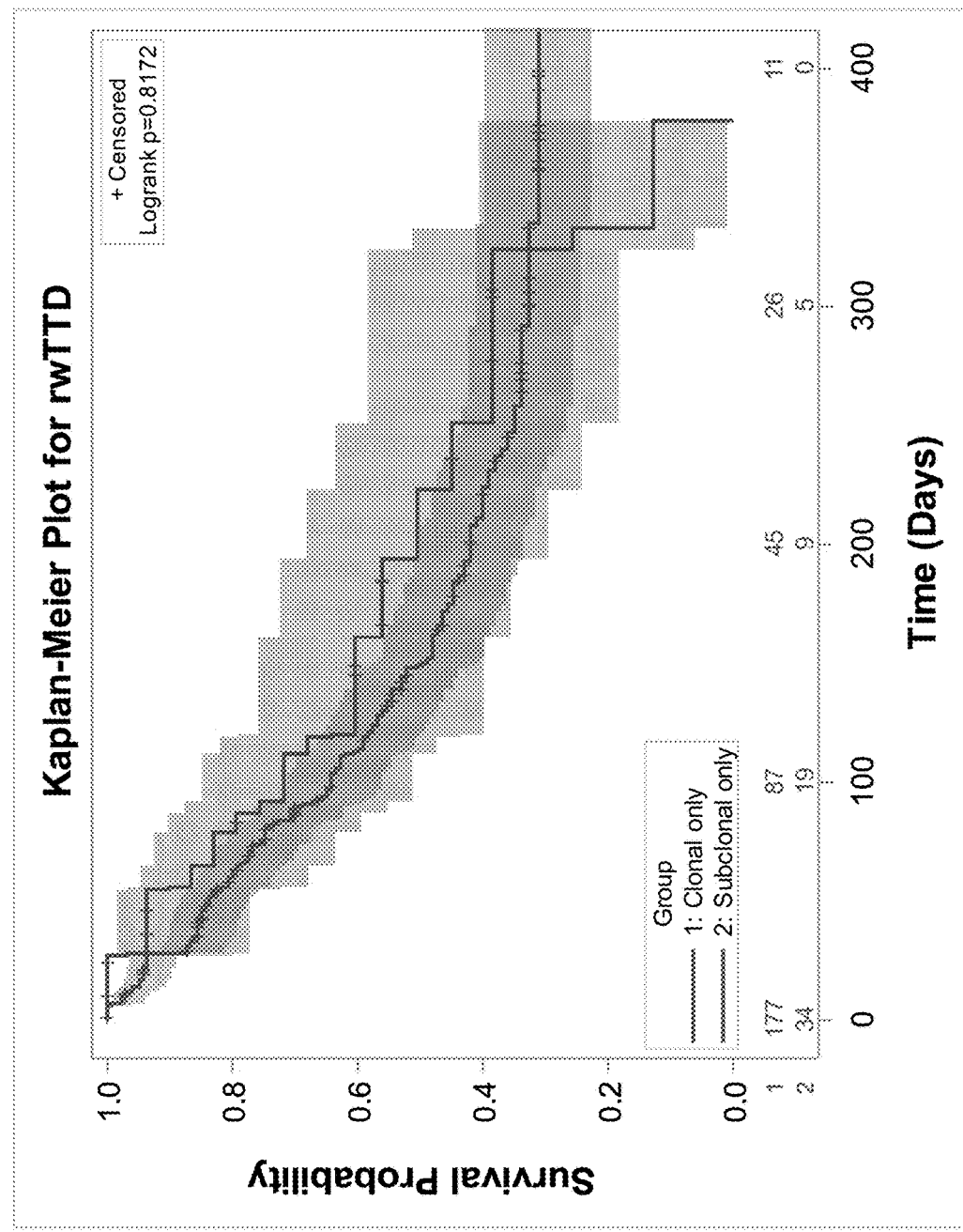
FIG. 17 illustrates a Kaplan-Meier plot showing real world time to death for groups having clonal PIK3CA-mt mutations or subclonal PIK3CA-mt mutations.
Figure 18:
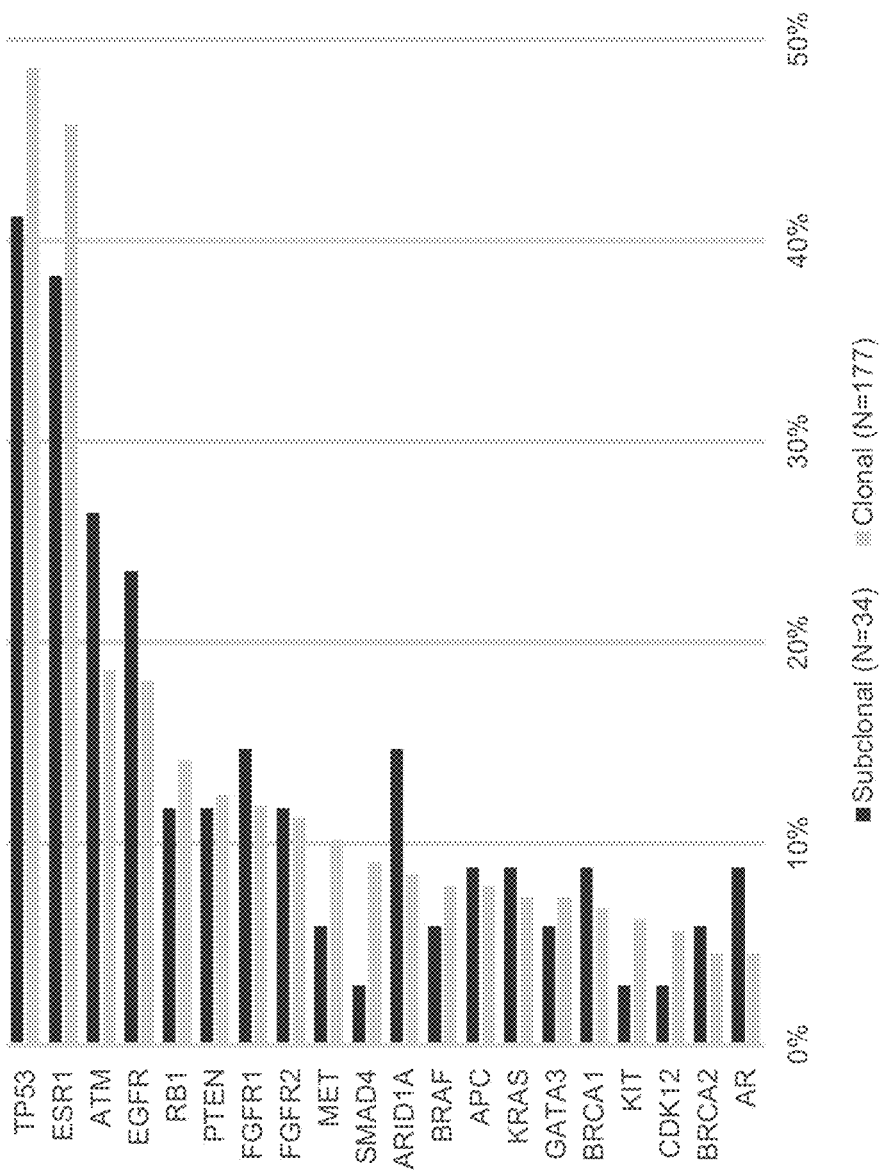
FIG. 18 illustrates a graph showing a Cox proportional hazard ratio with regard to time-to-next-treatment and time to death of patients having clonal PIK3CA-mt mutations or subclonal PIK3CA-mt mutations.
Figure 19:
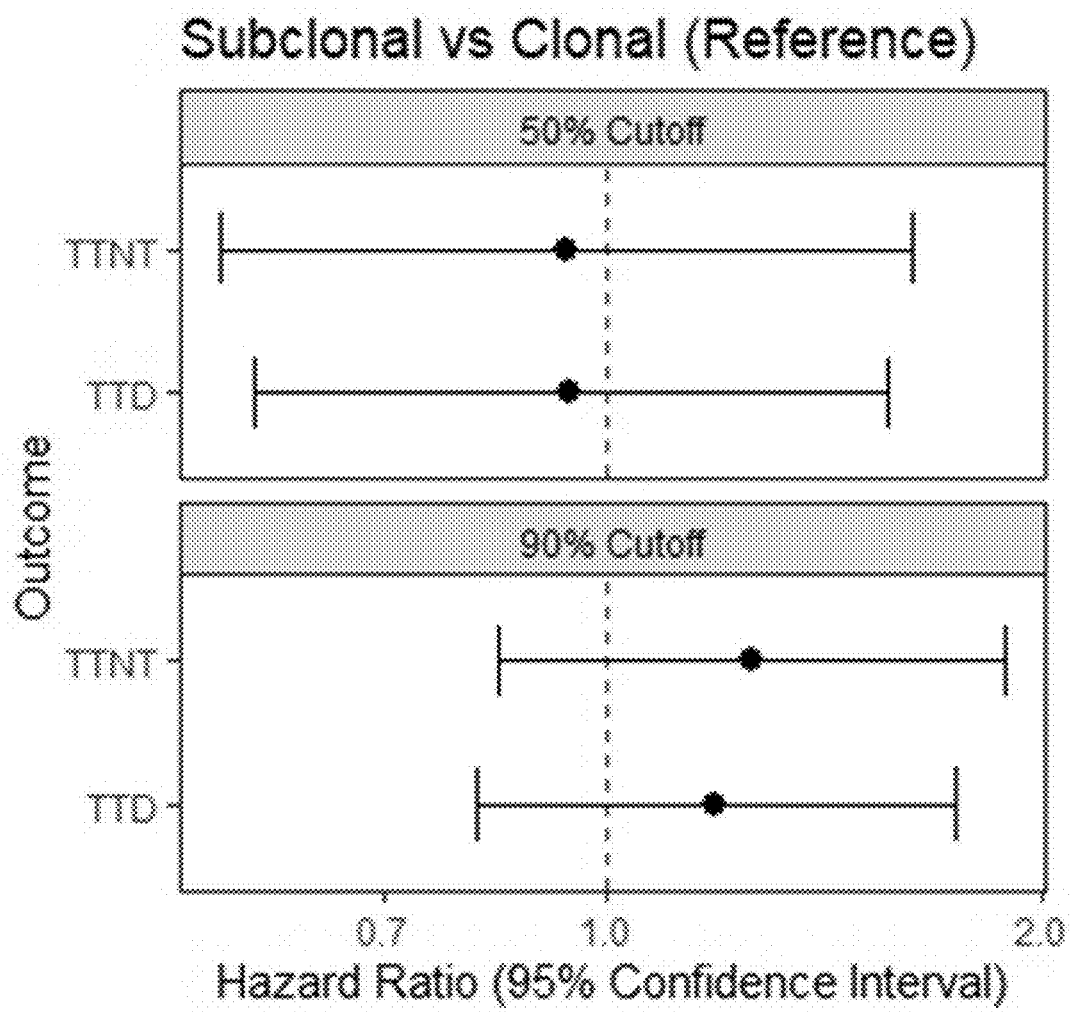
FIG. 19 illustrates a graph showing one or more additional genomic mutations present in patients having clonal PIK3CA-mt mutations or subclonal PIK3CA-mt mutations.

PIK3CA E454K and E454G alterations were significantly more likely to be subclonal rather than clonal (p=0.033 and 0.017, respectively); H1047R, E542K, H1047L, and G546R were seen as both clonal and subclonal alterations. As shown in FIGS. 16 and 17, there was no significant difference in rwTTD or rwTTNT for alpelisib in patients with clonal versus subclonal PIK3CA-mt. Using a cutoff for clonality of ≥90% clonal fraction also yielded no significant difference in rwTTD and rwTTNT, as shown in FIG. 18. There were no significant differences in the frequency of co-occurring alterations between samples with clonal versus subclonal PIK3A-mt, as shown in FIG. 19. Many alterations known to be associated with resistance to alpelisib and/or CDK4/6 inhibitors were noted, including RB1 and PTEN loss of function mutations.

Examination of RWE data from over 200 advanced breast cancer patients treated with alpelisib following identification of a PIK3CA-mt via ctDNA showed no significant difference in alpelisib outcomes based on the clonality of the PIK3CA-mt identified, suggesting that PIK3CA-mt do not need to be clonal in order for a patient to benefit from alpelisib therapy, which is notable as 16% of patients only had subclonal PIK3CA-mt identified. Certain PIK3CA-mt were significantly more likely to be subclonal, suggesting potential underlying biological differences (e.g., treatment pressure) driving development of these mutations. While patients with both clonal and subclonal PIK3CA-mt had no significant differences in co-occurring alterations, both cohorts had alterations suggestive of primary and/or acquired resistance to common therapies, including alpelisib and CDK4/6 inhibitors.

What is claimed is:

1. A method of providing therapy to a patient, implemented at one or more computing machines comprising processing circuitry and memory, the method comprising:

accessing, at the processing circuitry and from the memory, for a patient, a pharmacy transaction data set, each pharmacy transaction in the pharmacy transaction data set comprising at least a transaction date, a therapeutic type, and a therapeutic supply duration;

parsing the one or more tables to identify from the pharmacy transaction data set and based on the therapeutic type, a pharmacy transaction subset relevant to a biological condition;

computing, for at least one pharmacy transaction in the pharmacy transaction subset, an end date, wherein the transaction date corresponds to a date when the patient initiated a payment, wherein the end date is determined based on the transaction date and the therapeutic supply duration associated with the at least one pharmacy transaction;

accessing, at the processing circuitry and from the memory, for the patient, a medical procedure transaction data set, each medical procedure in the medical procedure data set comprising at least a medical procedure date range and a medical procedure type;

identifying, from the medical procedure transaction data set and based on the medical procedure type, a medical procedure transaction subset relevant to the biological condition;

adjusting, for at least one medical procedure in the medical procedure transaction subset, a medical procedure date range based on a time period during which the medical procedure type is effective or repeated;

mapping, by the processing circuitry, onto a timeline data structure stored in the memory, the pharmacy transaction subset and the medical procedure transaction subset, wherein the timeline data structure stores pharmacy transactions and medical procedure transactions arranged by date;

determining, by the processing circuitry, in the timeline data structure, one or more therapy gaps during which there are no pharmacy transactions and no medical procedure transactions, wherein each therapy gap comprises a contiguous number of days, the contiguous number of days being longer than a threshold number of days;

determining, by the processing circuitry, based on the one or more therapy gaps, one or more lines of therapy, each line of therapy comprising pharmacy transactions and medical procedure transactions occurring either between two therapy gaps, before an earliest temporal therapy gap, or after a latest temporal therapy gap, each line of therapy being associated with a line date range;

generating a database by transmitting, to a data repository, a data structure comprising information associated with the patient, the information relating to the one or more lines of therapy, and the line date range for each of the one or more lines of therapy;

based on a determination that the patient possesses a breast cancer mutation having a first clonal fraction at or below a maximum breast cancer somatic mutation allelic fraction of 50%, causing administration of a PI3K inhibitor targeting the breast cancer mutation to the patient according to the one or more lines of therapy;

identifying, based on the data structure, that another patient possesses a breast cancer mutation of a second clonal fraction higher than the first clonal fraction; and causing administration of the PI3K inhibitor to the another patient according to the one or more lines of therapy;

wherein the administration of the PI3K inhibitor to the patient having the first clonal fraction and the administration of the PI3K inhibitor to the another patient having the second clonal fraction result in substantially similar progression-free survival metrics.

2. The method of claim 1, further comprising:
determining, within a single line of therapy, a first pharmacy transaction or medical procedure associated with a first biological condition stage and a second pharmacy transaction or medical procedure associated with a second biological condition stage, wherein a start date associated with the second pharmacy transaction or medical procedure is later than a start date associated with the first pharmacy transaction or medical procedure; and
dividing the single line of therapy into two lines of therapy using the start date associated with the second pharmacy transaction.

3. The method of claim 1, wherein:
the processing circuitry comprises a plurality of multithreaded graphics processing units (GPUs),
the patient is one of multiple patients,
the one or more lines of therapy for the patient are determined in parallel, using parallel threads of the plurality of multithreaded GPUs, with determining lines of therapy for other patients from among the multiple patients.

4. The method of claim 3, wherein determining the lines of therapy for the multiple patients comprises generating multiple intermediate tables, wherein each of the multiple intermediate tables is stored in the data repository for reviewing and adjusting the performance of the one or more computing machines.

5. The method of claim 4, wherein the multiple intermediate tables increase a computing speed of determining the lines of therapy for the multiple patients by storing intermediate computation results.

6. The method of claim 1, wherein, for at least one medical procedure transaction in the medical procedure transaction subset, the medical procedure date range comprises a single date, wherein the at least one medical procedure transaction is mapped onto the timeline data structure based on the single date.

7. The method of claim 1, wherein, for at least one medical procedure transaction in the medical procedure transaction subset, the medical procedure date range comprises a medical procedure start date and a medical procedure end date, wherein the at least one medical procedure transaction is mapped onto the timeline data structure based on the medical procedure start date and the medical procedure end date.

8. The method of claim 1, wherein pharmacy transactions from the pharmacy transaction subset are mapped onto the timeline data structure based on the transaction date.

9. The method of claim 8, wherein the at least one pharmacy transaction is mapped onto the timeline data structure based on the transaction date and the end date.

10. The method of claim 1, wherein the therapeutic type comprises a National Drug Code (NDC) classification, wherein the pharmacy transaction dataset comprises one or more tables, the method further comprising:
determining a set of columns in the one or more tables related to drugs;
parsing the set of columns to identify NDC classifications;
determining a set of the NDC classifications that correspond to drugs;
identifying a subset of the set of NDC classifications that correspond to drugs, the subset being associated with drugs related to the biological condition; and
identifying rows in the one or more tables for placement into the pharmacy transaction subset based on the group of NDC classifications related to the biological condition.

11. The method of claim 1, wherein the threshold number of days is determined based on a condition type of the biological condition.

12. A system comprising:
processing circuitry; and
a memory storing instructions which, when executed by the processing circuitry, cause the processing circuitry to:
access, for a patient, a pharmacy transaction data set, each pharmacy transaction in the pharmacy transaction data set comprising at least a transaction date, a therapeutic type, and a therapeutic supply duration;
parsing the one or more tables to identify, from the pharmacy transaction data set and based on the therapeutic type, a pharmacy transaction subset relevant to a biological condition;
compute, for at least one pharmacy transaction in the pharmacy transaction subset, an end date, wherein the transaction date corresponds to a date when the patient initiated a payment, wherein the end date is determined based on the transaction date and the therapeutic supply duration associated with the at least one pharmacy transaction;
access, at the processing circuitry and from the memory, for the patient, a medical procedure transaction data set, each medical procedure in the medical procedure data set comprising at least a medical procedure date range and a medical procedure type;
identify, from the medical procedure transaction data set and based on the medical procedure type, a medical procedure transaction subset relevant to the biological condition;
adjust, for at least one medical procedure in the medical procedure transaction subset, a medical procedure date range based on a time period during which the medical procedure type is effective or repeated;
map, onto a timeline data structure stored in the memory, the pharmacy transaction subset and the medical procedure transaction subset, wherein the timeline data structure stores pharmacy transactions and medical procedure transactions arranged by date;
determine, in the timeline data structure, one or more therapy gaps during which there are no pharmacy transactions and no medical procedure transactions, wherein each therapy gap comprises a contiguous number of days, the contiguous number of days being longer than a threshold number of days;
determine, based on the one or more therapy gaps, one or more lines of therapy, each line of therapy comprising pharmacy transactions and medical procedure transactions occurring either between two therapy gaps, before an earliest temporal therapy gap, or after a latest temporal therapy gap, each line of therapy being associated with a line date range;
generating a database by transmitting, to a data repository, a data structure comprising information associated with the patient, the information relating to the one or more lines of therapy, and the line date range for each of the one or more lines of therapy;
based on a determination that the patient possesses a breast cancer mutation having a first clonal fraction, causing administration of a PI3K inhibitor targeting the breast cancer mutation to the patient according to the one or more lines of therapy;

identifying, based on the data structure, that another patient possesses a breast cancer mutation of a second clonal fraction higher than the first clonal fraction; and causing administration of the PI3K inhibitor to the another patient according to the one or more lines of therapy;

wherein the administration of the PI3K inhibitor to the patient having the first clonal fraction and the administration of the PI3K inhibitor to the another patient having the second clonal fraction result in substantially similar progression-free survival metrics.

13. The method of claim 1, wherein the information associated with the patient comprises a de-identified record comprising liquid biopsy test results obtained from the patient.

14. The method of claim 1, wherein the progression-free survival metrics comprise real-world time to discontinuation (rwTTD), real-world time to next treatment (rwTTNT), or a combination thereof.

15. The method of claim 1, wherein the second clonal fraction comprises a maximum breast cancer somatic mutation allelic fraction of over 50%, or at least 90%.

16. The method of claim 1, wherein the PI3K inhibitor comprises alpelisib.

17. The method of claim 1, wherein the breast cancer somatic mutation comprises a PIK3CA E454K or E454G alteration.

18. The system of claim 12, wherein the first clonal fraction comprises a maximum breast cancer somatic mutation allelic fraction of at most 50%.

19. The system of claim 12, wherein:
the PI3K inhibitor comprises alpelisib; and
the breast cancer mutation comprises a PIK3CA E454K or E454G alteration.

20. A non-transitory computer-readable apparatus comprising a storage medium, the storage medium comprising a plurality of instructions configured to, when executed by one or more processors, cause a computerized apparatus to:

access, for a patient, a pharmacy transaction data set, each pharmacy transaction in the pharmacy transaction data set comprising at least a transaction date, a therapeutic type, and a therapeutic supply duration;

parsing the one or more tables to identify, from the pharmacy transaction data set and based on the therapeutic type, a pharmacy transaction subset relevant to a biological condition;

compute, for at least one pharmacy transaction in the pharmacy transaction subset, an end date, wherein the transaction date corresponds to a date when the patient initiated a payment, wherein the end date is determined based on the transaction date and the therapeutic supply duration associated with the at least one pharmacy transaction;

access, at the processing circuitry and from the memory, for the patient, a medical procedure transaction data set, each medical procedure in the medical procedure data set comprising at least a medical procedure date range and a medical procedure type;

identify, from the medical procedure transaction data set and based on the medical procedure type, a medical procedure transaction subset relevant to the biological condition;

adjust, for at least one medical procedure in the medical procedure transaction subset, a medical procedure date range based on a time period during which the medical procedure type is effective or repeated;

map, onto a timeline data structure stored in the memory, the pharmacy transaction subset and the medical procedure transaction subset, wherein the timeline data structure stores pharmacy transactions and medical procedure transactions arranged by date;

determine, in the timeline data structure, one or more therapy gaps during which there are no pharmacy transactions and no medical procedure transactions, wherein each therapy gap comprises a contiguous number of days, the contiguous number of days being longer than a threshold number of days;

determine, based on the one or more therapy gaps, one or more lines of therapy, each line of therapy comprising pharmacy transactions and medical procedure transactions occurring either between two therapy gaps, before an earliest temporal therapy gap, or after a latest temporal therapy gap, each line of therapy being associated with a line date range;

generating a database by transmitting, to a data repository, a data structure comprising information associated with the patient, the information relating to the one or more lines of therapy, and the line date range for each of the one or more lines of therapy;

based on a determination that the patient possesses a breast cancer mutation having a first clonal fraction, causing administration of a PI3K inhibitor targeting the breast cancer mutation to the patient according to the one or more lines of therapy;

identifying, based on the data structure, that another patient possesses a breast cancer mutation of a second clonal fraction higher than the first clonal fraction; and causing administration of the PI3K inhibitor to the another patient according to the one or more lines of therapy;

wherein the administration of the PI3K inhibitor to the patient having the first clonal fraction and the administration of the PI3K inhibitor to the another patient having the second clonal fraction result in substantially similar progression-free survival metrics.

* * * * *